US010922772B2

(12) United States Patent
Chen et al.

(10) Patent No.: US 10,922,772 B2
(45) Date of Patent: Feb. 16, 2021

(54) COPYRIGHT AUTHORIZATION MANAGEMENT METHOD AND SYSTEM

(71) Applicant: Huawei Technologies Co., Ltd., Shenzhen (CN)

(72) Inventors: Yixin Chen, Shenzhen (CN); Junrong Wen, Shenzhen (CN); Pu Zhang, Shenzhen (CN); Deqian Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 16/102,647

(22) Filed: Aug. 13, 2018

(65) Prior Publication Data

US 2018/0349572 A1    Dec. 6, 2018

Related U.S. Application Data

(63) Continuation of application No. PCT/CN2017/091222, filed on Jun. 30, 2017.

(30) Foreign Application Priority Data

Aug. 1, 2016    (CN) .......................... 2016 1 0621458

(51) Int. Cl.
*G06Q 50/18*    (2012.01)
(52) U.S. Cl.
CPC ......... *G06Q 50/188* (2013.01); *G06Q 50/184* (2013.01)
(58) Field of Classification Search
CPC .......................... G06Q 50/184; G06Q 50/188
(Continued)

(56) References Cited

U.S. PATENT DOCUMENTS 5,850,442 A * 12/1998 Muftic .................. G06Q 20/02
                                                        705/65
8,266,032 B1 * 9/2012 Nathanson ............. G06Q 40/00
                                                        705/35
(Continued)

FOREIGN PATENT DOCUMENTS

CN    1570892 A    1/2005
CN    101452553 A    6/2009
(Continued)

OTHER PUBLICATIONS

Tsai et al., "A system view of Financial Blockchains", 2016 IEEE Symposium on Service-Oriented Engineering, Mar. 8, 2016, 8 pages (Year: 2016).*

(Continued)

*Primary Examiner* — James D Nigh
(74) *Attorney, Agent, or Firm* — Maier & Maier, PLLC

(57) ABSTRACT

Embodiments of the present disclosure disclose a copyright authorization management method and system. The method includes: obtaining owner-of-copyright information; sending a contract determining notification to a corresponding owner-of-copyright client based on the owner-of-copyright information, where the contract determining notification carries copyright-related information of a to-be-authorized work; receiving transaction information returned by the owner-of-copyright client, where the transaction information includes contract information determined by an owner of copyright based on the copyright-related information; obtaining a valid contract transaction based on the transaction information, where the valid contract transaction includes signatures satisfying a preset-quantity rule; and implementing persistence of the valid contract transaction in a block chain. In technical solutions provided in the embodiments of the present disclosure, online contract signing and persistence of a signed contract are implemented based on (Continued)

the block chain. This improves copyright authorization efficiency, and ensures that the contract is unique, trustworthy, and unalterable.

18 Claims, 26 Drawing Sheets

(58) Field of Classification Search
USPC .......................................................... 705/51
See application file for complete search history.

(56) References Cited

U.S. PATENT DOCUMENTS

| | | | |
|---|---|---|---|
| 2002/0178082 A1* | 11/2002 | Krause | G06Q 30/0601 |
| | | | 705/26.1 |
| 2004/0107249 A1* | 6/2004 | Moser | G06Q 10/107 |
| | | | 709/204 |
| 2007/0078773 A1* | 4/2007 | Czerniak | G06Q 30/00 |
| | | | 705/57 |
| 2008/0052519 A1 | 2/2008 | Lee et al. | |
| 2009/0089216 A1* | 4/2009 | Srivastava | G06Q 50/188 |
| | | | 705/80 |
| 2009/0177517 A1* | 7/2009 | Nichols | G06Q 10/06 |
| | | | 705/7.12 |
| 2016/0093009 A1* | 3/2016 | Goldklang | G06Q 50/188 |
| | | | 705/80 |
| 2016/0171634 A1* | 6/2016 | Laine | G06Q 10/00 |
| | | | 705/311 |
| 2016/0203535 A1* | 7/2016 | Nguyen | G06Q 30/0611 |
| | | | 705/26.35 |
| 2016/0217436 A1 | 7/2016 | Brama | |
| 2016/0342982 A1* | 11/2016 | Thomas | G06Q 20/401 |
| 2017/0109504 A1* | 4/2017 | Ochmanek | G06F 16/86 |
| 2017/0316390 A1* | 11/2017 | Smith | H04L 9/14 |

FOREIGN PATENT DOCUMENTS

| | | |
|---|---|---|
| CN | 101639916 A | 2/2010 |
| CN | 102609834 A | 7/2012 |
| CN | 102622559 A | 8/2012 |
| CN | 104851037 A | 8/2015 |
| CN | 105303126 A | 2/2016 |
| CN | 105591753 A | 5/2016 |
| CN | 105610578 A | 5/2016 |
| CN | 105787741 A | 7/2016 |
| CN | 105809062 A | 7/2016 |
| CN | 106933891 A | 7/2017 |
| CN | 107145768 A | 9/2017 |

OTHER PUBLICATIONS

Fujimura et al.,"BRIGHT: A Concept for a Decentralized Rights Management System Based on Blockchain", 2015 IEEE 5th International Conference on Consumer Electronics Berlin (ICCE—Berlin), pp. 345-346.

Kishigami et al.,"The Blockchain-based Digital Content Distribution System", 2015 IEEE Fifth International Conference on Big Data and Cloud Computing, pp. 187-190.

* cited by examiner

COPYRIGHT AUTHORIZATION MANAGEMENT METHOD AND SYSTEM

CROSS-REFERENCE TO RELATED APPLICATIONS

This application is a continuation of International Application No. PCT/CN2017/091222 filed on Jun. 30, 2017, which claims priority to Chinese Patent Application No. 201610621458.8 filed on Aug. 1, 2016. The disclosures of the aforementioned applications are hereby incorporated by reference in their entireties.

TECHNICAL FIELD

The present application relates to the field of digital copyright management technologies, and in particular, to a copyright authorization management method and system.

BACKGROUND

A copyright, also referred to as a literary property, is a special right legally enjoyed by an author over works produced by the author such as literature, art, and science. The copyright is not only a right of reproduction, but also represents a proprietary right and a control right over works and carriers of the works. The copyright specifically includes a personal right and a property right such as a right of publication, a right of authorship, a right of alteration, a right of integrity, a right of reproduction, a right of distribution, a right of rental, a right of exhibition, a right of performance, a screening right, a right of broadcasting, a right of communication through information network, a right of making cinematographic works, a right of adaptation, a right of translation, and a right of compilation. An owner of copyright can legally enjoy an exclusive right over a work within years specified by law. Generally, if others need to use the work, they should obtain permission of the owner of copyright in advance and pay rewards to the owner of copyright.

Conventional copyrights usually show two extremes: "all rights reserved" and "no rights reserved" (that is, a public domain). The Creative Commons (CC) attempts to moderate the two extremes to make an author "have partial rights reserved", so that the author can share a work with the public and entitle rights of re-creation and propagation to others while reserving some other rights. The Creative Commons emerges to avoid an information sharing problem of the contemporary intellectual property and copyright laws.

Re-creation means performing adaptation, replication, or extension based on a work. Currently, with popularization of networks, there are a large quantity of derivative work cases including both commercial works and fan works. Because a derivative work is obtained based on citation of an original work under the legislation, permission needs to be obtained from an owner of copyright of the original work.

The Creative Commons provides several copyright protocols for an owner of copyright. An author of a derivative work can clearly know rights of the owner of copyright according to these protocols, and is not prone to infringe a copyright of the original author, so that a work can be effectively disseminated. The owner of copyright may select a combination of the following several rights: 1. Attribution (Attribution, BY for short): An original author must be mentioned. 2. Noncommercial (Noncommercial, NC for short): A profit purpose is disallowed. 3. No derivative works (No Derivative Works, ND for short): An original work is disallowed to be altered or re-creation based on an original work is disallowed. 4. Share alike (Share Alike, SA for short): An original work is allowed to be altered, but must be published by using a same license. The owner of copyright may select, based on combinations of the foregoing rights, different copyright protocols for the author of the derivative work. Some of the combinations of the foregoing rights are not usable, and there are only six main copyright protocols: 1. Attribution (BY); 2. Attribution (BY)-share alike (SA). 3. Attribution (BY)-no derivative works (ND); 4. Attribution (BY)-noncommercial (NC); 5. Attribution (BY)-noncommercial (NC)-share alike (SA); 6. Attribution (BY)-noncommercial (NC)-no derivative works (ND).

Regardless of using an original work such as publishing, exhibiting, and performing the work, or performing re-creation based on the original work, authorization must be obtained from an owner of copyright of the work. There are mainly two existing copyright authorization manners. 1. Direct authorization: An owner of copyright negotiates authorization matters with an authorization requester in a one-to-one manner, to make an authorization contract. In this manner, efficiency is quite low for the owner of copyright. 2. Authorization implemented by using an agent: When an owner of copyright has not enough vitality and time, the owner of copyright hands over work copyright authorization to a copyright authorization agency, and an authorization requester negotiates authorization matters with the copyright authorization agency to obtain authorization. In this manner, efficiency is low and operational costs are high for the copyright requester; and especially for an author of a derivative work, an authorization process may be more time and labor consuming compared with a process of content production, resulting in authorization difficulty and provoking a phenomenon of infringing interests of the owner of copyright such as illegal use or alteration.

SUMMARY

Embodiments of the present disclosure provide a copyright authorization management method and system, to resolve a problem of low efficiency in existing authorization manners.

According to a first aspect, an embodiment of the present disclosure provides a copyright authorization management method, including: obtaining owner-of-copyright information; sending a contract determining notification to a corresponding owner-of-copyright client based on the owner-of-copyright information, where the contract determining notification carries copyright application-related information of a to-be-authorized work; receiving transaction information returned by the owner-of-copyright client, where the transaction information includes contract information determined by an owner of copyright based on the copyright application-related information; obtaining a valid contract transaction based on the transaction information, where the valid contract transaction includes signatures satisfying a preset-quantity rule; and implementing persistence of the valid contract transaction in a block chain. In the method, online contract signing and persistence of a signed contract are implemented based on the block chain. This improves copyright authorization efficiency and convenience, and ensures that the contract is unalterable and unique.

In a possible design, the obtaining a valid contract transaction based on the transaction information, and implementing persistence of the valid contract transaction in a block chain includes: constructing a contract transaction based on the transaction information, storing the contract transaction to a copyright authorization management apparatus, generating a check script based on the transaction information, and storing the check script to a block chain apparatus; sending the contract transaction to a copyright application client and the owner-of-copyright client; receiving signed contract transactions returned by the copyright application client and the owner-of-copyright client; verifying, based on the signed contract transactions, whether a signature quantity satisfies the preset-quantity rule; generating the valid contract transaction based on the signed contract transactions if the signature quantity satisfies the preset-quantity rule; and storing the valid contract transaction to the block chain apparatus, checking, by the block chain apparatus based on the check script, whether the valid contract transaction is legitimate, and implementing, by the block chain apparatus, persistence of the valid contract transaction in the block chain if the valid contract transaction is legitimate. In the solution, the copyright authorization management apparatus collects the signatures and verifies the signature quantity. These processes are performed by the copyright authorization management apparatus, so as to relieve pressure on a block generation apparatus to some extent. However, the block generation apparatus originally needs to collect data information when generating a block, and therefore additional resources are occupied in the solution. The copyright authorization management apparatus generates the valid contract transaction after the signature quantity satisfies the requirement, and sends the valid contract transaction to the block chain apparatus; and the block chain apparatus stores the valid contract transaction to the block chain. Information stored in the block chain is corresponding to a unique timestamp and is permanently stored.

In a possible design, the obtaining a valid contract transaction based on the transaction information, and implementing persistence of the valid contract transaction in a block chain includes: constructing a contract transaction based on the transaction information, and marking a status of the contract transaction as a suspended state; broadcasting the contract transaction to a block chain apparatus; sending the contract transaction to a copyright application client and the owner-of-copyright client, and submitting, by the copyright application client and the owner-of-copyright client, signed contract transactions whose statuses each have been marked as the suspended state to the block chain apparatus; receiving, by the block chain apparatus, the signed contract transactions submitted by the copyright application client and the owner-of-copyright client, and sending the signed contract transactions to a block generation apparatus; receiving, by the block generation apparatus, the signed contract transactions sent by the block chain apparatus, and adding a signature of a historical signed contract transaction to a latest current signed contract transaction, where the historical signed contract transaction and the latest current signed contract transaction originate from a same contract transaction, and the block generation apparatus is a block chain apparatus configured to generate a block; verifying, based on a signature of the latest current signed contract transaction, whether a signature quantity satisfies the preset-quantity rule; and if the signature quantity satisfies the preset-quantity rule, marking a status of the latest current signed contract transaction as a successful state, generating the valid contract transaction based on the latest current signed contract transaction in the successful state, and implementing persistence of the valid contract transaction in the block chain. In the solution, the copyright authorization management apparatus broadcasts the contract transaction to the block chain apparatus, and each client submits the signed contract transaction to the block chain apparatus, where the block chain apparatus may be any block chain apparatus. Then, the block chain apparatus sends the signed contract transaction to the block generation apparatus that obtains record permission; and the block generation apparatus collects the signatures and verifies the signature quantity, generates the valid contract transaction, and implements persistence of the valid contract transaction in the block chain. The block generation apparatus originally needs to collect data information when generating the block, and therefore additional processing resources are not occupied in the solution. In this case, processing efficiency is higher, but pressure of the block generation apparatus is relatively large.

The contract transaction includes a copyright transaction ID and an authorization contract file URL of the to-be-authorized work. A data structure of the contract transaction may be set based on an actual requirement.

In a possible design, the verifying whether a signature quantity satisfies the preset-quantity rule includes: determining whether a total quantity of signatures of a first signed contract transaction group is greater than or equal to a preset first quantity, where the first signed contract transaction group is a signed contract transaction from the owner-of-copyright client; determining whether a total quantity of signatures of a second signed contract transaction group is greater than or equal to a preset second quantity, where the second signed contract transaction group is a signed contract transaction from the copyright application client; and determining that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity. In the solution, a signature quantity verification method implemented when the preset-quantity rule is an m-of-n rule is described. The m-of-n rule means that a total quantity is n, and statistics satisfy the rule if a statistical value of the statistics is greater than or equal to m, where m≤n. In the present disclosure, a contract needs to be signed by both parties. Signatures of both the parties should satisfy the m-of-n rule. Signatures of an owner of copyright are used as one signature group and signatures of a copyright applicant are used as another signature group, and both signature quantities of the two signature groups should satisfy respective m-of-n rules. The preset-quantity rule specific to the signature quantity may alternatively be other rules, and may be self-defined by the owner of copyright.

In a possible design, the obtaining owner-of-copyright information includes: receiving a copyright authorization request sent by a copyright application client; and obtaining the corresponding owner-of-copyright information based on the copyright authorization request. The solution provides a case in which a copyright applicant directly applies for copyrights such as a right of exhibition and a right of broadcasting. In this case, the copyright applicant directly applies for copyright authorization by using the copyright application client.

In a possible design, the obtaining owner-of-copyright information includes: receiving a copyright registration request sent by a copyright application client, where the copyright registration request includes information about a cited work; checking the copyright registration request; and if check of the copyright registration request succeeds, querying, based on the information about the cited work, whether derivation on the cited work is disallowed, and if derivation on the cited work is disallowed, sending a registration failure prompt message to the copyright application client and ending copyright registration; or if derivation on the cited work is allowed, querying, based on the information about the cited work, whether derivation is to be performed on the cited work according to a preset clause, and if derivation is to be performed on the cited work according to a preset clause, sending the preset clause to the copyright application client, otherwise, obtaining the owner-of-copyright information based on the information about the cited work. The solution provides a case in which a copyright applicant is an author of a derivative work. The author of the derivative work may first perform copyright registration on the derivative work, and the copyright authorization management apparatus checks a copyright registration request, to determine whether to enter a copyright authorization procedure.

In a possible design, the sending a contract determining notification to a corresponding owner-of-copyright client based on the owner-of-copyright information includes: creating a discussion group; and sending a group discussion invitation to the corresponding owner-of-copyright client based on the owner-of-copyright information, sending a group discussion invitation to the copyright application client, and using the group discussion invitation as the contract determining notification. In the solution, the group discussion invitation is the contract determining notification, so that an owner of copyright and a copyright applicant can first determine a contract through group discussion. In this way, the contract approved by both the parties can be made, a possibility of contract modification is reduced, and contract determining efficiency is improved. After the contract is determined, a main person in charge among owners of copyright returns determined contract information to the copyright authorization management apparatus based on the determined contract.

In a possible design, after the receiving transaction information returned by the owner-of-copyright client and before the obtaining a valid contract transaction based on the transaction information, the copyright authorization management method further includes: sending the contract information to a copyright application client; determining whether contract confirmation information sent by the copyright application client is received; and if the contract confirmation information is received, obtaining the valid contract transaction based on the transaction information, otherwise, ending a copyright authorization procedure. In the solution, before obtaining the valid contract transaction, the copyright authorization management apparatus first sends the contract information to a copyright applicant to gain approval of the copyright applicant, and performs a subsequent step only after the copyright applicant confirms a contract. This avoids labor in vain due to dissatisfaction of the copyright applicant with the contract.

In a possible design, after the receiving transaction information returned by the owner-of-copyright client and before the obtaining a valid contract transaction based on the transaction information, the copyright authorization management method further includes: sending the contract information to a copyright application client; determining whether a contract confirmation message sent by the copyright application client is received; if the contract confirmation message is received, obtaining the valid contract transaction based on the transaction information, otherwise, determining whether a contract reselection request sent by the copyright application client is received; if the contract reselection request sent by the copyright application client is received, determining whether a quantity of contract reselection requests is less than or equal to a preset threshold, or if the contract reselection request sent by the copyright application client is not received, ending a copyright authorization procedure; and if the quantity of contract reselection requests is less than or equal to the threshold, sending the contract reselection request to the owner-of-copyright client and returning to the step of receiving transaction information returned by the owner-of-copyright client, otherwise, sending a new-application message to the copyright application client. In the solution, before obtaining the valid contract transaction, the copyright authorization management apparatus first sends the contract information to a copyright applicant, and performs a subsequent step only after the copyright applicant confirms a contract. If the copyright applicant is dissatisfied with the contract, the copyright applicant may request, by using the contract reselection request, an owner of copyright to reselect a contract. However, if a quantity of reselection times is excessively large, the copyright authorization procedure is ended to prevent unnecessary resource waste. After the owner of copyright reselects a contract, if the copyright applicant approves the contract, the contract can be confirmed.

According to a second aspect, an embodiment of the present disclosure provides a copyright authorization management system, including: a copyright authorization management apparatus, a block chain apparatus, and a block generation apparatus, where the copyright authorization management apparatus is configured to: obtain owner-of-copyright information; send a contract determining notification to a corresponding owner-of-copyright client based on the owner-of-copyright information, where the contract determining notification carries copyright application-related information of a to-be-authorized work; receive transaction information returned by the owner-of-copyright client, where the transaction information includes contract information determined by an owner of copyright based on the copyright application-related information; construct a contract transaction based on the transaction information, store the contract transaction to the copyright authorization management apparatus, generate a check script based on the transaction information, and store the check script to the block chain apparatus; send the contract transaction to a copyright application client and the owner-of-copyright client; receive signed contract transactions returned by the copyright application client and the owner-of-copyright client; verify, based on the signed contract transactions, whether a signature quantity satisfies a preset-quantity rule; generate a valid contract transaction based on the signed contract transactions if the signature quantity satisfies the preset-quantity rule; and store the valid contract transaction to the block chain apparatus;

the block chain apparatus checks, based on the check script, whether the valid contract transaction is legitimate, and sends the valid contract transaction to the block generation apparatus if the valid contract transaction is legitimate; and the block generation apparatus receives the valid contract transaction sent by the block chain apparatus, and implements persistence of the valid contract transaction in a block chain. In the solution, contract signature-related functions of the system are corresponding to signature collection and verification, and generation of the valid contract transaction that are performed by the copyright authorization management apparatus in the copyright authorization management method according to the first aspect.

The contract transaction includes a copyright transaction ID and an authorization contract file URL of the to-be-authorized work.

In a possible design, when verifying whether the signature quantity satisfies the preset-quantity rule, the copyright authorization management apparatus is specifically configured to: determine whether a total quantity of signatures of a first signed contract transaction group is greater than or equal to a preset first quantity, where the first signed contract transaction group is a signed contract transaction from the owner-of-copyright client; determine whether a total quantity of signatures of a second signed contract transaction group is greater than or equal to a preset second quantity, where the second signed contract transaction group is a signed contract transaction from the copyright application client; and determine that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity.

In a possible design, when obtaining the owner-of-copyright information, the copyright authorization management apparatus is specifically configured to: receive a copyright authorization request sent by the copyright application client; and obtain the corresponding owner-of-copyright information based on the copyright authorization request.

In a possible design, when obtaining the owner-of-copyright information, the copyright authorization management apparatus is specifically configured to: receive a copyright registration request sent by the copyright application client, where the copyright registration request includes information about a cited work; check the copyright registration request; and if check of the copyright registration request succeeds, query, based on the information about the cited work, whether derivation on the cited work is disallowed, and if derivation on the cited work is disallowed, send a registration failure prompt message to the copyright application client and end copyright registration; or if derivation on the cited work is allowed, query, based on the information about the cited work, whether derivation is to be performed on the cited work according to a preset clause, and if derivation is to be performed on the cited work according to a preset clause, send the preset clause to the copyright application client, otherwise, obtain the owner-of-copyright information based on the information about the cited work.

In a possible design, when sending the contract determining notification to the corresponding owner-of-copyright client based on the owner-of-copyright information, the copyright authorization management apparatus is specifically configured to: create a discussion group; and send a group discussion invitation to the corresponding owner-of-copyright client based on the owner-of-copyright information, send a group discussion invitation to the copyright application client, and use the group discussion invitation as the contract determining notification.

In a possible design, after receiving the transaction information returned by the owner-of-copyright client and before obtaining the valid contract transaction based on the transaction information, the copyright authorization management apparatus is further configured to: send the contract information to the copyright application client; determine whether a contract confirmation message sent by the copyright application client is received; and if the contract confirmation message is received, obtain the valid contract transaction based on the transaction information, otherwise, end a copyright authorization procedure.

In a possible design, after receiving the transaction information returned by the owner-of-copyright client and before obtaining the valid contract transaction based on the transaction information, the copyright authorization management apparatus is further configured to: send the contract information to the copyright application client; determine whether a contract confirmation message sent by the copyright application client is received; if the contract confirmation message is received, obtain the valid contract transaction based on the transaction information, otherwise, determine whether a contract reselection request sent by the copyright application client is received; if the contract reselection request sent by the copyright application client is received, determine whether a quantity of contract reselection requests is less than a preset threshold, or if the contract reselection request sent by the copyright application client is not received, end a copyright authorization procedure; and if the quantity of contract reselection requests is less than the threshold, send the contract reselection request to the owner-of-copyright client and return to the step of receiving transaction information returned by the owner-of-copyright client, otherwise, send a new-application message to the copyright application client.

According to a third aspect, an embodiment of the present disclosure provides a copyright authorization management system, including: a copyright authorization management apparatus, a block chain apparatus, and a block generation apparatus, where the copyright authorization management apparatus is configured to: obtain owner-of-copyright information; send a contract determining notification to a corresponding owner-of-copyright client based on the owner-of-copyright information, where the contract determining notification carries copyright application-related information of a to-be-authorized work; receive transaction information returned by the owner-of-copyright client, where the transaction information includes contract information determined by an owner of copyright based on the copyright application-related information; construct a contract transaction based on the transaction information, and mark a status of the contract transaction as a suspended state; broadcast the contract transaction to the block chain apparatus; and send the contract transaction to a copyright application client and the owner-of-copyright client, so that the clients submit signed contract transactions whose statuses each have been marked as the suspended state to the block chain apparatus;

the block chain apparatus is configured to: receive the signed contract transactions submitted by the clients, and send the signed contract transactions to the block generation apparatus; and the block generation apparatus is configured to: receive the signed contract transactions sent by the block chain apparatus, and add a signature of a historical signed contract transaction to a latest current signed contract transaction, where the historical signed contract transaction and the latest current signed contract transaction originate from a same contract transaction; verify, based on a signature of the latest current signed contract transaction, whether a signature quantity satisfies a preset-quantity rule; and if the signature quantity satisfies the preset-quantity rule, mark a status of the latest current signed contract transaction as a successful state, generate a valid contract transaction based on the latest current signed contract transaction in the successful state, and implement persistence of the valid contract transaction in a block chain. In the solution, contract signature-related functions of the system are corresponding to signature collection and verification, and generation of the valid contract transaction that are performed by the block generation management apparatus in the copyright authorization management method according to the first aspect.

The contract transaction includes a copyright transaction ID and an authorization contract file URL of the to-be-authorized work.

In a possible design, when verifying whether the signature quantity satisfies the preset-quantity rule, the block generation apparatus is specifically configured to: determine whether a total quantity of signatures of a first signed contract transaction group is greater than or equal to a preset first quantity, where the first signed contract transaction group is a signed contract transaction from the owner-of-copyright client; determine whether a total quantity of signatures of a second signed contract transaction group is greater than or equal to a preset second quantity, where the second signed contract transaction group is a signed contract transaction from the copyright application client; and determine that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity.

In a possible design, when obtaining the owner-of-copyright information, the copyright authorization management apparatus is specifically configured to: receive a copyright authorization request sent by the copyright application client; and obtain the corresponding owner-of-copyright information based on the copyright authorization request.

In a possible design, when obtaining the owner-of-copyright information, the copyright authorization management apparatus is specifically configured to: receive a copyright registration request sent by the copyright application client, where the copyright registration request includes information about a cited work; check the copyright registration request; and if check of the copyright registration request succeeds, query, based on the information about the cited work, whether derivation on the cited work is disallowed, and if derivation on the cited work is disallowed, send a registration failure prompt message to the copyright application client and end copyright registration; or if derivation on the cited work is allowed, query, based on the information about the cited work, whether derivation is to be performed on the cited work according to a preset clause, and if derivation is to be performed on the cited work according to a preset clause, send the preset clause to the copyright application client, otherwise, obtain the owner-of-copyright information based on the information about the cited work.

In a possible design, when sending the contract determining notification to the corresponding owner-of-copyright client based on the owner-of-copyright information, the copyright authorization management apparatus is specifically configured to: create a discussion group; and send a group discussion invitation to the corresponding owner-of-copyright client based on the owner-of-copyright information, send a group discussion invitation to the copyright application client, and use the group discussion invitation as the contract determining notification.

In a possible design, after receiving the transaction information returned by the owner-of-copyright client and before obtaining the valid contract transaction based on the transaction information, the copyright authorization management apparatus is further configured to: send the contract information to the copyright application client; determine whether a contract confirmation message sent by the copyright application client is received; and if the contract confirmation message is received, obtain the valid contract transaction based on the transaction information, otherwise, end a copyright authorization procedure.

In a possible design, after receiving the transaction information returned by the owner-of-copyright client and before obtaining the valid contract transaction based on the transaction information, the copyright authorization management apparatus is further configured to: send the contract information to the copyright application client; determine whether a contract confirmation message sent by the copyright application client is received; if the contract confirmation message is received, obtain the valid contract transaction based on the transaction information, otherwise, determine whether a contract reselection request sent by the copyright application client is received; if the contract reselection request sent by the copyright application client is received, determine whether a quantity of contract reselection requests is less than a preset threshold, or if the contract reselection request sent by the copyright application client is not received, end a copyright authorization procedure; and if the quantity of contract reselection requests is less than the threshold, send the contract reselection request to the owner-of-copyright client and return to the step of receiving transaction information returned by the owner-of-copyright client.

According to a fourth aspect, an embodiment of the present disclosure provides a copyright authorization management method, including: obtaining, by a copyright authorization management apparatus, owner-of-copyright information; sending a contract determining notification to a corresponding owner-of-copyright client based on the owner-of-copyright information, where the contract determining notification carries copyright application-related information of a to-be-authorized work; receiving transaction information returned by the owner-of-copyright client, where the transaction information includes contract information determined by an owner of copyright based on the copyright application-related information; constructing a contract transaction based on the transaction information, storing the contract transaction to the copyright authorization management apparatus, generating a check script based on the transaction information, and storing the check script to a block chain apparatus; sending the contract transaction to a copyright application client and the owner-of-copyright client; receiving signed contract transactions returned by the copyright application client and the owner-of-copyright client; verifying, based on the signed contract transactions, whether a signature quantity satisfies a preset-quantity rule; generating a valid contract transaction based on the signed contract transactions if the signature quantity satisfies the preset-quantity rule; storing the valid contract transaction to the block chain apparatus, checking, by the block chain apparatus based on the check script, whether the valid contract transaction is legitimate, and sending the valid contract transaction to a block generation apparatus if the valid contract transaction is legitimate; and receiving, by the block generation apparatus, the valid contract transaction sent by the block chain apparatus, and implementing persistence of the valid contract transaction in a block chain. In the method, the copyright authorization management apparatus collects the signatures and verifies the signature quantity. This can relieve pressure on the block generation apparatus to some extent. However, the block generation apparatus originally needs to collect data information when generating a block, and therefore additional resources are occupied in the solution.

According to a fifth aspect, an embodiment of the present disclosure provides a copyright authorization management method, including: obtaining, by a copyright authorization management apparatus, owner-of-copyright information; sending a contract determining notification to a corresponding owner-of-copyright client based on the owner-of-copyright information, where the contract determining notification carries copyright application-related information of a to-be-authorized work; receiving transaction information returned by the owner-of-copyright client, where the transaction information includes contract information determined by an owner of copyright based on the copyright application-related information; constructing a contract transaction based on the transaction information, and marking a status of the contract transaction as a suspended state; broadcasting the contract transaction to a block chain apparatus; sending the contract transaction to a copyright application client and the owner-of-copyright client, and submitting, by the clients, signed contract transactions whose statuses each have been marked as the suspended state to the block chain apparatus; receiving, by the block chain apparatus, the signed contract transactions submitted by clients, and sending the signed contract transactions to a block generation apparatus; receiving, by the block generation apparatus, the signed contract transactions sent by the block chain apparatus, and adding a signature of a historical signed contract transaction to a latest current signed contract transaction, where the historical signed contract transaction and the latest current signed contract transaction originate from a same contract transaction; verifying, based on a signature of the latest current signed contract transaction, whether a signature quantity satisfies a preset-quantity rule; and if the signature quantity satisfies the preset-quantity rule, marking a status of the latest current signed contract transaction as a successful state, generating a valid contract transaction based on the latest current signed contract transaction in the successful state, and implementing persistence of the valid contract transaction in a block chain. In the method, the copyright authorization management apparatus broadcasts the contract transaction to the block chain apparatus, and each client submits the signed contract transaction to the block chain apparatus, and the block chain apparatus stores the signed contract transaction in a distributed manner. Then, the block chain apparatus sends the signed contract transaction to the block generation apparatus that obtains record permission; and the block generation apparatus collects the signatures and verifies the signature quantity, generates the valid contract transaction, and implements persistence of the valid contract transaction in the block chain. The block generation apparatus originally needs to collect data information when generating a block, and therefore additional processing resources are not occupied in the method. In this case, processing efficiency is higher, but pressure of the block generation apparatus is relatively large.

According to a sixth aspect, an embodiment of the present disclosure provides a copyright authorization management method, applied to a copyright application client, where the method includes: obtaining copyright application information entered by a user; generating a copyright registration request or a copyright authorization request based on the copyright application information; sending the copyright registration request or the copyright authorization request to a copyright authorization management system; receiving a contract transaction sent by the copyright authorization management system; obtaining contract signature information entered by the user; generating a signed contract transaction based on the contract transaction and the contract signature information; and sending the signed contract transaction to the copyright authorization management system.

In a possible design, the copyright authorization management method further includes: receiving a group discussion invitation sent by the copyright authorization management system; and logging in to a corresponding group based on the group discussion invitation.

In a possible design, the copyright authorization management method further includes: receiving contract information sent by the copyright authorization management system; obtaining contract confirmation information entered by the user; generating a contract confirmation message based on the contract confirmation information; and sending the contract confirmation message to the copyright authorization management system.

In a possible design, the copyright authorization management method further includes: receiving contract information sent by the copyright authorization management system; obtaining contract reselection information entered by the user; generating a contract reselection request based on the contract reselection information; and sending the contract reselection request to the copyright authorization management system.

In a possible design, the copyright authorization management method further includes: receiving a cloud system contract signature notification sent by the copyright authorization management system; and logging in to a corresponding contract signature cloud system based on the cloud system contract signature notification. In the solution, when there is no proper internal contract template, the third-party contract signature cloud system is invoked, so that both parties confirm a contract in the contract signature cloud system. This improves system applicability. The cloud system contract signature notification may be sent by a copyright authorization management apparatus in the copyright authorization management system after the copyright authorization management apparatus is instructed, during a group discussion held by both the parties, to use the third-party system; or may be directly sent by the copyright authorization management apparatus without a group discussion process.

According to a seventh aspect, an embodiment of the present disclosure provides a copyright authorization management apparatus that is corresponding to the copyright authorization management method in the sixth aspect and that is applied to a copyright application client, including: a copyright application information obtaining module, configured to obtain copyright application information entered by a user; a request generation module, configured to generate a copyright registration request or a copyright authorization request based on the copyright application information; a request sending module, configured to send the copyright registration request or the copyright authorization request to a copyright authorization management system; a contract transaction receiving module, configured to receive a contract transaction sent by the copyright authorization management system; a signature information obtaining module, configured to obtain contract signature information entered by the user; a signed contract transaction generation module, configured to generate a signed contract transaction based on the contract transaction and the contract signature information; and a signed contract transaction sending module, configured to send the signed contract transaction to the copyright authorization management system.

In a possible design, the copyright authorization management apparatus further includes a group discussion invitation receiving module, configured to receive a group discussion invitation sent by the copyright authorization management system; and a group login module, configured to log in to a corresponding group based on the group discussion invitation.

In a possible design, the copyright authorization management apparatus further includes: a contract information receiving module, configured to receive contract information sent by the copyright authorization management system; a contract confirmation information obtaining module, configured to obtain contract confirmation information entered by the user; a contract confirmation message generation module, configured to generate a contract confirmation message based on the contract confirmation information; and a contract confirmation information sending module, configured to send the contract confirmation message to the copyright authorization management system.

In a possible design, the copyright authorization management apparatus further includes: a contract information receiving module, configured to receive contract information sent by the copyright authorization management system; a contract reselection information obtaining module, configured to obtain contract reselection information entered by the user; a contract reselection request generation module, configured to generate a contract reselection request based on the contract reselection information; and a contract reselection request sending module, configured to send the contract reselection request to the copyright authorization management system.

In a possible design, the copyright authorization management apparatus further includes: a cloud signature notification receiving module, configured to receive a cloud system contract signature notification sent by the copyright authorization management system; and a signature cloud system login module, configured to log in to a corresponding contract signature cloud system based on the cloud system contract signature notification.

According to an eighth aspect, an embodiment of the present disclosure provides a copyright application client, including a memory, a processor, a terminal transmitter, a terminal receiver, and a screen, where the screen is configured to obtain copyright application information entered by a user; the processor is configured to generate a copyright registration request or a copyright authorization request based on the copyright application information by invoking a program or an instruction stored in the memory; the terminal transmitter is configured to send the copyright registration request or the copyright authorization request to a copyright authorization management system; the terminal receiver is configured to receive a contract transaction sent by the copyright authorization management system; the screen is further configured to obtain contract signature information entered by the user; the processor is further configured to generate a signed contract transaction based on the contract transaction and the contract signature information; and the terminal transmitter is further configured to send the signed contract transaction to the copyright authorization management system.

In a possible design, the terminal receiver of the copyright application client is further configured to receive a group discussion invitation sent by the copyright authorization management system; and the processor is further configured to log in to a corresponding group based on the group discussion invitation.

In a possible design, the terminal receiver is further configured to receive contract information sent by the copyright authorization management system; the screen is further configured to obtain contract confirmation information entered by the user; the processor is further configured to generate a contract confirmation message based on the contract confirmation information; and the terminal transmitter is further configured to send the contract confirmation message to the copyright authorization management system.

In a possible design, the terminal receiver is further configured to receive contract information sent by the copyright authorization management system; the screen is further configured to obtain contract reselection information entered by the user; the processor is further configured to generate a contract reselection request based on the contract reselection information; and the terminal transmitter is further configured to send the contract reselection request to the copyright authorization management system.

In a possible design, the terminal receiver is further configured to receive a cloud system contract signature notification sent by the copyright authorization management system; and the processor is further configured to log in to a corresponding contract signature cloud system based on the cloud system contract signature notification.

According to a ninth aspect, an embodiment of the present disclosure provides a copyright authorization management method, applied to an owner-of-copyright client, where the method includes: receiving a contract determining notification sent by a copyright authorization management system; obtaining authorization contract determining information entered by a user; generating transaction information based on the authorization contract determining information; sending the transaction information to the copyright authorization management system; receiving a contract transaction sent by the copyright authorization management system; obtaining contract signature information entered by the user; generating a signed contract transaction based on the contract transaction and the contract signature information; and sending the signed contract transaction to the copyright authorization management system.

In a possible design, the copyright authorization management method further includes: receiving a group discussion invitation sent by the copyright authorization management system; and logging in to a corresponding group based on the group discussion invitation.

In a possible design, the copyright authorization management method further includes: receiving a cloud system contract signature notification sent by the copyright authorization management system; and logging in to a corresponding contract signature cloud system based on the cloud system contract signature notification.

According to a tenth aspect, an embodiment of the present disclosure provides a copyright authorization management apparatus that is corresponding to the copyright authorization management method in the ninth aspect and that is applied to an owner-of-copyright client, including: a contract determining notification receiving module, configured to receive a contract determining notification sent by a copyright authorization management system; a contract determining information obtaining module, configured to obtain authorization contract determining information entered by a user; a transaction information generation module, configured to generate transaction information based on the authorization contract determining information; a transaction information sending module, configured to send the transaction information to the copyright authorization management system; a contract transaction receiving module, configured to receive a contract transaction sent by the copyright authorization management system; a contract signature information obtaining module, configured to obtain contract signature information entered by the user; a signed contract transaction generation module, configured to generate a signed contract transaction based on the contract transaction and the contract signature information; and a signed contract transaction sending module, configured to send the signed contract transaction to the copyright authorization management system.

In a possible design, the copyright authorization management apparatus further includes a group discussion invitation receiving module, configured to receive a group discussion invitation sent by the copyright authorization management system; and a group login module, configured to log in to a corresponding group based on the group discussion invitation.

In a possible design, the copyright authorization management apparatus further includes: a cloud signature notification receiving module, configured to receive a cloud system contract signature notification sent by the copyright authorization management system; and a signature cloud system login module, configured to log in to a corresponding contract signature cloud system based on the cloud system contract signature notification.

According to an eleventh aspect, an embodiment of the present disclosure provides an owner-of-copyright client, including a memory, a processor, a terminal transmitter, a terminal receiver, and a screen, where the terminal receiver is configured to receive a contract determining notification sent by a copyright authorization management system; the screen is configured to obtain authorization contract determining information entered by a user; the processor is configured to generate transaction information based on the authorization contract determining information by invoking a program or an instruction stored in the memory; the terminal transmitter is configured to send the transaction information to the copyright authorization management system; the terminal receiver is further configured to receive a contract transaction sent by the copyright authorization management system; the screen is further configured to obtain contract signature information entered by the user; the processor is further configured to generate a signed contract transaction based on the contract transaction and the contract signature information; and the terminal transmitter is further configured to send the signed contract transaction to the copyright authorization management system.

In a possible design, the terminal receiver is further configured to receive a group discussion invitation sent by the copyright authorization management system; and the processor is further configured to log in to a corresponding group based on the group discussion invitation.

In a possible design, the terminal receiver is further configured to receive a cloud system contract signature notification sent by the copyright authorization management system; and the processor is further configured to log in to a corresponding contract signature cloud system based on the cloud system contract signature notification.

An offline copyright authorization manner involves a plurality of parties including a copyright applicant and an owner of copyright. Therefore, it takes time and energy of the parties to organize a negotiation and signature conference or a contract needs to be posted to a plurality of parties to complete signature authorization. As a result, efficiency is low and great inconvenience is caused. In the technical solutions provided in the embodiments of the present disclosure, online contract signing and persistence of the signed contract are implemented based on the block chain. This improves copyright authorization efficiency, and ensures that the contract is unique, trustworthy, and unalterable.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION

Figure 1:
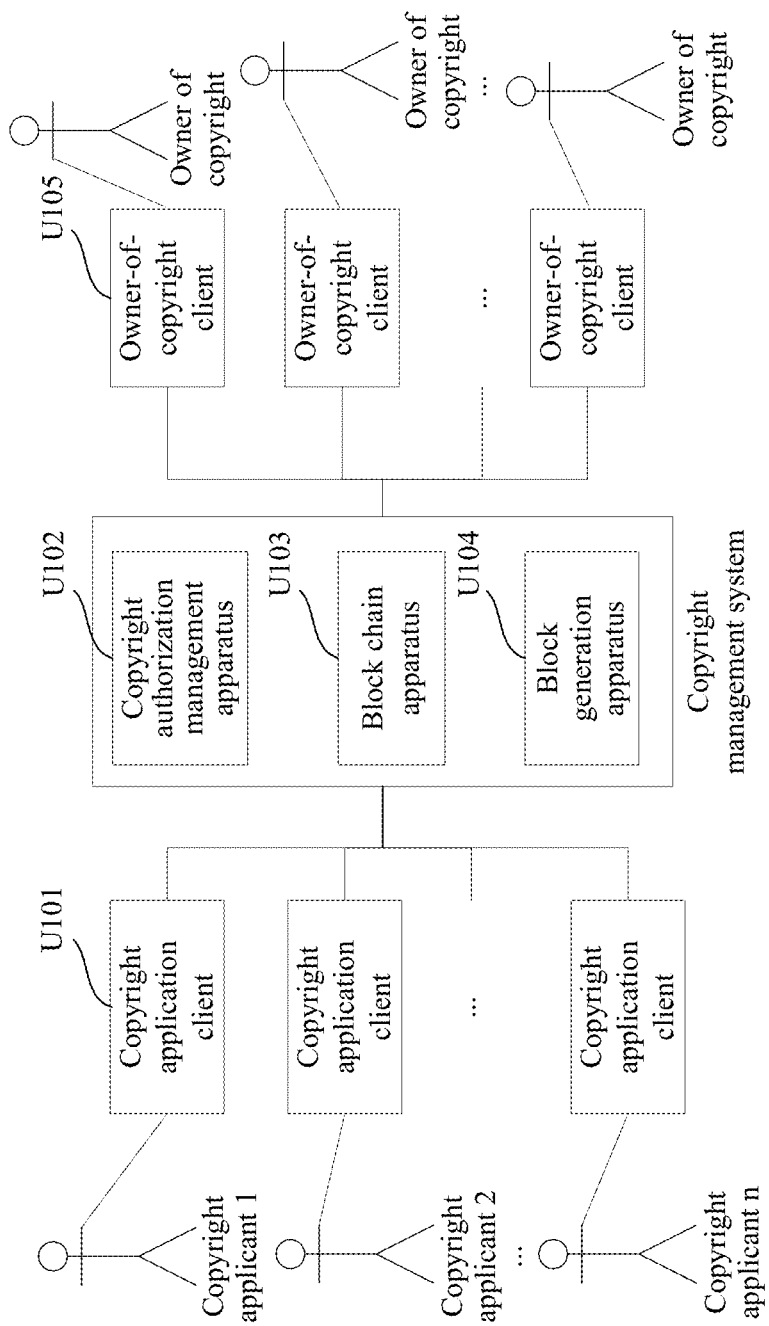
FIG. 1 shows an example of a system framework according to the present disclosure.

To make the objectives, technical solutions, and beneficial effects of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

The present disclosure mainly relates to two-party users and a third-party device. The two-party users are a copyright applicant and an owner of copyright. The copyright applicant is an individual or a team that expects to obtain a copyright-related right of a work such as a right of exhibition, a right of publication, or a right of adaptation. The owner of copyright is a proprietor or a legal person of a work's copyright. In the present disclosure, a copyright application client is provided for the copyright applicant. The copyright applicant may enter copyright application-related information, such as an applicant and information about a work whose authorization is to be applied for, into the copyright application client, and triggers a copyright authorization procedure for a copyright authorization management system by using the copyright application client. There are two cases in which the copyright applicant applies for copyright authorization. In one case, the copyright applicant applies for copyright-related rights such as a right of publication and a right of exhibition. The copyright applicant sends a copyright authorization request to the copyright authorization management system directly by using the copyright application client, so as to trigger a copyright authorization procedure for the copyright authorization management system. In the other case, the copyright applicant applies for derivative work-related copyrights such as a right of adaptation. The copyright applicant may first perform derivative-work copyright registration by using the copyright application client, and the copyright applicant enters information about a derivative work, a cited work, and the like (that is, a work on which re-creation is performed) into the copyright application client. The copyright application client sends a copyright registration request to the copyright authorization management system. After checking the copyright registration request, the copyright authorization management system finds that authorization of the owner of copyright is required for the cited work, so as to trigger a copyright authorization procedure for the copyright authorization management system.

The copyright authorization management system is a core of the present disclosure and is based on a block chain technology. A block chain technology provides a distributed reliability technical solution of collectively maintaining a set of data in a decentralized and trustless manner. Block chain data is stored in each node of a P2P (Peer to Peer, peer to peer) network, and each node has one complete block chain. When any one or more network nodes on the P2P network fail, there is no loss of block chain data, and therefore security of the block chain data is relatively high. A block chain is formed by linking a series of blocks generated by using a cryptography method. Each block contains all information exchange data in a block chain system within a specific time period, generates a data fingerprint used to verify validation of block information, and is linked to a next block. If the block chain is stored only on one or more nodes, it is quite likely that the block chain is fake. However, if each node has one complete block chain, and block chain data of the nodes keeps consistent, the block chains and blocks are unalterable.

A distributed database is included in the block chain technology. The distributed database is a physical carrier of a block, a block is a logical carrier of a transaction, and each of core nodes should contain a full copy of block chain data. The block is generated through serialization by time and is an entity for data transaction in the entire network. A block in a block chain can only be added, and is unable to be deleted or cancelled once addition succeeds. The block chain technology is in effect a distributed database that maintains increasing data records. After being correlated with all previously written data by using a cryptographic algorithm, the data is difficult to be altered by a third party or even an owner of a node. The block contains data that needs to be actually stored in the database. The data is organized by using the block, to be written into the database, and blocks are linked to form a block chain. A manner such as a Merkle tree is used to check whether all current blocks are altered. Compared with a common database or a storage unit, the block chain is a distributed multi-image storage. Any node stores all records, and record permission is decentralized. The nodes contend for the record permission by using an algorithm or a rule, and a node that obtains the record permission through contention generates a block by using information exchange data of the block chain system in a specific time period and implements persistence of the block in the block chain. All network participants unconditionally consent to an accepted record. That is, each transaction broadcast in a network is recorded, and the transaction is timestamped and stored in the block. The node that obtains the record permission broadcasts a block over the entire network after generating the block. After other nodes confirm the block, the block is confirmed as being legal, and a next round of contention for record permission is entered. In this way, the block chain is gradually formed.

The node that obtains the record permission generates a block and adds the block to the block chain, which is also referred to as implementing persistence of the block in the block chain. Except a first block in the block chain, each block is linked to a previous block of the block, and such linkage is like a chain. After persistence of a block is implemented in the block chain, the block is unalterable. Each node is a block chain apparatus. At a moment, a block chain apparatus implements persistence on a block. In this case, the node is referred to as a persistence processing block chain apparatus.

In the present disclosure, the copyright authorization management system mainly includes a copyright authorization management apparatus, a block chain apparatus, and a block generation apparatus. The copyright authorization management apparatus and the block chain apparatus both can communicate with the copyright application client. The copyright authorization management apparatus is a logical processing unit, configured to: receive a copyright authorization request or a copyright registration request sent by a copyright application client, and trigger a copyright authorization process based on the copyright authorization request or the copyright registration request. Specifically, the apparatus obtains owner-of-copyright information based on the copyright authorization request or the copyright registration request, determines a corresponding owner-of-copyright client based on the owner-of-copyright information, and sends a contract determining notification to the owner-of-copyright client, so that an owner of copyright can select or write a contract based on a copyright authorization application status. In the present disclosure, the owner-of-copyright client is provided for the owner of copyright. The owner-of-copyright client receives the contract determining notification sent by the copyright authorization management apparatus; the owner of copyright performs an operation on the owner-of-copyright client based on copyright application information, included in the notification, of a to-be-authorized work, to determine the contract; and the owner-of-copyright client generates transaction information based on the determined contract and related information, and returns the transaction information to the copyright authorization management apparatus. After receiving the transaction information, the copyright authorization management apparatus generates a contract transaction based on the transaction information, and sends, based on the block chain technology, the contract transaction to each copyright application client and each owner-of-copyright client. The copyright application client and the owner-of-copyright client complete contract signing, obtain signed contract transactions, and return the signed contract transactions to the copyright authorization management system. The copyright authorization management system determines, based on the collected signed contract transactions, whether a signature quantity of each party satisfies a condition; and if the condition is satisfied, the copyright authorization management system generates a valid contract transaction, completes online contract signing, and obtains a valid contract, so as to improve copyright authorization efficiency. Then, the copyright authorization management system implements persistence of the valid contract transaction in a block chain, so as to ensure that the valid contract is secure, unique, and unalterable. Specific processes such as online contract signing are detailed in the following embodiments. For an applicant that directly applies for copyrights such as a right of publication, obtaining the valid contract transaction is equivalent to obtaining authorization. For an author of a derivative work, obtaining the valid contract transaction is equivalent to obtaining a right of adaptation. The author of the derivative work may add, to a copyright registration transaction for the derivative work of the author, information related to a right-of-adaptation authorization contract, to complete copyright registration of the derivative work of the author.

FIG. 1 shows an example of a system framework according to the present disclosure. As shown in FIG. 1, there may be a plurality of copyright applicants corresponding to a plurality of copyright application clients. A copyright application client U101 is configured to: obtain copyright application information entered by a user, send a copyright registration request or a copyright authorization request to a copyright authorization management apparatus based on the copyright application information, and receive a contract transaction sent by a copyright authorization management system. It should be noted that, when there are a plurality of copyright applicants, because there is one applied-for copyright and the plurality of copyright applicants are a community, only one copyright application client is required to be responsible for sending the copyright registration request or the copyright authorization request. However, if signatures of a plurality of applicants are required for an authorization contract, copyright application clients of the copyright applicants who need to make signatures will receive the contract transaction. Therefore, the copyright application client may also have a copyright application function, that is, have a function of sending the copyright registration request or the copyright authorization request, and a function of receiving and processing the contract transaction. The copyright application client may alternatively be categorized into a client that has the foregoing two functions and a client that only has the function of receiving and processing the contract transaction. The client that only has the function of receiving and processing the contract transaction is provided for a copyright applicant who only needs to make a signature. The copyright application client may be a software application and may be installed in an intelligent device such as a mobile phone, a tablet, or a computer, or may be used as a function module to be integrated into third-party software. The copyright application client may alternatively be a separate dedicated device, executes, by using a processor, an instruction in a memory to implement various functions, and implements a receiving function and a sending function respectively by using a terminal receiver and a terminal transmitter.

After receiving the contract transaction, the copyright application client obtains contract signature information entered by the user, generates a signed contract transaction based on the contract transaction and the contract signature information, and sends the signed contract transaction to the copyright authorization management system. Specifically, in an implementation, the signed contract transaction is sent to the copyright authorization management apparatus; in another implementation, the signed contract transaction is sent to a block chain apparatus.

The copyright authorization management system includes a copyright authorization management apparatus U102, a block chain apparatus U103, and a block generation apparatus U104. The block generation apparatus in effect plays a role that a block chain apparatus plays when the block chain apparatus obtains record permission. After obtaining the record permission, the block generation apparatus generates a block and implements persistence of the block in a block chain. Because the block generation apparatus functions different from other block chain apparatuses that have not obtained the record permission, the block generation apparatus is distinguished from the other block chain apparatuses. The copyright authorization management apparatus is mainly configured to: interact with the copyright application client and an owner-of-copyright client, and generate the contract transaction based on transaction information. In an implementation, the copyright authorization management apparatus receives signed contract transactions sent by the copyright application client and the owner-of-copyright client, collects signatures, and generates a valid contract transaction; and the block chain apparatus and the block generation apparatus implement persistence of the valid contract transaction. In another implementation, the block chain apparatus receives signed contract transactions sent by the copyright application client and the owner-of-copyright client, and collects signatures; and the block generation apparatus generates a valid contract transaction and implements persistence of the valid contract transaction.

At a moment, there is only one block generation apparatus and there are a plurality of block chain apparatuses. Copyright authorization management apparatuses are in a one-to-one correspondence to block chain apparatuses. The copyright authorization management apparatuses and the block chain apparatuses may be disposed separately, may be integrated into a device, or each of the copyright authorization management apparatuses may be a part of the block chain apparatus. When sending the copyright authorization request or the copyright registration request, the copyright application client may select any one of the copyright authorization management apparatuses, or may select a nearest copyright authorization management apparatus. A block chain stored in the block chain apparatus in the present disclosure is configured to store the valid contract transaction, but the block chain may alternatively not be limited to storing only the valid contract transaction. An author of a derivative work may send the copyright registration request by using the copyright application client, and after persistence of the valid contract transaction is implemented, the author of the derivative work obtains authorization and performs copyright registration. Therefore, the block chain may also store a copyright registration transaction for the derivative work. In addition, the block chain not only can store the copyright registration transaction for the derivative work, but also can store a copyright registration transaction for a work of an owner of copyright. In this case, a data volume of each block in the block chain increases. However, after receiving the copyright registration request, the copyright authorization management apparatus needs to query only one block chain when checking the copyright registration request, because checking the copyright registration request involves querying for copyright registration information of the cited work for the derivative work. The copyright authorization management apparatus is required to query the block chain for the copyright registration transaction for the cited work. Therefore, querying only one block chain can improve query efficiency. In addition, the copyright authorization management apparatus is required to interact with only one block chain apparatus. This improves processing efficiency, and also can improve efficiency of querying for a work and work authorization information by a user. A block chain apparatus (node) stores a copy of a block chain data. The copyright authorization management apparatus sends a query keyword to a corresponding block chain apparatus. For example, after receiving the copyright registration request, the copyright authorization management apparatus sends a keyword of cited work-related information to a block chain apparatus corresponding to a block chain that stores a copyright registration transaction. The block chain apparatus obtains, based on the keyword, information corresponding to the block chain, and returns the information to the copyright authorization management apparatus, so that the copyright authorization management apparatus can implement querying of the block chain.

There may be one or more owners of copyright, and a plurality of owners of copyright are corresponding to a plurality of owner-of-copyright clients. An owner-of-copyright client U105 is configured to: receive a contract determining notification sent by the copyright authorization management apparatus; and after receiving the contract determining notification, display, by using an interface, a to-be-authorized work and a copyright application status to an owner of copyright based on copyright application-related information of the to-be-authorized work included in the contract determining notification, so as to provide a reference for the owner of copyright. The owner of copyright selects an existing contract template and completes filling of mandatory contract content, or the owner of copyright writes a contract alone and determines the contract. After the owner of copyright submits the determined contract to the owner-of-copyright client by using the screen, the owner-of-copyright client generates transaction information based on contract information. The generating transaction information may be combining the contract information and other information, where the other information may include a contract signature validity period, a contract signature requirement, and the like, and is entered by the owner of copyright. The owner-of-copyright client returns the transaction information to the copyright authorization management system; after the copyright authorization management system constructs a contract transaction based on the transaction information, receives the contract transaction sent by the copyright authorization management system; and displays the contract and a signature input region on the screen based on the contract transaction. Then, the user enters signature information. After obtaining the signature information, the owner-of-copyright client generates a signed contract transaction based on the signature information, where the signed contract transaction includes a signed contract file; and returns the signed contract transaction to the copyright authorization management system. It should be noted that, when there are a plurality of owners of copyright, a plurality of pieces of transaction information do not need to be sent to the copyright authorization management apparatus. Therefore, only one owner-of-copyright client corresponding to an owner of copyright who makes a decision is responsible for sending the transaction information to the copyright authorization management apparatus. However, if signatures of a plurality of authorizers are required for an authorization contract, all owner-of-copyright clients corresponding to owners of copyright who need to make signatures will receive the contract transaction. Therefore, the owner-of-copyright client may have functions of contract determining, generating and sending the transaction information, and receiving and processing the contract transaction. The owner-of-copyright client may alternatively be categorized into a client that has the foregoing two functions and a client that only has the function of receiving and processing the contract transaction. The client that only has the function of receiving and processing the contract transaction is provided for an owner of copyright who only needs to make a signature. The owner-of-copyright client may be a software application and may be installed in an intelligent device such as a mobile phone, a tablet, or a computer, or may be used as a function module to be integrated into third-party software. The owner-of-copyright client may alternatively be a separate dedicated device, executes, by using a processor, an instruction in a memory to implement various functions, and implements a receiving function and a sending function respectively by using a terminal receiver and a terminal transmitter.

Figure 2:
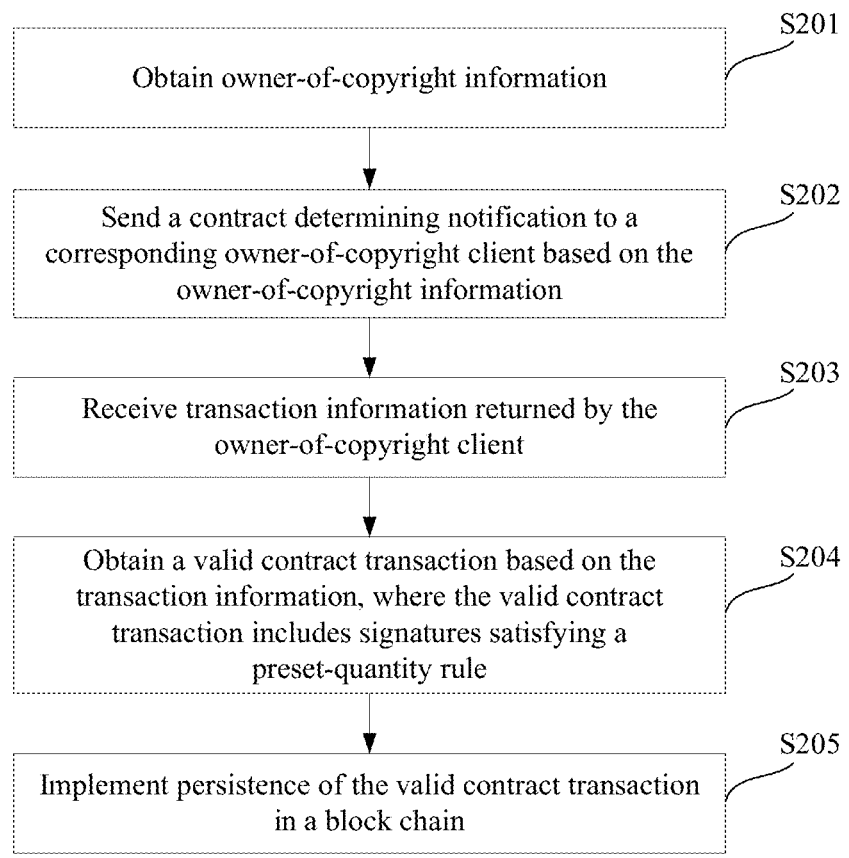
FIG. 2 is a schematic flowchart of a copyright authorization management method according to an embodiment of the present disclosure.

Based on the system framework shown in FIG. 1, the present disclosure provides a copyright authorization management method. FIG. 2 is a schematic flowchart of the method. As shown in FIG. 2, the method includes the following steps.

Step S201: Obtain owner-of-copyright information.

When a copyright applicant applies for copyrights unrelated to a derivative work, such as a right of exhibition and a right of broadcasting, a copyright application client directly sends a copyright authorization request to a copyright authorization management apparatus. Specifically, the copyright application client obtains copyright application information entered by a user. The copyright application information includes information about a work whose authorization is to be applied for, an applied-for authorization type, and copyright applicant information. The information about the to-be-authorized work can be used to uniquely determine the to-be-authorized work. The authorization type is a type of an applied-for copyright, for example, a right of publication, a right of performance, and a right of exhibition. There may be one or more authorization types. The copyright application client generates the copyright authorization request based on the copyright application information, where the copyright authorization request is generated according to a protocol that is specified between the copyright application client and the copyright authorization management apparatus in advance; and sends the copyright authorization request to the copyright authorization management apparatus.

Information about a work on which copyright registration has been performed is stored in a copyright registration transaction in a block chain. The copyright registration transaction has a unique transaction ID, and the copyright registration transaction ID is uniquely corresponding to a to-be-authorized work. Alternatively, the copyright registration transaction may record a unique identifier (for ease of description, referred to as a work copyright identifier) that is generated based on information about a work by using a specific algorithm, where the identifier is uniquely corresponding to a to-be-authorized work. In an implementation, the copyright application client provides a UI (User Interface, user interface) for the user to enter a copyright registration transaction ID or a work copyright identifier, and the copyright applicant directly enters the copyright registration transaction ID or the work copyright identifier. The copyright application client obtains the copyright registration transaction ID or the work copyright identifier entered by the copyright applicant as the information about the to-be-authorized work, obtains an authorization type and copyright applicant information entered by the copyright applicant, and uses the information about the to-be-authorized work, the authorization type, and the copyright applicant information together as copyright application information. Then, the copyright application client generates a copyright authorization request based on the copyright application information, and sends the copyright authorization request to the copyright authorization management apparatus. The copyright applicant information includes a copyright applicant address. The address is a network location identifier of the copyright applicant, and may be a login account of the copyright applicant in a copyright authorization management system, an account for copyright registration, or a unique identity. When the copyright applicant logs in to a copyright application client by using the address, the copyright authorization management apparatus determines, by using the address of the copyright applicant, the copyright application client for communication. When there are a plurality of copyright applicants, the copyright applicant information includes addresses of all the copyright applicants. The copyright applicant information may further include descriptive information such as a name of an owner of copyright or a name of a legal person. After receiving the copyright authorization request sent by the copyright application client, the copyright authorization management apparatus obtains the copyright registration transaction ID or the work copyright identifier, queries a block chain for a corresponding copyright registration transaction based on the copyright registration transaction ID or the work copyright identifier, and queries the copyright registration transaction for corresponding owner-of-copyright information and copyright-related information of a to-be-authorized work. The block chain is a block chain that stores the copyright registration transaction.

Because a copyright transaction ID or a work copyright identifier is monotonous and unmemorable, and the copyright applicant hardly has an approach to know internal system data such as the copyright transaction ID or the work copyright identifier. Therefore, in another implementation, the copyright application client may provide a UI for the user to enter a keyword of a to-be-authorized work. The keyword can uniquely determine the to-be-authorized work and is recorded in a copyright registration transaction in a block chain. The keyword may be an ISBN of the to-be-authorized work, a combination of a name and a version number of the to-be-authorized work, or the like. After obtaining the keyword of the to-be-authorized work entered by the user, the copyright application client uses the keyword of the to-be-authorized work and an authorization type as copyright application information or uses the keyword of the to-be-authorized work, an authorization type, and copyright applicant information as copyright application information, and sends the copyright application information to the copyright authorization management apparatus. After receiving the keyword of the to-be-authorized work, the copyright authorization management apparatus queries the block chain for a corresponding copyright registration transaction based on the keyword of the to-be-authorized work, and obtains the copyright registration transaction ID, and owner-of-copyright information and to-be-authorized work related information in the copyright registration transaction.

The to-be-authorized work related information includes information that describes a copyright of the to-be-authorized work, such as an authorized status of the to-be-authorized work, a work's name, and a version. The owner-of-copyright information includes an owner-of-copyright address. The address is a network location identifier of the owner of copyright, and may be a login account of the owner of copyright in a copyright authorization management system, an account for copyright registration, or a unique identity. When the owner of copyright logs in to an owner-of-copyright client by using the address, the copyright authorization management apparatus determines, by using the address of the owner of copyright, the owner-of-copyright client for communication. When there are a plurality of owners of copyright, the owner-of-copyright information includes addresses of all the owners of copyright. Certainly, the owner-of-copyright information may further include descriptive information such as a name of an owner of copyright or a name of a legal person.

When the copyright applicant is an author of a derivative work, the copyright applicant may directly apply for a right of adaptation like a user who applies for a right of publication, and directly send a copyright application request to the copyright authorization management apparatus by using the copyright application client. Alternatively, the author of the derivative work may first perform copyright registration for the derivative work. In this case, the block chain may be a block chain that stores both a valid contract transaction and a copyright registration transaction, and the copyright authorization management apparatus is corresponding to a block chain apparatus. Copyright registration for the derivative work is performed based on the block chain that stores the copyright registration transaction.

The copyright application client provides a screen to help the user enter copyright registration information. The copyright registration information includes information about the derivative work, for example, a work's name and a version, and further includes a copyright notice, that is, a copyright statement for the derivative work. In addition, the copyright registration information includes information about the author of the derivative work, that is, copyright applicant information, and includes information about a cited work for the derivative work. After obtaining the copyright registration information entered by the user, the copyright application client generates a copyright registration request based on the copyright registration information, where the copyright registration request is generated according to a protocol that is specified between the copyright application client and the copyright authorization management apparatus in advance.

Figure 3:
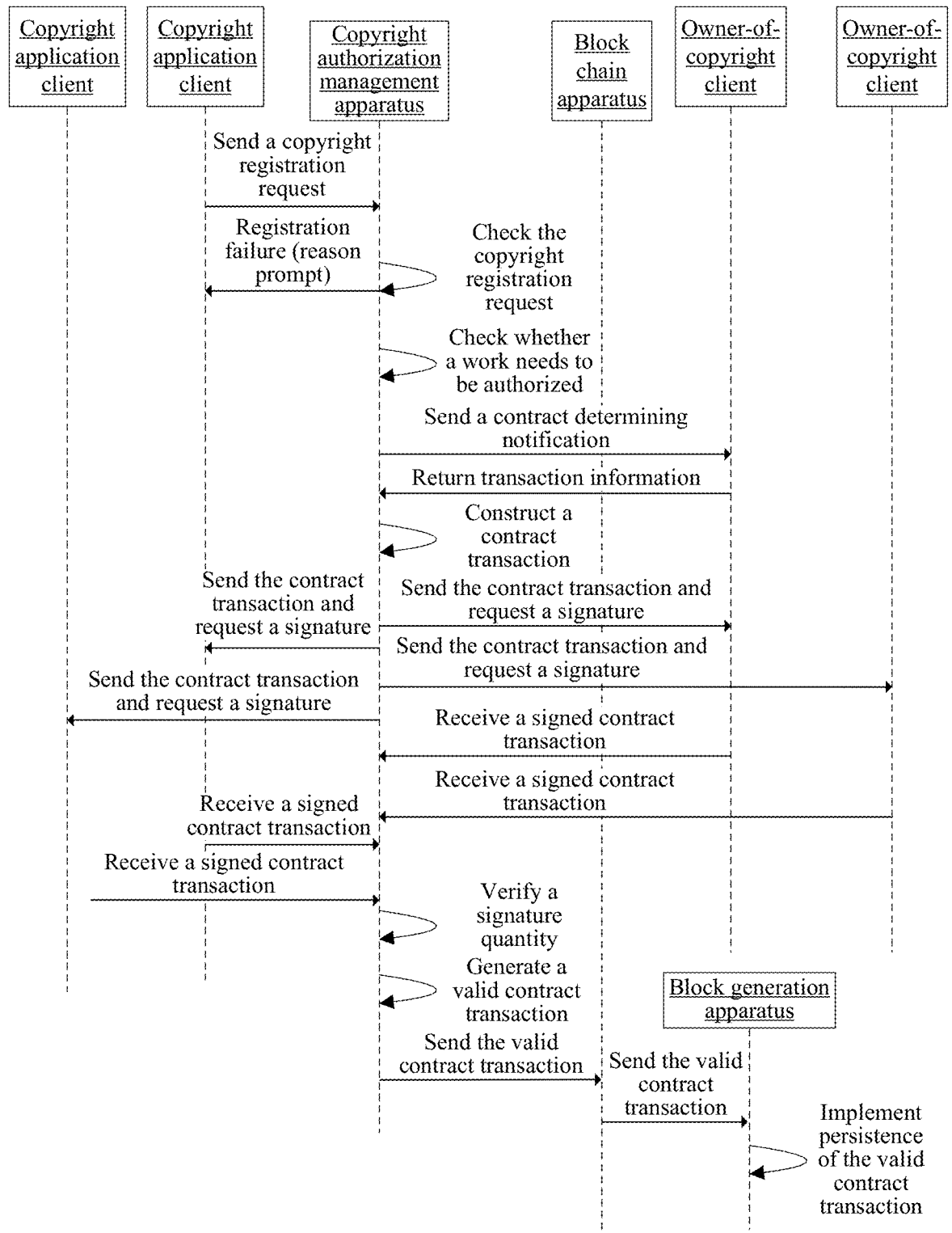
FIG. 3 shows an example of an interaction flowchart of performing the method shown in FIG. 2 when an author of a derivative work applies for a copyright.

FIG. 3 shows an example of an interaction flowchart of the method shown in FIG. 2, and FIG. 3 is an interaction flowchart of performing the method shown in FIG. 2 when an author of a derivative work applies for a copyright. As shown in FIG. 3, the author of the derivative work first performs copyright registration; a copyright application client sends a copyright registration request to a copyright authorization management apparatus; and the copyright authorization management apparatus checks the copyright registration request after receiving the copyright registration request. The check process specifically includes the following steps.

(a1) Check Integrity of the Copyright Registration Request.

Checking the integrity of the copyright registration request means checking whether information included in the copyright registration request is integral. Integrity check may be performed by comparing a data format of the copyright registration request with a preset data format of a copyright registration request. If the information included in the copyright registration request is integral, the following steps continue to be performed; otherwise, a procedure is ended, and a registration failure message may be returned to the copyright application client.

(a2) Check Whether Copyright Registration is Performed Repetitively.

The copyright authorization management apparatus obtains information about a derivative work from the copyright registration request; queries, in a block chain based on the information about the derivative work, whether there are same derivative works; and if there are same derivative works, determines that copyright registration is performed repetitively, ends the procedure, and may return a registration failure message to the copyright application client, or if there are no same derivative works, continues to perform the following steps. In an implementation, the information about the derivative work is a digital content ID. The digital content ID is generated based on content of the derivative work by using a specific algorithm, and digital content IDs of all works are generated by using a same algorithm. A copyright applicant may directly enter the digital content ID when entering the information about the derivative work; or the copyright applicant may enter necessary content for generating the digital content ID, and the copyright application client obtains the digital content ID or sends the digital content ID to the copyright authorization management apparatus. Alternatively, after the copyright application client sends necessary content for generating the digital content ID to the copyright authorization management apparatus, the copyright authorization management apparatus generates the digital content ID; queries, in the block chain based on the digital content ID, whether there are same digital content IDs; and if there are same digital content IDs, determines that copyright registration is performed repetitively, or if there are no same digital content IDs, determines that copyright registration is not performed repetitively.

(a3) Check Whether a Cited Work is not Displayed.

Information about a cited work is entered by the copyright applicant. The copyright applicant may enter detailed information about the cited work, or the copyright applicant may enter a keyword of the cited work and a quantity of cited works, where the keyword may be a copyright transaction ID of the cited work. After receiving the copyright registration request, the copyright authorization management apparatus obtains the keyword of the cited work; queries the block chain for the corresponding information about the cited work based on the keyword; and returns the information about the cited work to the copyright application client for display, so that the copyright applicant checks whether the cited work is entered integrally. If a quantity of cited works found by the copyright authorization management apparatus is less than the quantity of cited works that is entered by the user, it indicates that a cited work is not displayed and information about all the cited works is not filled integrally. In this case, the copyright authorization management apparatus ends the procedure, and may send a registration failure message to the copyright application client; otherwise, continues to perform the following steps. Step a3 is an optional step. When checking the copyright registration request, the copyright authorization management apparatus may not perform step a3.

(a4) Query Whether Derivation on a Cited Work is Disallowed.

The copyright authorization management apparatus obtains information about the cited work in a copyright application request, queries the block chain for a corresponding copyright registration transaction for the cited work based on the information about the cited work, and obtains CC (Creative Commons) clauses of the cited work that are recorded in the copyright registration transaction for the cited work. The information about the cited work may be a copyright registration transaction ID of the cited work, or may be a keyword or a key phrase that uniquely determines the cited work. The keyword or the key phrase is recorded in the copyright registration transaction for the cited work. Therefore, the copyright authorization management apparatus can find the copyright registration transaction for the cited work based on the information about the cited work. The CC clauses may be represented by code names in the copyright registration transaction. For example, BY represents attribution, BY-SA represents attribution and share alike, and BY-ND represents attribution and no derivative works. If a CC clause obtained by the copyright authorization management apparatus is a clause about no derivative works, for example, if a code name of the obtained CC clause is BY-ND, that is, a value of the CC clause is a character string BY-ND, it indicates that derivation on the cited work is disallowed. In this case, an owner of copyright does not grant authorization, and re-creation cannot be performed. Therefore, the procedure is ended, and a registration failure message may be returned to the copyright application client.

(a5) Query Whether Derivation is to be Performed on a Cited Work According to a Preset Clause.

There is no ordering relationship between step a4 and step a5 and either step a4 or step a5 is performed. After obtaining the CC clause of the cited work, the copyright authorization management apparatus can determine whether derivation on the cited work is disallowed, whether derivation is to be performed on the cited work according to a preset clause, or the like; if determining that derivation is to be performed on the cited work according to a preset clause, obtain the preset clause from the copyright registration transaction for the cited work; and returns the preset clause to the copyright application client. The copyright applicant can perform re-creation according to the preset clause without applying to the owner of copyright for authorization. An authorization procedure is omitted and a copyright registration procedure for the derivative work is directly entered. If neither derivation on the cited work is disallowed nor derivation is to be performed on the cited work according to a preset clause, or in other words, the CC clause of the cited work indicates that authorization is required, for example, the CC clause is BY-NC-SA (attribution-noncommercial-share alike), a copyright authorization procedure is entered and step S202 is performed. If the copyright application client directly sends a copyright authorization request to the copyright authorization management apparatus, the copyright authorization management apparatus enters the copyright authorization procedure after receiving the copyright authorization request.

After the copyright authorization management apparatus completes check of the copyright registration request, if the cited work needs to be authorized, the copyright authorization management apparatus obtains the information about the cited work from the copyright registration request. The information about the cited work may be a copyright registration transaction ID of the cited work, or may be a keyword that can uniquely determine the cited work. The copyright authorization management apparatus queries the block chain for the corresponding copyright registration transaction based on the copyright registration transaction ID or the keyword, and obtains corresponding owner-of-copyright information and cited work-related information. In addition, after receiving the copyright registration request, the copyright authorization management apparatus may determine, by default, that a type of a copyright that the copyright applicant applies for is a right of adaptation. The type of the copyright that the copyright applicant applies for may alternatively be entered by the copyright applicant by using a screen of the copyright application client. After obtaining the copyright type entered by the copyright applicant, the copyright application client adds the copyright type to the copyright registration request, and sends the copyright registration request to the copyright authorization management apparatus. After receiving the copyright registration request, the copyright authorization management apparatus reads, from the copyright registration request, the type of the copyright that the copyright applicant applies for.

Step S202: Send a contract determining notification to a corresponding owner-of-copyright client based on the owner-of-copyright information.

In a first possible implementation, after obtaining the owner-of-copyright information in the copyright authorization request or the copyright registration request, the copyright authorization management apparatus determines a corresponding owner-of-copyright client based on an address of an owner of copyright in the owner-of-copyright information. When there are a plurality of owners of copyright, generally, only one of the owners of copyright is required to be responsible for a copyright contract, and not all owners of copyright are required to determine the contract by using an owner-of-copyright client. Therefore, the copyright authorization management apparatus may send the contract determining notification only to a client corresponding to an owner of copyright who is responsible for the contract. A person responsible for contract determining is specified in advance and information about the specified person responsible for contract determining is stored in the owner-of-copyright information.

The contract determining notification is used to instruct the owner of copyright to determine the authorization contract, and carries copyright application-related information of a to-be-authorized work. After receiving the copyright authorization request or the copyright registration request, according to step S201, the copyright authorization management apparatus obtains the copyright application-related information of the to-be-authorized work based on the copyright authorization request, or obtains copyright application-related information of a cited work based on the copyright registration request. In terms of a derivative work, the copyright application-related information of the cited work is the copyright application-related information of the to-be-authorized work. The copyright application-related information of the to-be-authorized work includes an applied-for copyright type of the to-be-authorized work; may include a copyright application requirement specified when copyright registration is performed on the to-be-authorized work, for example, a type of a copyright that allows to be applied for and/or a CC clause; and may include authorized information of the to-be-authorized work and the like. The foregoing information is obtained by the copyright authorization management apparatus by querying a block chain for a copyright registration transaction for the to-be-authorized work. Certainly, the copyright application-related information of the to-be-authorized work also includes information about the to-be-authorized work. Based on the copyright application-related information of the to-be-authorized work, the owner of copyright can learn about a specific applied-for copyright (for example, a right of publication or a right of adaptation) of the to-be-authorized work, and can further learn about the copyright application requirement, previously specified by the owner of copyright, of the to-be-authorized work and an authorized status, so as to provide a reference for contract determining. Copyright applicant information in the contract determining notification is optional. The owner of copyright may not need to know an applicant, but learn about the applicant by using a signature of the final contract. Alternatively, the contract determining notification may include copyright applicant information, and the copyright applicant information herein includes only identity-related information of the applicant. The contract determining notification is generated by the copyright authorization management apparatus based on the copyright application-related information of the to-be-authorized work or based on copyright-related information of the to-be-authorized work and the copyright applicant information. A format of the contract determining notification is determined according to a communications protocol between the copyright authorization management apparatus and the owner-of-copyright client.

Figure 4:
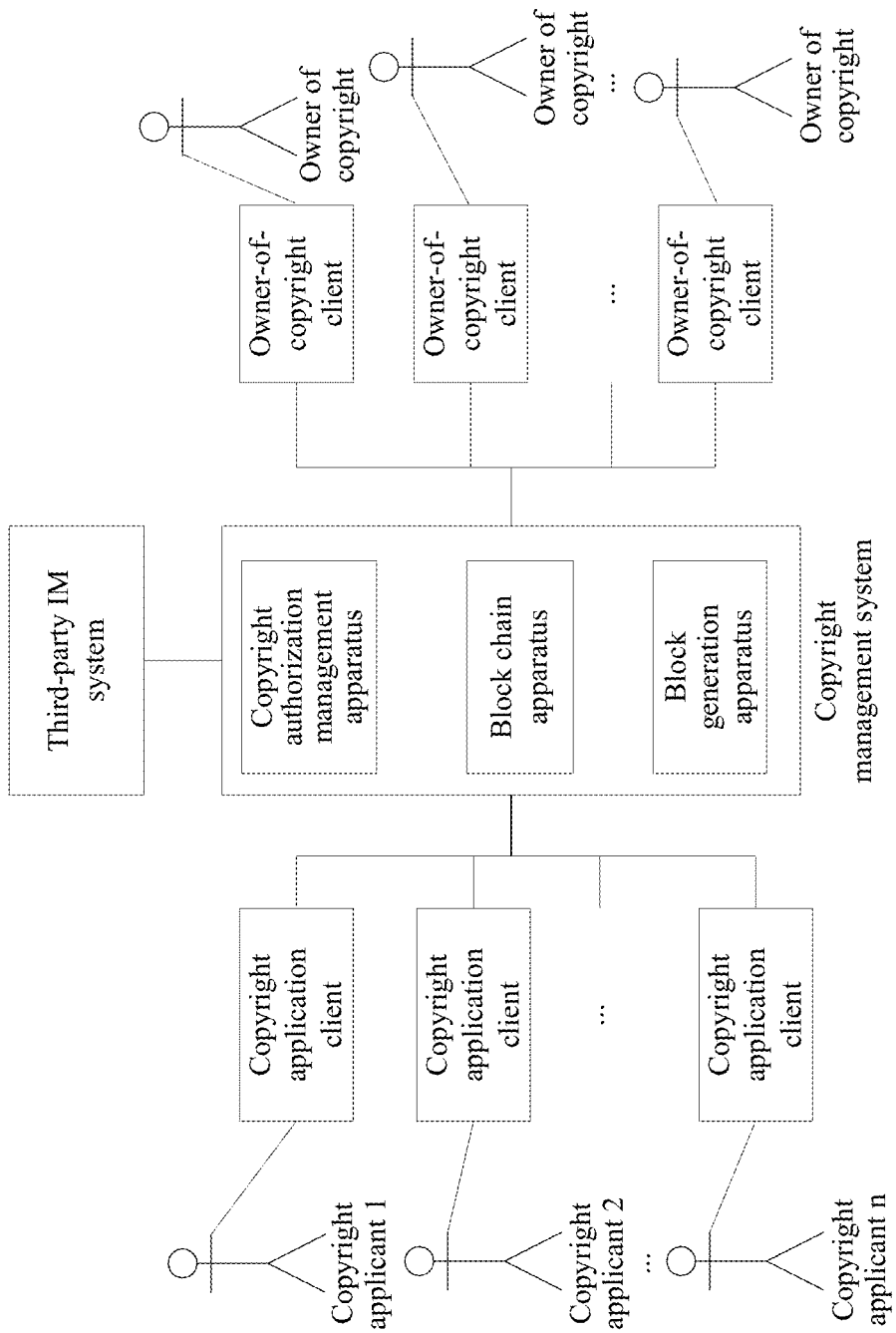
FIG. 4 is another example diagram of a system framework according to the present disclosure.
Figure 5A:
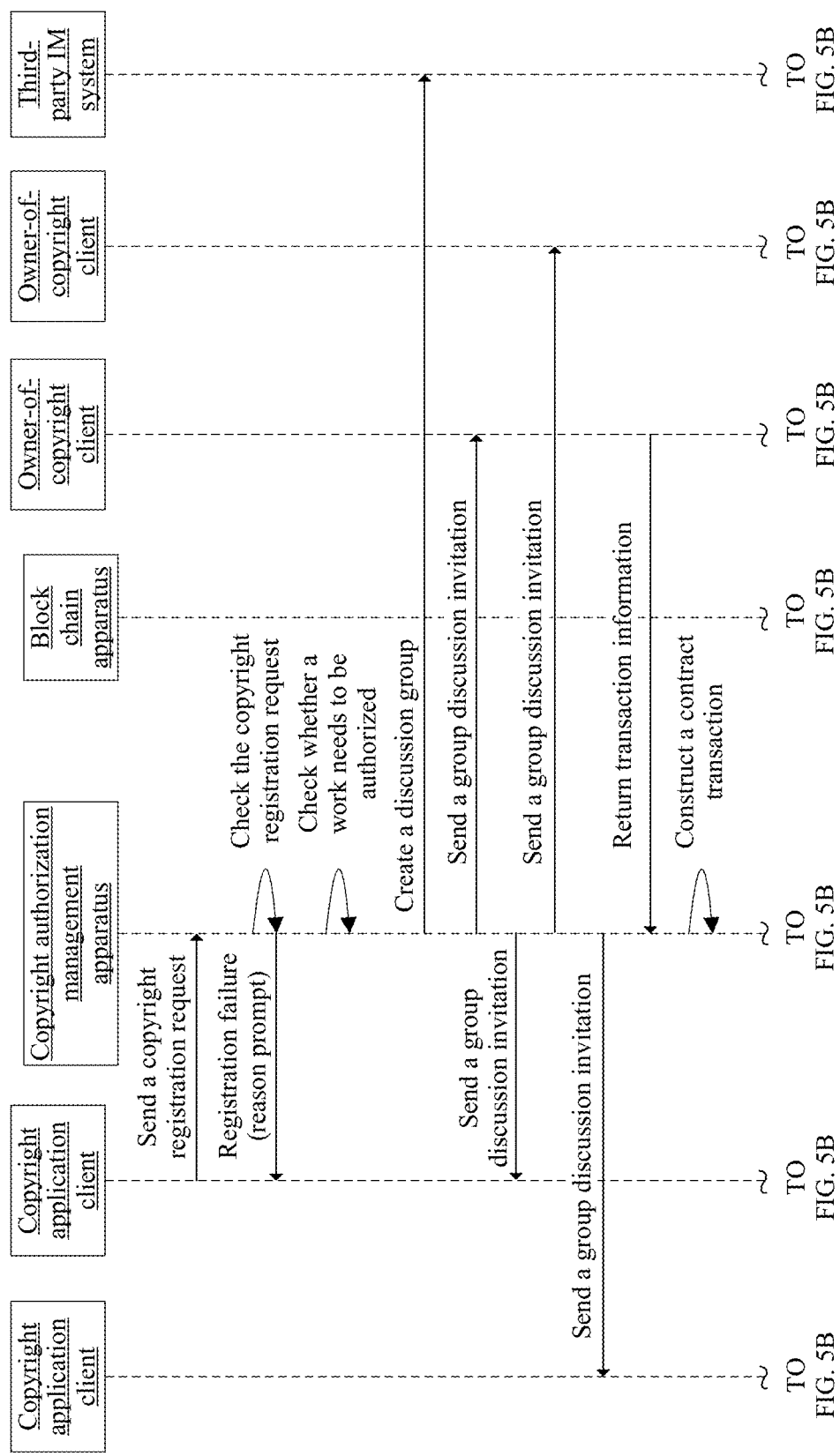
FIG. 5A and FIG. 5B show an example of another interaction flowchart of the method shown in FIG. 2.
Figure 5B:
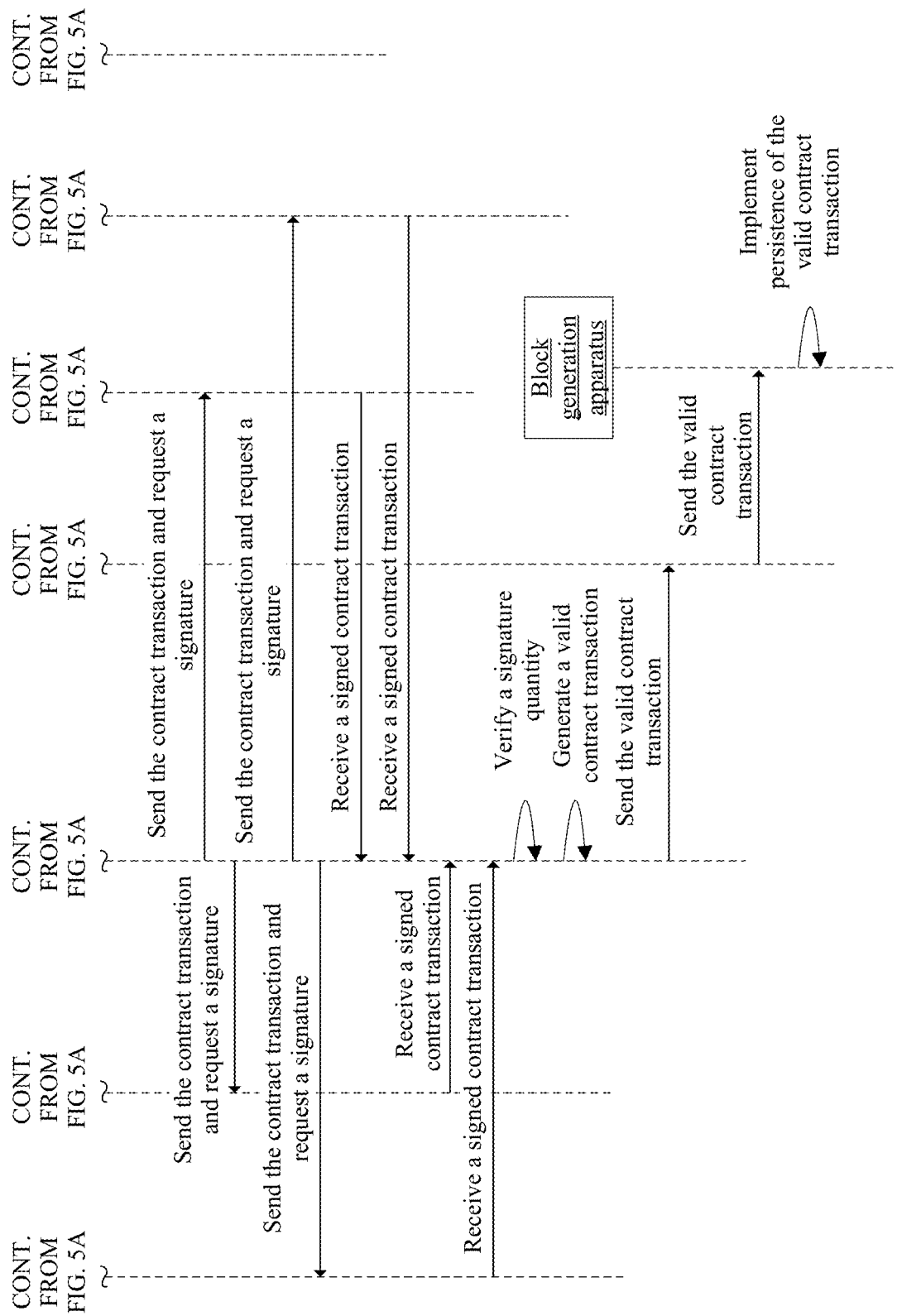

In a second possible implementation, the contract determining notification may be a group discussion invitation. FIG. 4 is another example diagram of a system framework according to the present disclosure. A third-party IM (Instant Messaging, instant messaging) system is added based on the framework shown in FIG. 1. The third-party IM system communicates with the copyright authorization management apparatus, the copyright application client, and the owner-of-copyright client. FIG. 5A and FIG. 5B show an example of another interaction flowchart of the method shown in FIG. 2. Compared with FIG. 3, in FIG. 5A and FIG. 5B, interaction involving a third-party IM system is added.

A copyright contract may be taken full charge by a person who is responsible for a contract among owners of copyright. Alternatively, a copyright contract may be determined by a copyright applicant and an owner of copyright through discussion. In this way, a contract approved by both parties can be obtained, and a possibility of contract modification is reduced. The discussion may be implemented by using the third-party IM system, for example, QQ. The copyright authorization management apparatus determines a corresponding owner-of-copyright client and a corresponding copyright application client based on owner-of-copyright information and copyright applicant information. Then, the copyright authorization management apparatus invokes the third-party IM system to create a discussion group, obtains an address of the created discussion group, and sends a group discussion invitation to the owner-of-copyright client and the copyright application client. The group discussion invitation is sent to all owner-of-copyright clients and all copyright application clients that need to participate in a discussion. An owner-of-copyright client and a copyright application client that need to participate in the group discussion are specified in advance, and designation information is stored in the copyright applicant information and the owner-of-copyright information. The group discussion invitation includes a discussion group login link. After receiving the group discussion invitation, the copyright application client and the owner-of-copyright client log in to the discussion group by using the login link in the group discussion invitation. The owner of copyright and the copyright applicant perform instant messaging in the group via the third-party IM system, and determine a contract through discussion.

Specifically, the copyright authorization management apparatus calls an interface of the third-party IM system, and creates the discussion group by using a public account of the copyright authorization management system in the IM system and a client (a copyright application client and an owner-of-copyright client) IM account. The public account is applied for by operation and maintenance personnel in the IM system and is preconfigured in the copyright authorization management apparatus. A data storage location needs to be specified when the public account is applied for. The data storage location is correlated with the public account, and the third-party IM system stores discussion group-related data and communication data at the data storage location. Client IM accounts are created and allocated automatically by the copyright authorization management apparatus, are mapped to the public account, and are stored. The copyright authorization management apparatus and the third-party IM system may transfer a related account and password information by using an SSL secure channel.

The copyright authorization management apparatus sends the group discussion invitation to the copyright application client and the owner-of-copyright client, where the group discussion invitation includes the group login link. After the copyright applicant and the owner of the copyright click the login link, the copyright application client and the owner-of-copyright client automatically log in to the IM system by calling IM login information, to join the discussion group; and may give a message reminder to an offline copyright applicant and an offline owner of copyright by using a provided email address or mobile phone number.

The owner of copyright and the copyright applicant determine an authorization contract through discussion in the discussion group. After the contract is determined, one of owners of copyright (a person in charge among owners of copyright) generates transaction information based on the determined contract by using an owner-of-copyright client corresponding to the owner of copyright, and returns the transaction information to the copyright authorization management apparatus.

In a first possible implementation, after receiving the contract determining notification, the owner of copyright may select a contract template preconfigured in the owner-of-copyright client, and complete filling and setting of related parameters (such as expenses, a disclosure manner, and a publication scope), to make an authorization contract; or may write a contract in a contract format recognizable by the owner-of-copyright client. In a second possible implementation, after the owner of copyright and the copyright applicant complete a discussion, one of owners of copyright may select a contract template in the owner-of-copyright client based on a discussion result or write a contract.

Figure 6:
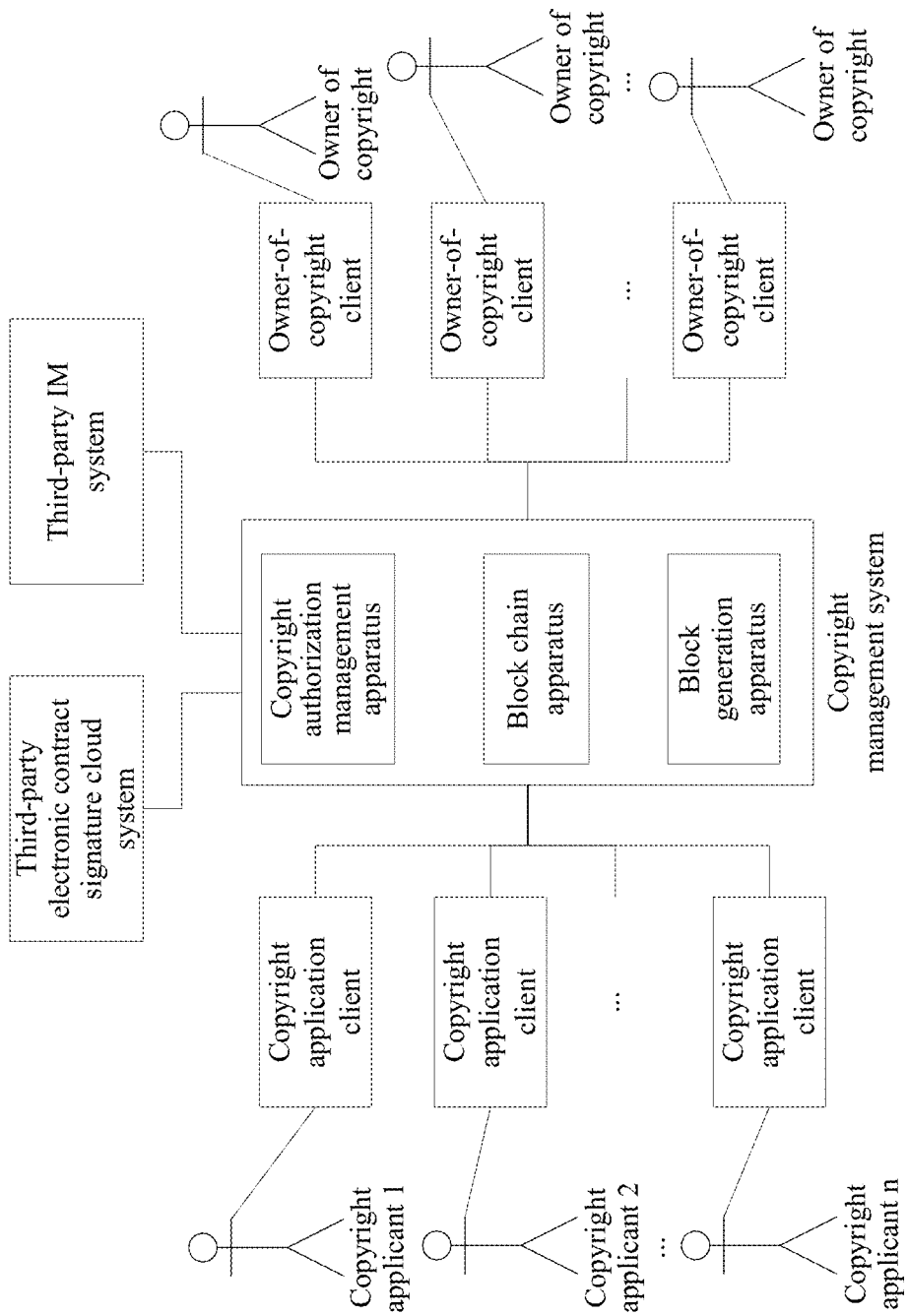
FIG. 6 is still another example diagram of a system framework according to the present disclosure.
Figure 7A:
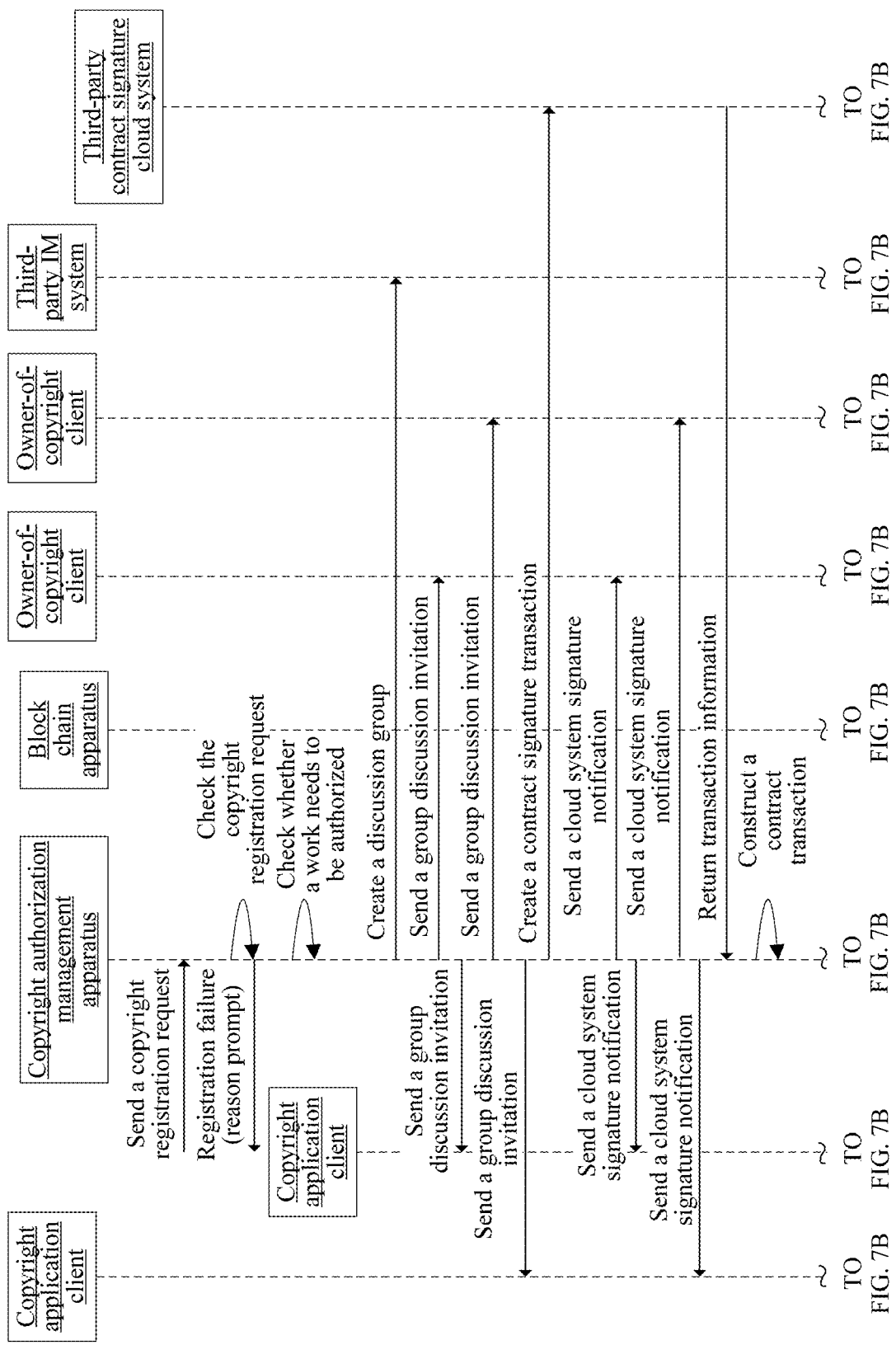
FIG. 7A and FIG. 7B show an example of an interaction flowchart implemented when a third-party electronic contract signature cloud system is used.
Figure 7B:
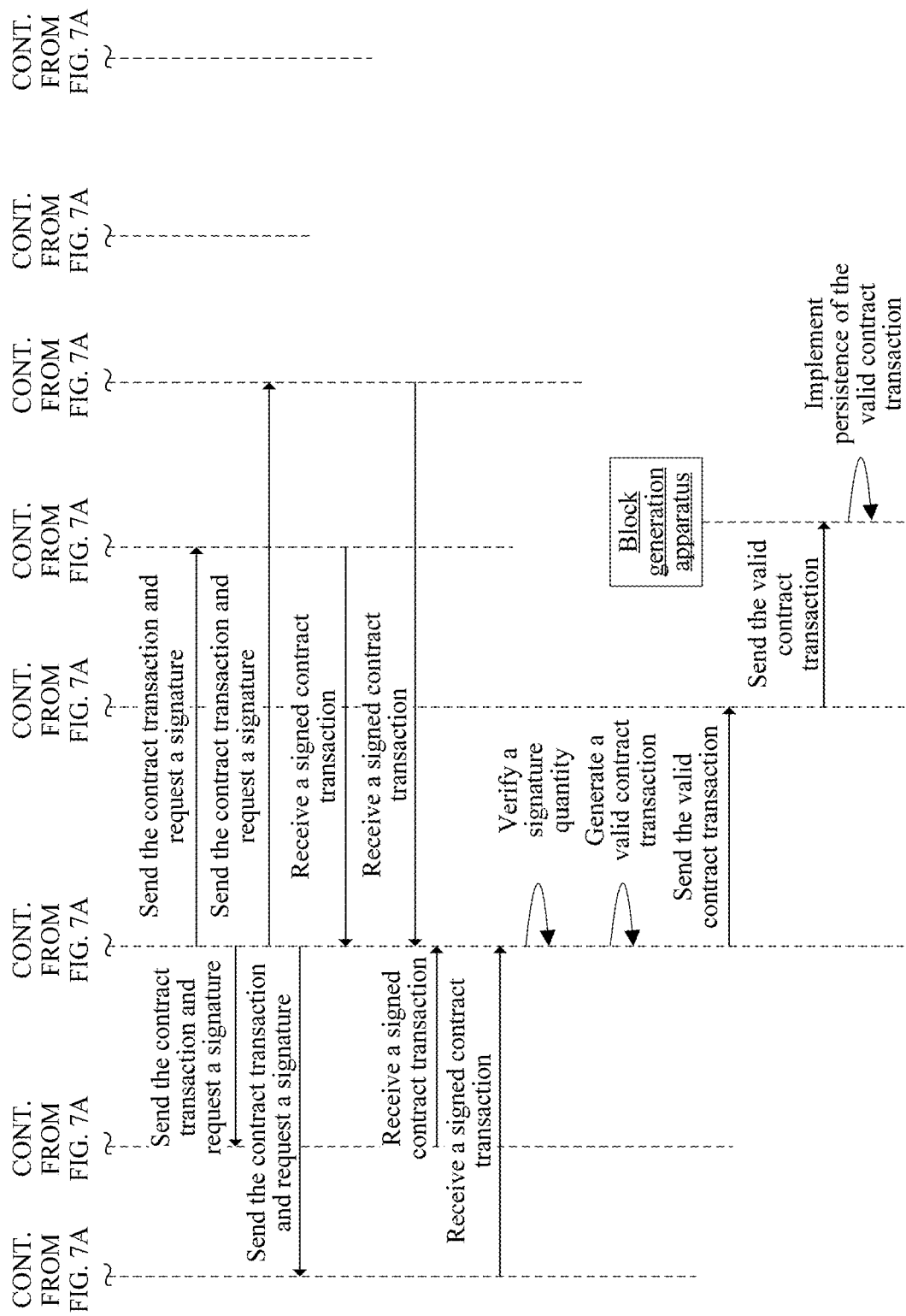

In the second possible implementation, if there is no proper preconfigured contract template during discussion between both parties, a third-party electronic contract signature cloud system may be used for contract determining. FIG. 6 is still another example diagram of a system framework according to the present disclosure. FIG. 6 shows the system framework used when the third-party electronic contract signature cloud system is used, and FIG. 7A and FIG. 7B show an interaction flowchart implemented when the third-party electronic contract signature cloud system is used. The copyright authorization management apparatus invokes the third-party electronic contract signature cloud system, creates a contract signature transaction in the contract signature cloud system, sends a contract signature cloud system login message to an owner-of-copyright client and a copyright application client that need to participate in contract signing, and instructs both parties to log in to the contract signature cloud system. After logging in to the contract signature cloud system by using the owner-of-copyright client and the copyright application client, both the parties determine information such as a proper contract template, a related parameter, and a signature requirement in the contract signature cloud system. Then, the contract signature cloud system generates transaction information based on the determined contract information, signature requirement, and other information, and sends the transaction information to the copyright authorization management apparatus.

Step S203: Receive transaction information returned by the owner-of-copyright client, where the transaction information includes contract information determined by an owner of copyright based on copyright application-related information.

After determining a contract, the owner-of-copyright client generates the transaction information based on the determined contract information. The transaction information includes the contract information, may further include information specified by the owner of copyright, such as a contract signature validity period and a signature type (a signature manner used), and may further include a self-defined signature quantity rule. The owner-of-copyright client generates the transaction information according to the communications protocol between the owner-of-copyright client and the copyright authorization management apparatus and the foregoing information, and then sends the transaction information to the copyright authorization management apparatus.

Figure 8:
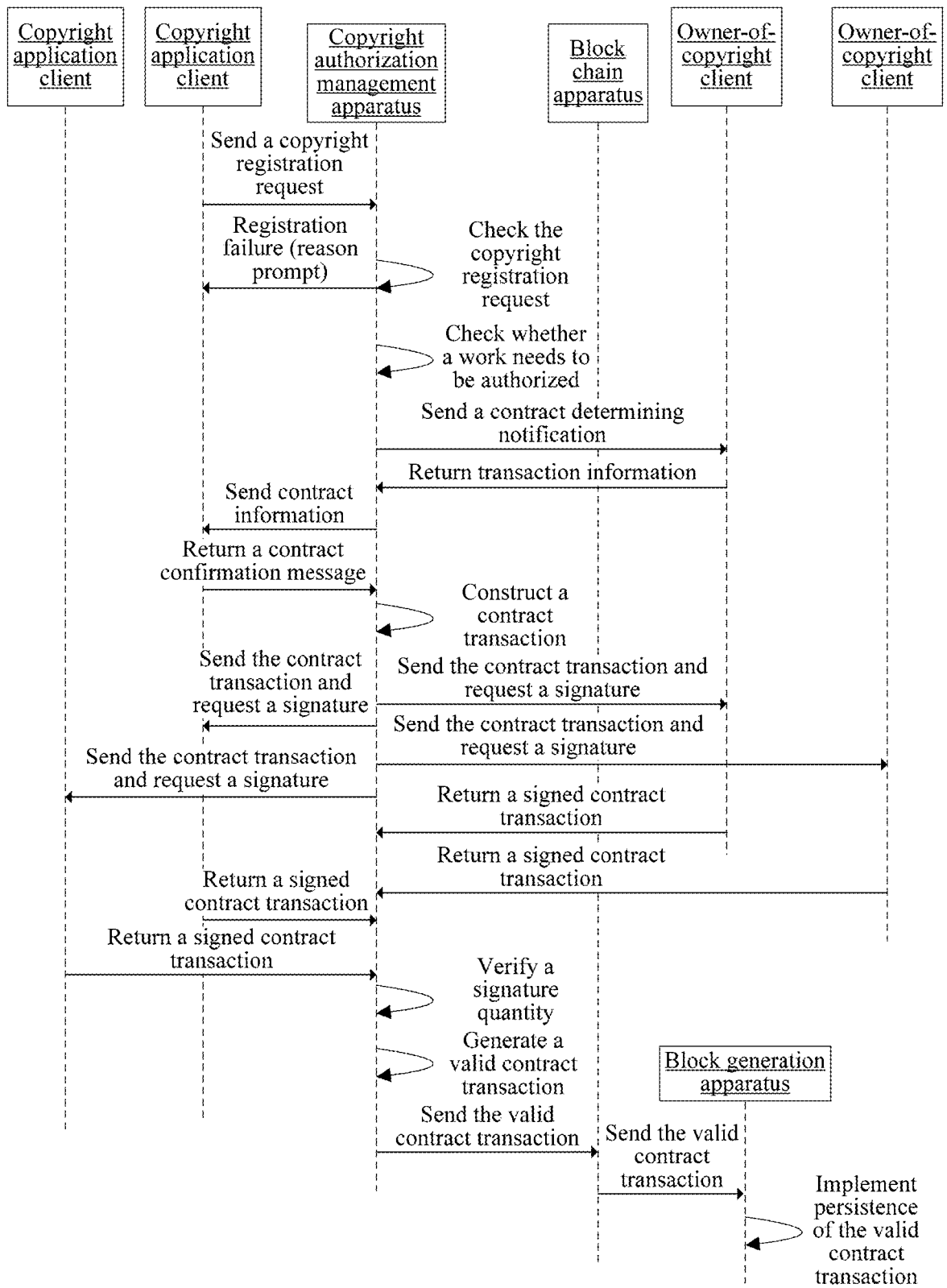
FIG. 8 is an example of an interaction flowchart including a contract confirmation step.

After receiving the transaction information, the copyright authorization management apparatus generates a contract transaction based on the transaction information. After the copyright authorization management apparatus receives the transaction information and before the copyright authorization management apparatus generates the contract transaction based on the transaction information, a step of requesting the copyright applicant to confirm a contract may be further included. FIG. 8 shows an example of an interaction flowchart including a contract confirmation step. As shown FIG. 8, after receiving the transaction information, the copyright authorization management apparatus obtains the contract information in the transaction information, and sends the contract information to the copyright application client. The copyright application client receives the contract information and displays a corresponding contract. After viewing the contract, if the copyright applicant agrees on the contract, the copyright applicant enters contract confirmation information on a screen of the copyright application client. For example, a contract confirmation button is set on the interface of the copyright application client; and if the copyright applicant clicks the contract confirmation button, contract confirmation is completed. Information about a click operation performed by the copyright applicant on the contract confirmation button may be used as the contract confirmation information. After obtaining the contract confirmation information, the copyright application client generates a contract confirmation message based on the contract confirmation information, and sends the contract confirmation message to the copyright authorization management apparatus. After receiving the contract confirmation message, the copyright authorization management apparatus generates the contract transaction based on the transaction information.

If the copyright applicant does not agree on the contract determined by the owner of copyright, the copyright applicant does not return the contract confirmation message to the copyright authorization management apparatus. Alternatively, the copyright application client provides a UI for entering contract negation information, and the copyright applicant enters the contract negation information by using the UI. After obtaining the contract negation information, the copyright application client generates a contract negation message, and sends the contract negation message to the copyright authorization management apparatus. After sending the contract information to the copyright application client, the copyright authorization management apparatus determines whether the contract confirmation message returned by the copyright application client is received, and if no contract confirmation message is received within a specific time period or the contract negation information is received, determines that no contract confirmation message is received and ends the authorization procedure; or after determining that no contract confirmation message is received, further determines whether a contract reselection message is received.

If the copyright applicant does not agree on the contract, the copyright applicant enters contract reselection information on the screen of the copyright application client. For example, a contract reselection UI is configured on the interface, and a contract reselection button, and a contract supplement or modification input box are configured on the contract reselection UI. The copyright applicant performs contract supplement or modification input in the input box, and clicks the contract reselection button, to complete contract reselection. The copyright application client obtains the contract reselection information by using the contract reselection UI, generates a contract reselection request based on the contract reselection information, and sends the contract reselection request to the copyright authorization management apparatus. If receiving no contract reselection message, the copyright authorization apparatus ends the authorization procedure. If receiving the contract reselection message, after receiving the contract reselection request, the copyright authorization management apparatus counts a quantity of contract reselection times, that is, counts a quantity of received contract reselection requests, and determines whether the quantity of times is less than or equal to a preset threshold. If the quantity of times is greater than the preset threshold, it indicates that there are an excessive quantity of contract reselection times, the copyright authorization management apparatus ends the authorization procedure, and may return an prompt message to the copyright application client to instruct the copyright applicant to initiate copyright application again, or log in to the discussion group again for discussion. If the quantity of times is less than or equal to the preset threshold, the copyright authorization management apparatus returns the contract reselection request to the owner-of-copyright client sending the transaction information. After receiving the contract reselection request, the owner-of-copyright client re-determines a contract. It should be noted that, contract confirmation and reselection need to be completed by one of copyright applicants, to prevent a confirmation or reselection conflict. The copyright applicant responsible for contract confirmation and reselection is specified in advance, and designation information is stored in the copyright applicant information.

Step S204: Obtain a valid contract transaction based on the transaction information, where the valid contract transaction includes signatures satisfying a preset-quantity rule.

Step S205: Implement persistence of the valid contract transaction in a block chain.

Figure 9:
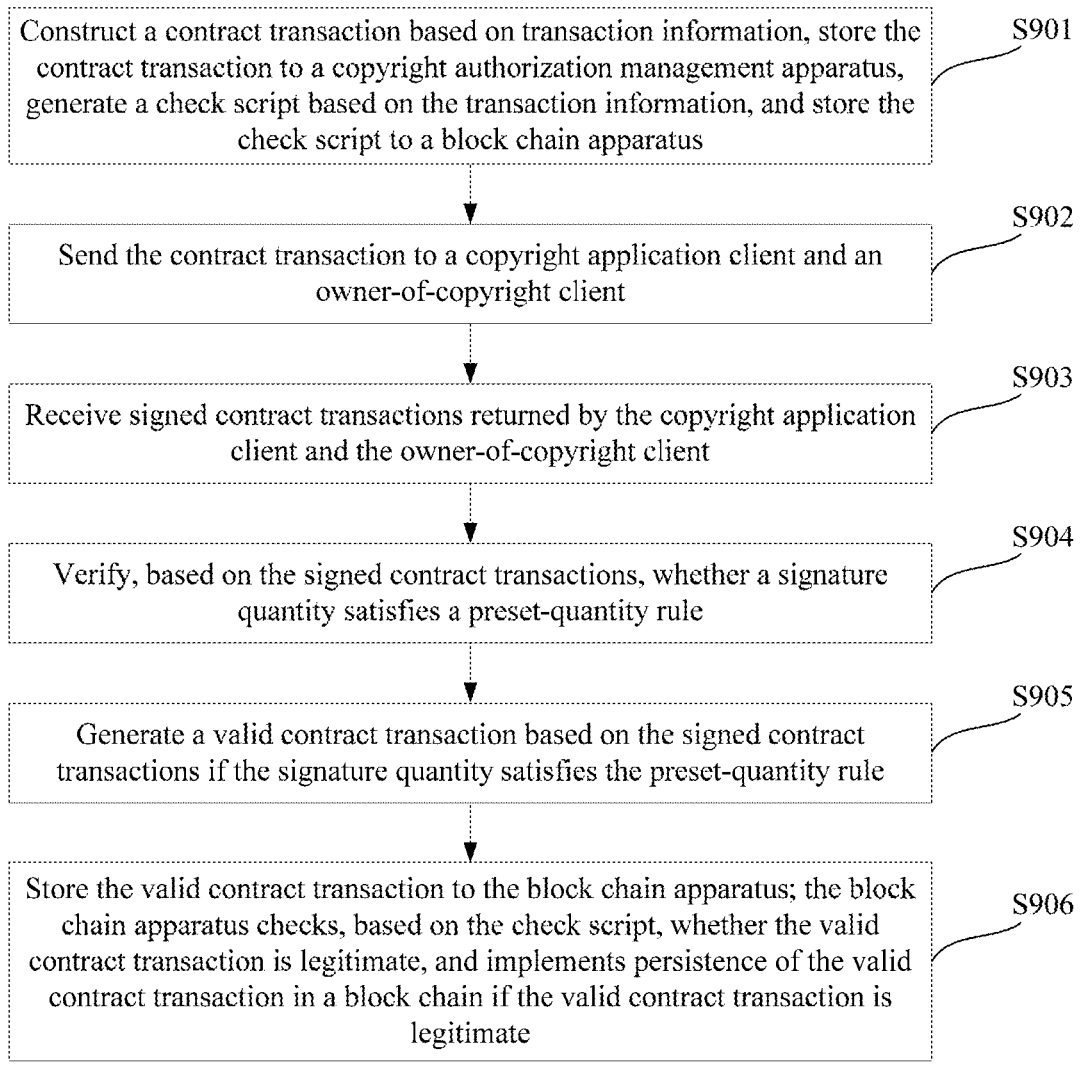
FIG. 9 is a schematic flowchart of an implementation of step S204 and step S205.

Step S204 and step S205 are a process of completing contract signing, implementing persistence of a signed contract for storage. FIG. 9 is a schematic flowchart of an implementation of step S204 and step S205. In a possible implementation, as shown in FIG. 9, step S204 and step S205 specifically include the following steps.

Step S901: Construct a contract transaction based on the transaction information, store the contract transaction to the copyright authorization management apparatus, generate a check script based on the transaction information, and store the check script to a block chain apparatus.

Figure 10:
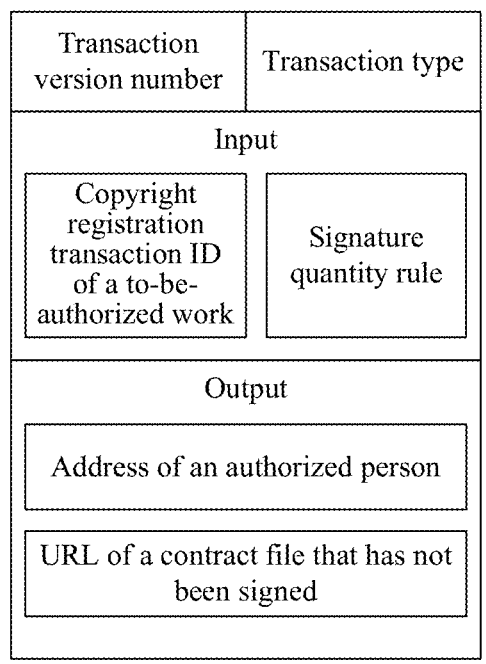
FIG. 10 shows an example of a data structure of a contract transaction.

After receiving the transaction information, the copyright authorization management apparatus parses out the contract information in the transaction information and other information that may be included in the contract information, and generates the contract transaction based on the transaction information. FIG. 10 shows an example of a data structure of a contract transaction. The data structure includes a transaction version number, a transaction type, input content (Input), and output content (Output). The input content includes a copyright registration transaction ID of a to-be-authorized work and a signature rule, and may further include signature requirement information specified by an owner of copyright, such as a signature validity period and a signature type. The signature quantity rule may be a signature quantity rule that is preset and stored in the copyright authorization management apparatus, or may be a signature quantity rule self-defined by an owner of copyright. The output content includes an address of an authorized person and a URL (Uniform Resource Locator) of a contract file that has not been signed. FIG. 10 is merely an example of a data structure of a contract transaction, but is not intended to limit the data structure of the contract transaction. The contract transaction may alternatively have another transaction data structure. After being generated, the contract transaction is stored in the copyright authorization management apparatus.

In addition, the copyright authorization management apparatus generates the check script based on the transaction information. The preset signature quantity rule or the signature quantity rule self-defined by the owner of copyright is configured in the check script and the check script is used to check, in the block chain apparatus after the valid contract transaction is obtained, whether a signature quantity in the valid contract transaction satisfies the signature quantity rule, so as to verify legality of the valid contract transaction. After generating the check script, the copyright authorization management apparatus stores the check script to the block chain apparatus.

Step S902: Send the contract transaction to a copyright application client and the owner-of-copyright client.

The copyright authorization management apparatus sends the generated contract transaction to the copyright application client and the owner-of-copyright client. In an implementation, the copyright authorization management apparatus sends the contract transaction to all copyright application clients and all owner-of-copyright clients. However, not all copyright applicants are qualified to make signatures, and not all owners of copyright are qualified to make signatures. Signature qualifications of a copyright applicant and an owner of copyright may be represented in advance by using a specified parameter, for example, a specified parameter qual. When qual of a copyright applicant or an owner of copyright is equal to 1, the copyright applicant or the owner of copyright has a signature qualification; when qual is equal to 0, the copyright applicant or the owner of copyright does not have a signature qualification, and the parameter is stored in copyright applicant information and owner-of-copyright information. Therefore, in another implementation, after generating the contract transaction, the copyright authorization management apparatus reads values of qual from copyright applicant information and owner-of-copyright information, to determine a copyright applicant and an owner of copyright who have signature qualifications; and sends the contract transaction to clients corresponding to the copyright applicant and the owner of copyright who have signature qualifications.

Step S903: Receive signed contract transactions returned by the copyright application client and the owner-of-copyright client.

Figure 11:
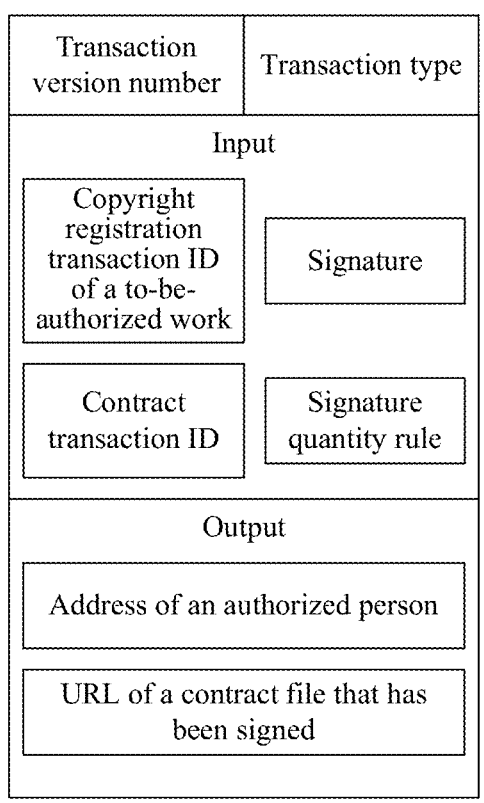
FIG. 11 shows an example of a data structure of a signed contract transaction.

After receiving the contract transaction, the copyright application client and the owner-of-copyright client display a preconfigured contract signature interface, or display an prompt message to remind the copyright applicant or the owner of copyright to make a signature. The copyright applicant or the owner of copyright enters the preconfigured contract signature interface to sign a contract. Information in the contract transaction such as a signature rule and a signature validity period may be displayed on the preconfigured contract signature interface, and a corresponding authorization file may be further obtained based on an authorization file URL in the contract transaction and then may be displayed, so as to provide a reference for a user. The signature is a unique and unalterable identity with a legal effect. When the owner of copyright or the copyright applicant is an individual, the signature may be a combination of an ID card number and an anti-counterfeiting digital personal seal; when the owner of copyright or the copyright applicant is a legal person, the signature may be a combination of an enterprise code and an anti-counterfeiting digital official seal. The copyright applicant or the owner of copyright makes reference to the information such as the contract signature rule, and enters the signature by using the preconfigured contract signature interface. After obtaining the entered signatures, the copyright application client and the owner-of-copyright client generate signed contract transactions based on the contract transaction and the signatures. FIG. 11 shows an example of a data structure of a signed contract transaction. The data structure includes a transaction version number, a transaction type, input content (Input), and output content (Output). The input content includes a contract transaction ID, a copyright registration transaction ID of a to-be-authorized work, a signature quantity rule, and a signature. The signature quantity rule may be a signature quantity rule that is preset and stored in the copyright authorization management apparatus, or may be a signature quantity rule self-defined by an owner of copyright. The output content includes an address of an authorized person and a URL (Uniform Resource Locator, uniform resource locator) of a contract file that has not been signed, or includes an address of an authorized person and a URL of a contract file that has been signed. The contract transaction ID is used to indicate a specific contract transaction used for generating a signed contract transaction. FIG. 11 is merely an example of a data structure of a signed contract transaction, but is not intended to limit the data structure of the signed contract transaction. The signed contract transaction may alternatively have another transaction data structure. After generating the signed contract transactions, the copyright application client and the owner-of-copyright client return the signed contract transactions to the copyright authorization management apparatus.

Step S904: Verify, based on the signed contract transactions, whether a signature quantity satisfies the preset-quantity rule.

After receiving the signed contract transactions sent by the copyright application client and the owner-of-copyright client, the copyright authorization management apparatus determines whether the signed contract transaction includes a signature. If the signed contract transaction does not include a signature, it indicates that an error occurs in the signed contract transaction, the copyright authorization management apparatus may send a signature error message to the copyright application client or the owner-of-copyright client corresponding to the signed contract transaction in which an error occurs. After receiving the signature error message, the copyright applicant or the owner of copyright makes a signature again. If a determining result is that the signed contract transaction includes a signature, the copyright authorization management apparatus counts a signature quantity, and verifies whether the signature quantity satisfies the preset-quantity rule. The verifying whether the signature quantity satisfies the preset-quantity rule may include the following steps:

(b1) Determine whether a total quantity of signatures of a first signed contract transaction group is greater than or equal to a preset first quantity, where the first signed contract transaction group is a signed contract transaction from the owner-of-copyright client.

(b2) Determine whether a total quantity of signatures of a second signed contract transaction group is greater than or equal to a preset second quantity, where the second signed contract transaction group is a signed contract transaction from the copyright application client.

(b3) Determine that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity.

(b1) to (b3) indicate a method for verifying, when the preset-quantity rule is an m-of-n rule, whether a signature quantity satisfies the preset-quantity rule. The m-of-n rule means that a total quantity is n, and statistics satisfy the rule if a statistical value of the statistics is greater than or equal to m, where $m \leq n$. In the present disclosure, a contract needs to be signed by both parties. Signatures of both the parties should satisfy the m-of-n rule. Signatures of an owner of copyright are used as one signature group and signatures of a copyright applicant are used as another signature group, and both signature quantities of the two signature groups should satisfy respective m-of-n rules. Specifically, the copyright authorization management apparatus uses the signed contract transaction from the owner-of-copyright client as the first signed contract transaction group; counts the total quantity of the signatures of the first signed contract transaction group, that is, counts a signature quantity of owners of copyright; and determines whether the total quantity of the signatures of the first signed contract transaction group is greater than or equal to the first quantity. The first quantity is m in an m-of-n owner-of-copyright signature rule, and n is a total quantity of owners of copyright or a total quantity of owners of copyright who have signature qualifications. If the total quantity of the signatures of the first signed contract transaction group is greater than or equal to the preset first quantity, the total quantity of the signatures of the first signed contract transaction group satisfies a requirement, that is, the signature quantity of the owners of copyright satisfies the rule. Likewise, the copyright authorization management apparatus uses the signed contract transaction from the copyright application client as the second signed contract transaction group; counts the total quantity of the signatures of the second signed contract transaction group, that is, counts a signature quantity of copyright applicants; and determines whether the total quantity of the signatures of the second signed contract transaction group is greater than or equal to the second quantity. The second quantity is m in an m-of-n copyright applicant signature rule, and n is a total quantity of copyright applicants or a total quantity of copyright applicants who have signature qualifications. If the total quantity of the signatures of the second signed contract transaction group is greater than or equal to the preset second quantity, the total quantity of the signatures of the second signed contract transaction group satisfies a requirement, that is, the signature quantity of the copyright applicants satisfies the rule. When both the signature quantity of the copyright applicants and the signature quantity of the owners of copyright satisfy respective rules, a total of the signature quantities satisfies the preset-quantity rule. "First" and "second" are merely used to distinguish between different groups, but are not intended to limit an order.

The preset-quantity rule may be preset and stored in the copyright authorization management apparatus. For the m-of-n rule, m may be set to a fixed value and is applicable to both the copyright applicants and the owners of copyright. That is, both the signature quantity of the copyright applicants and the signature quantity of the owners of copyright needs to be greater than or equal to a fixed quantity. However, such a rule is rather inflexible and strict. In another manner, a ratio m/n is fixedly set. That is, for any signature group, a ratio of a signature quantity to a quantity of signers needs to be greater than or equal to a fixed ratio. In this case, when n changes, m changes proportionally. Therefore, the rule is more flexible. In still another manner, for different groups, different ratios m/n are fixedly set. For example, for signatures of the owners of copyright, m/n is equal to 0.5; for signatures of the copyright applicants, m/n is equal to 0.7. The m-of-n rule is not a unique manner of the preset-quantity rule, and a person skilled in the art may alternatively select another preset-quantity rule.

The preset-quantity rule may alternatively be the signature quantity rule self-defined by the owner of copyright, as described above. The self-defined signature quantity rule may be included in the transaction information sent by the owner-of-copyright client to the copyright authorization management apparatus. After receiving the transaction information, the copyright authorization management apparatus extracts the self-defined signature quantity rule from the transaction information, and verifies, by using the self-defined signature quantity rule, whether the signature quantity satisfies the requirement.

Step S905: Generate the valid contract transaction based on the signed contract transactions if the signature quantity satisfies the preset-quantity rule.

Figure 12:
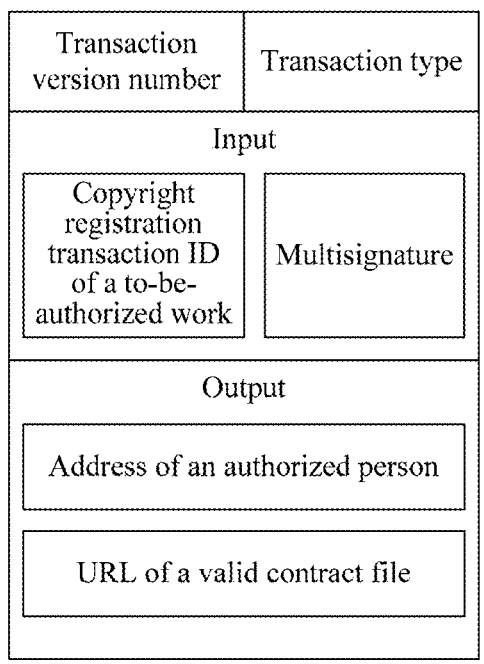
FIG. 12 shows an example of a data structure of a valid contract transaction.

If the signature quantity satisfies the preset-quantity rule, it indicates that the signature quantity satisfies a contract validation requirement. In this case, the copyright authorization management apparatus generates the valid contract transaction based on the received signed contract transactions. FIG. 12 shows an example of a data structure of a valid contract transaction. The data structure includes a transaction version number, a transaction type, input content (Input), and output content (Output). The input content includes a copyright registration transaction ID of a to-be-authorized work and a multisignature. The signature includes all signatures in signed contract transactions. The input content may further include a signature quantity rule. The output content includes an address of an authorized person and a URL of a valid contract file, that is, includes a URL of a signed contract file including all signatures, and may further include owner-of-copyright information in which a signature is included, copyright applicant information, and the like. FIG. 12 is merely an example of a data structure of a valid contract transaction, but is not intended to limit the data structure of the valid contract transaction. The valid contract transaction may alternatively have another transaction data structure. Alternatively, the copyright authorization management apparatus may extract all signatures of signed contract transactions; modifies signatures in one signed contract transaction, for example, a latest signed contract transaction, to all extracted signatures, or adds extracted signatures of other signed contract transactions to the signatures of the signed contract transactions; and modifies a contract file URL in the output content to the URL of the valid contract file. The valid contract file is generated based on a contract file that has not been signed and all the signatures. The contract file and the valid contract file are stored in the copyright authorization management apparatus or stored by the copyright authorization management apparatus in another file database. The contract file URL and the URL of the valid contract file are respectively links of the contract file and the valid contract file. Alternatively, the contract file and the valid contract file may be directly stored respectively in the contract transaction and the valid contract transaction. However, this causes larger data volumes of the contract transaction and the valid contract transaction.

Step S906: Store the valid contract transaction to the block chain apparatus; the block chain apparatus checks, based on the check script, whether the valid contract transaction is legitimate, and sends the valid contract transaction to a block generation apparatus if the valid contract transaction is legitimate.

After obtaining the valid contract transaction, the copyright authorization management apparatus stores the valid contract transaction to the block chain apparatus. The block chain apparatus checks, based on the previously stored check script, whether the signature quantity in the valid contract transaction satisfies the preset-quantity rule, to check whether an error occurs in the signatures of the valid contract transaction; and if there is no error, determines that the valid contract transaction is legitimate, otherwise, determines that the valid contract transaction is not legitimate. Checking legality of the valid contract transaction by the block chain apparatus may further include another conventional process of checking legality of the transaction by the block chain apparatus. If the valid contract transaction is legitimate, the block chain apparatus sends the contract transaction to the block generation apparatus. Otherwise, the block chain apparatus discards the valid contract transaction, and may send valid-contract-transaction error information to the copyright authorization management apparatus. After receiving the error information, the copyright authorization management apparatus re-generates a valid contract transaction.

Step S907: The block generation apparatus receives the valid contract transaction sent by the block chain apparatus, and implements persistence of the valid contract transaction in the block chain.

After receiving the valid contract transaction, the block generation apparatus implements persistence of the valid contract transaction in the block chain. The block generation apparatus is a block chain apparatus that obtains record permission through contention.

Figure 13:
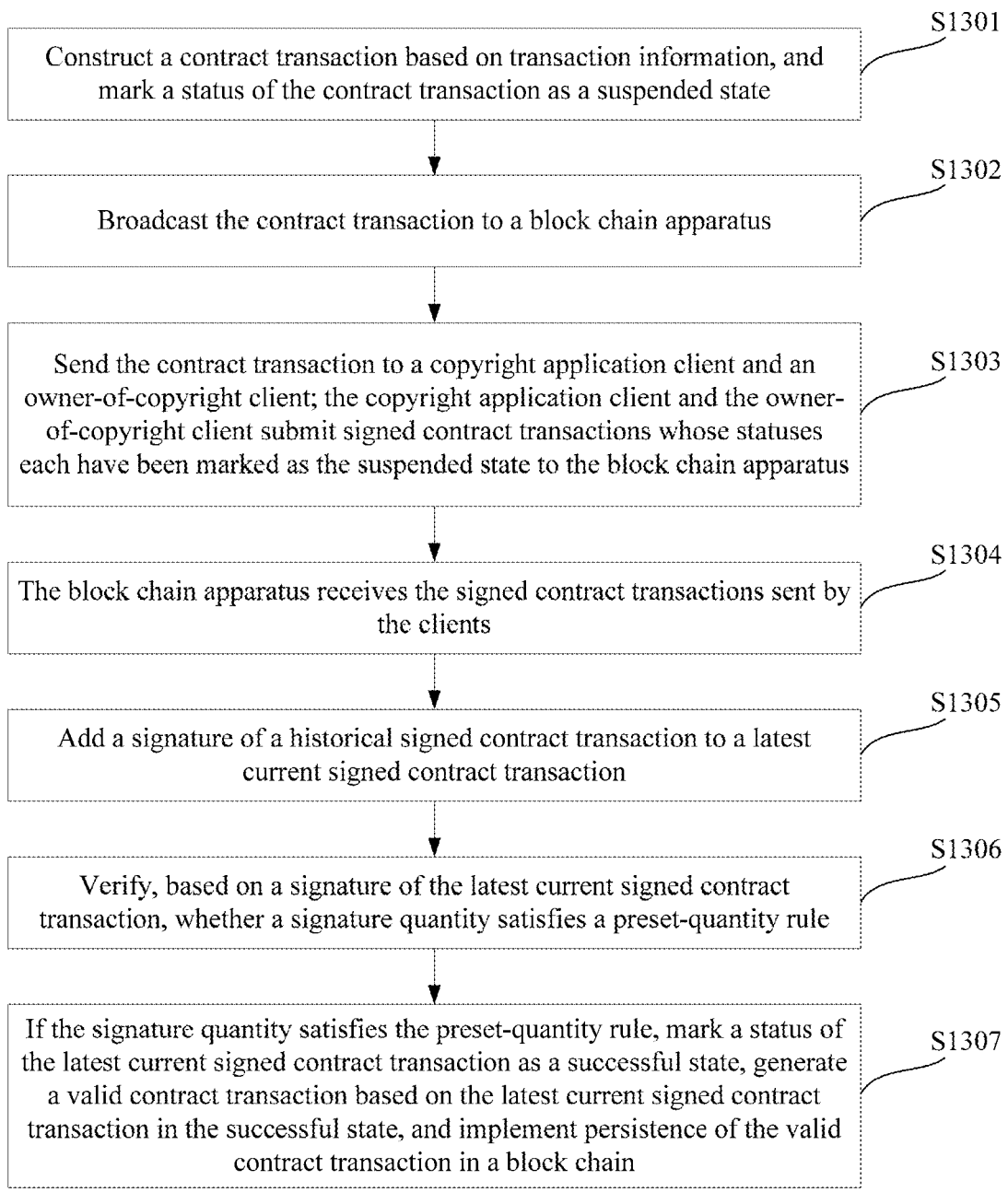
FIG. 13 is a schematic flowchart of another implementation of step S204 and step S205.

FIG. 13 is a schematic flowchart of another implementation of step S204 and step S205. In another possible implementation, as shown in FIG. 13, step S204 and step S205 specifically include the following steps.

Step S1301: Construct a contract transaction based on the transaction information, and mark a status of the contract transaction as a suspended state.

Step S1302: Broadcast the contract transaction to a block chain apparatus.

Figure 14A:
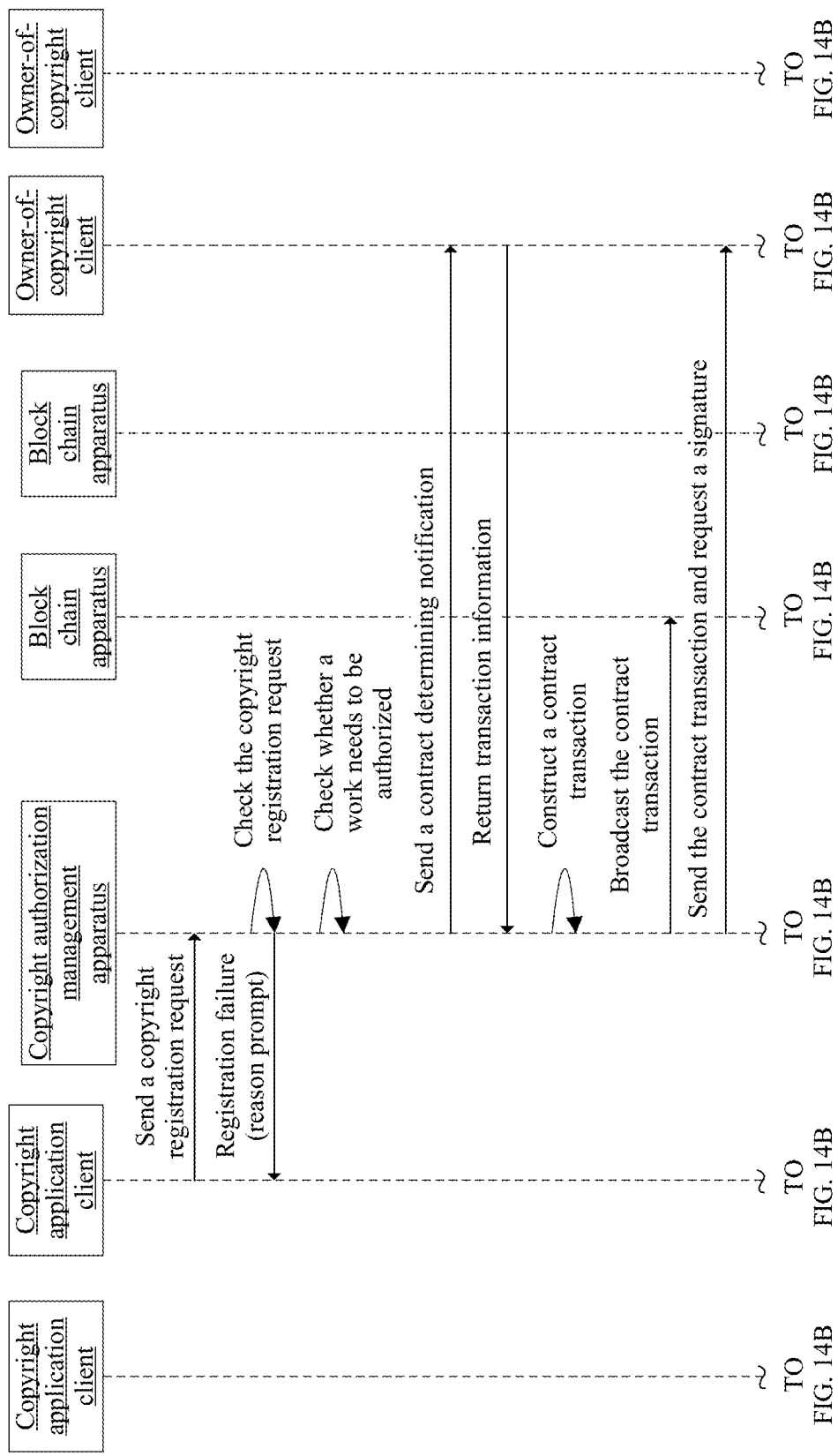
FIG. 14A and FIG. 14B show an example of a data structure of a valid contract transaction.
Figure 14B:
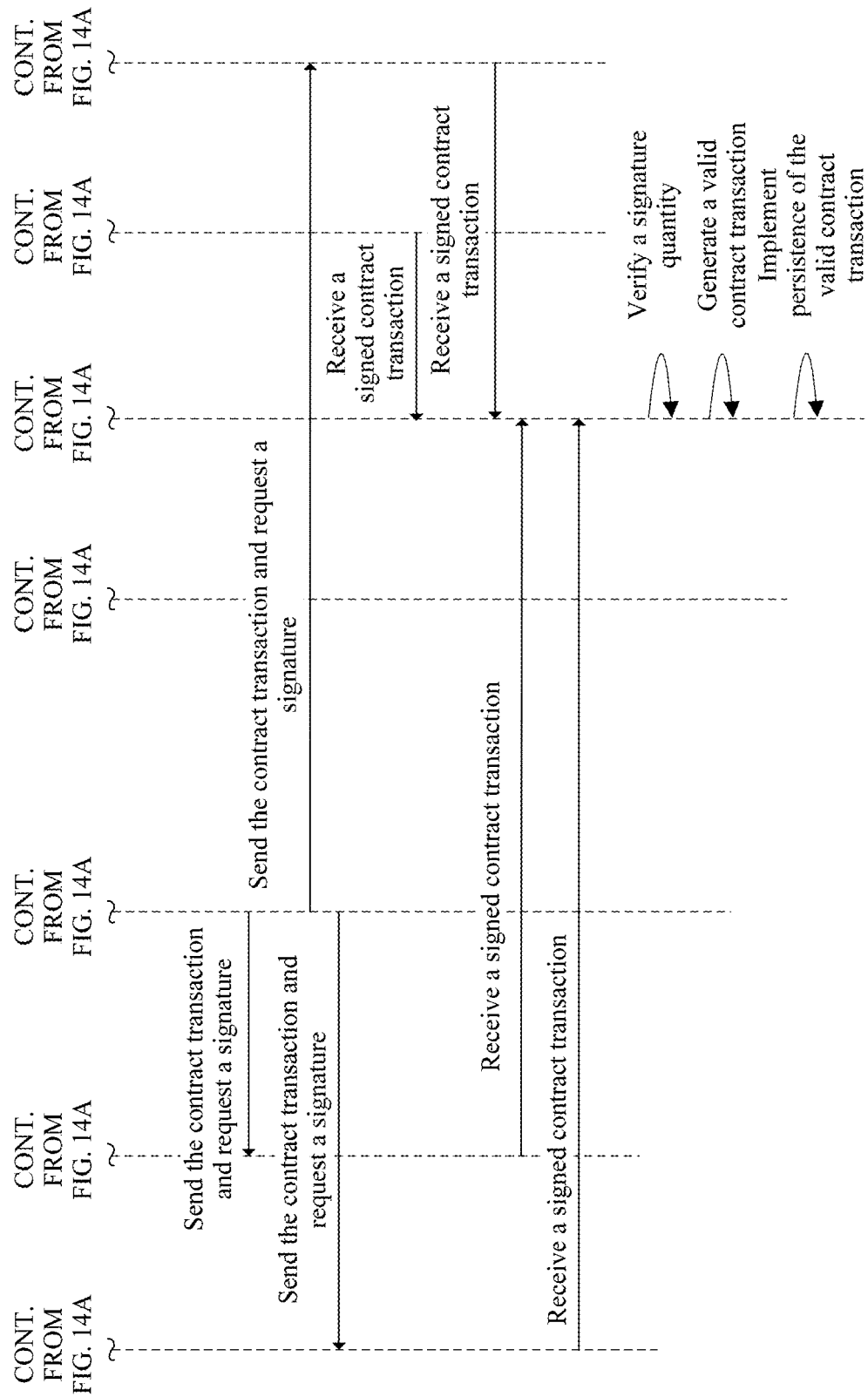

A process of constructing, by the copyright authorization management apparatus, a contract transaction based on the transaction information is the same as that of step S907. After construction of the contract transaction is completed, the status of the contract transaction is marked as the suspended state. A status item is added to output content of the contract transaction, and the status item is set to the suspended state. In this way, marking the status of the contract transaction as the suspended state can be completed. FIG. 14A and FIG. 14B show an example of an interaction flowchart based on step S1301 and S1307. As shown in FIG. 14A and FIG. 14B, the copyright authorization management apparatus broadcasts the contract transaction in the suspended state to the block chain apparatus. Block chain apparatuses herein are all block chain apparatuses in a block chain network.

Step S1303: Send the contract transaction to a copyright application client and the owner-of-copyright client; the copyright application client and the owner-of-copyright client submit signed contract transactions whose statuses each have been marked as the suspended state to the block chain apparatus.

The copyright authorization management apparatus sends the contract transaction in the suspended state to the copyright application client and the owner-of-copyright client. After receiving the contract transition, the copyright application client and the owner-of-copyright client respectively obtain a signature entered by a copyright applicant and a signature entered by an owner of copyright, and generate signed contract transactions. A method for generating signed contract transactions by the copyright application client and the owner-of-copyright client is similar to that described in step S903. A difference only lies in that the status of the signed contract transaction is marked as the suspended state. Marking the status of the signed contract transaction as the suspended state may be: adding a status item to output content of the signed contract transaction and setting the status item to the suspended state. After generating the signed contract transactions, the copyright application client and the owner-of-copyright client submit the signed contract transactions to the block chain apparatus. For a copyright application client or an owner-of-copyright client, the block chain apparatus may be any block chain apparatus in the block chain network. After receiving the signed contract transaction, the block chain apparatus stores the signed contract transaction to storage space of the block chain apparatus.

Step S1304: The block chain apparatus receives the signed contract transactions sent by the clients, and sends the signed contract transactions to a block generation apparatus.

Step S1305: The block generation apparatus receives the signed contract transactions sent by the block chain apparatus, and adds a signature of a historical signed contract transaction to a latest current signed contract transaction, where the historical signed contract transaction and the latest current signed contract transaction originate from a same contract transaction, and the block generation apparatus is a block chain apparatus configured to generate a block.

Step S1306: Verify, based on a signature of the latest current signed contract transaction, whether a signature quantity satisfies the preset-quantity rule.

Step S1307: If the signature quantity satisfies the preset-quantity rule, mark a status of the latest current signed contract transaction as a successful state, generate the valid contract transaction based on the latest current signed contract transaction in the successful state, and implement persistence of the valid contract transaction in the block chain.

After the block generation apparatus, that is, a block generation node, obtains record permission through contention, another block chain apparatus sends a received signed contract transaction to the block generation apparatus; and the block generation apparatus receives the signed contract transaction sent by the another block chain apparatus, to obtain signed contract transactions stored in all block chain apparatuses. The obtained signed contract transaction also includes a signed contract transaction originally stored in the block generation apparatus. A signed contract transaction stored in the block chain apparatus at a time point that is closest to a current time point is the latest current signed contract transaction, and a signed contract transaction stored prior to the latest current signed contract transaction is the historical signed contract transaction. The block generation apparatus extracts a signature from the historical signed contract transaction, and adds the signature to the latest current signed contract transaction. The historical signed contract transaction and the latest current signed contract transaction originate from a same contract transaction. The block generation apparatus may determine, based on contract transaction IDs in input content of signed contract transactions, whether the signed contract transactions originate from a same contract transaction.

The block generation apparatus may count a signature quantity of the latest current signed contract transaction to which the signature is added, and verify whether the signature quantity satisfies the preset-quantity rule. The verification process is the same as those in steps (b1) to (b3). Alternatively, the block generation apparatus may count a signature quantity of the obtained signed contract transactions before adding the signature, and verify whether the signature quantity satisfies the preset-quantity rule.

Figure 15:
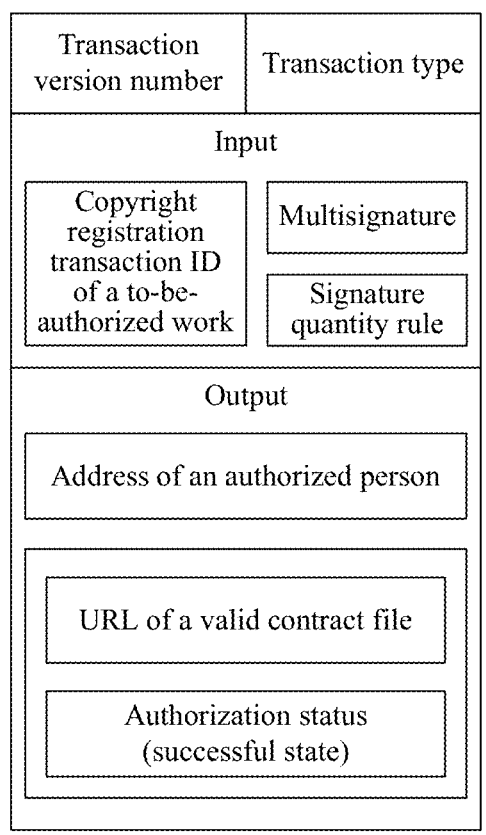
FIG. 15 shows an example of a data structure of a copyright registration transaction for a derivative work.

If the signature quantity satisfies the preset-quantity rule, the block generation apparatus marks the status of the latest current signed contract transaction as the successful state. The status of the signed contract transaction may be marked as the successful state by modifying a status item of the signed contract transaction to the successful state. Then, the block generation apparatus directly uses the latest current signed contract transaction in the successful state as the valid contract transaction, and implements persistence of the valid contract transaction in the block chain. In this case, a data structure of the valid contract transaction is the same as that of the latest current signed contract transaction. Alternatively, the block generation apparatus generates valid contract transactions of different data structures based on the latest current signed contract transaction in the successful state. FIG. 15 shows an example of a data structure of a valid contract transaction. The data structure includes a transaction version number, a transaction type, input content (Input), and output content (Output). The input content includes a copyright registration transaction ID of a to-be-authorized work and a multisignature. The signature includes all signatures in signed contract transactions. The input content may further include a signature quantity rule. The output content includes an address of an authorized person and a URL of a valid contract file, that is, includes a URL of a signed contract file including all signatures and a marked status (a successful state), and may further include copyright applicant information in which a signature is included, owner-of-copyright information, and the like. FIG. 15 is merely an example of a data structure of a valid contract transaction, but is not intended to limit the data structure of the valid contract transaction. The block generation apparatus implements persistence of the generated valid contract transaction in the block chain.

If the signature quantity does not satisfy the preset-quantity rule, the block generation apparatus does not generate the valid contract transaction, and a next block generation apparatus that obtains record permission through contention performs step S1304 to step S1307.

Figure 16:
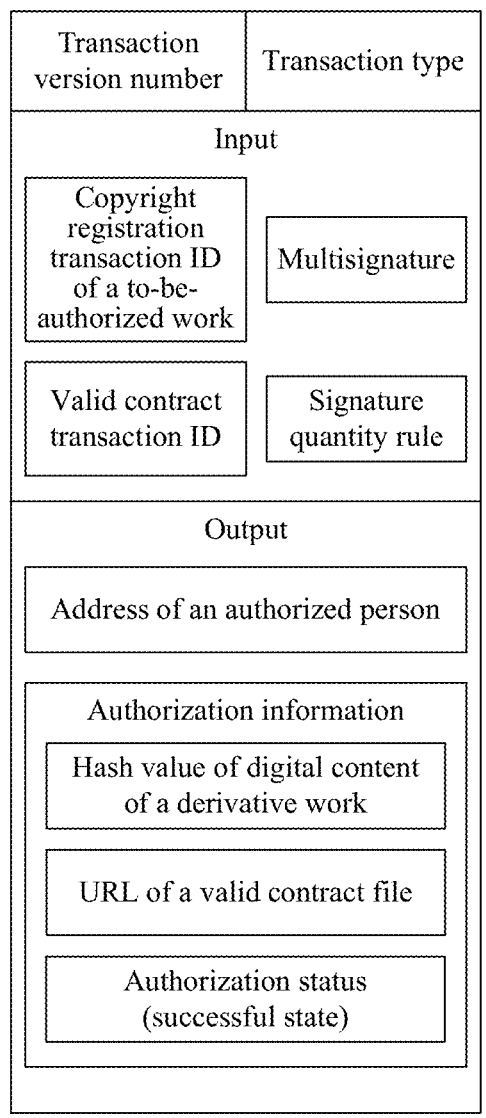
FIG. 16 shows an example of an interaction flowchart of step S1301 to step S1307.

After the block generation apparatus implements persistence of the valid contract transaction in the block chain, an author of a derivative work can further perform copyright registration of the derivative work. Output content of a copyright registration transaction for the derivative work includes authorization related information of a cited work. FIG. 16 shows an example of a data structure of a copyright registration transaction for a derivative work. As shown in FIG. 16, the data structure includes a transaction version number, a transaction type, input content (Input), and output content (Output). The input content includes a copyright registration transaction ID of a to-be-authorized work, a valid contract transaction ID, a signature of an authorization contract, and may further include a signature quantity rule. The output content includes an address of an authorized person and authorization information, where the authorization information includes a URL of a valid contract file, a marked status (a successful state), and a hash value of digital content of the derivative work. It should be noted that, there may be a plurality of cited works for the derivative work. Specific to each cited work, authorization needs to be performed and an authorization procedure needs to be completed. Authorization procedures specific to the cited works are the same.

According to the copyright authorization management method provided in the present disclosure, online contract signing is implemented and persistence of the valid contract is implemented in the block chain. This improves copyright authorization efficiency and convenience, and ensures that the valid contract is unique, trustworthy, and unalterable.

Figure 17:
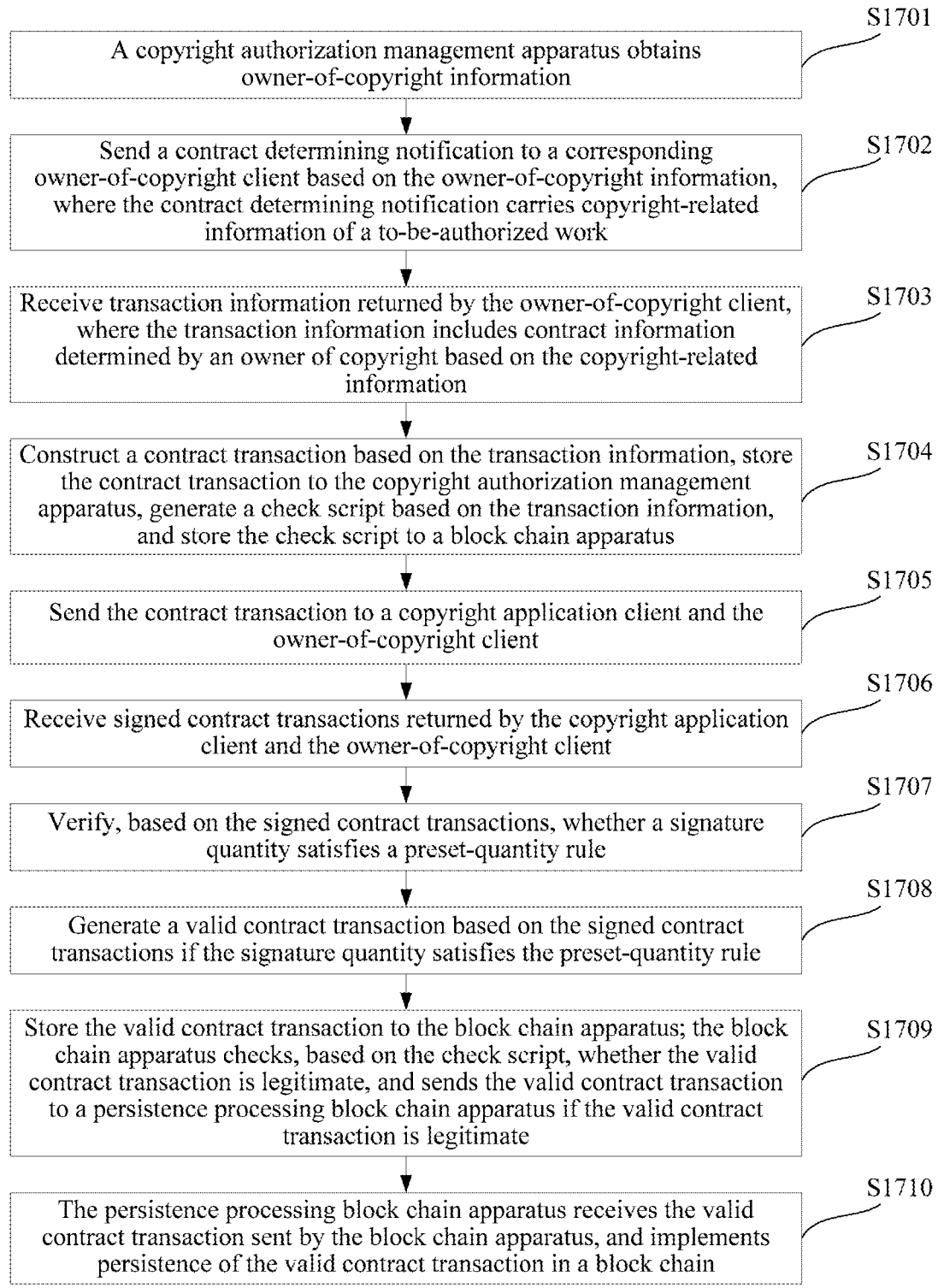
FIG. 17 is a schematic flowchart of another copyright authorization management method.

FIG. 17 is a schematic flowchart of another copyright authorization management method. As shown in FIG. 17, the method includes the following steps:

Step S1701: A copyright authorization management apparatus obtains owner-of-copyright information.

Step S1702: Send a contract determining notification to a corresponding owner-of-copyright client based on the owner-of-copyright information, where the contract determining notification carries copyright-related information of a to-be-authorized work.

Step S1703: Receive transaction information returned by the owner-of-copyright client, where the transaction information includes contract information determined by an owner of copyright based on the copyright-related information.

Step S1704: Construct a contract transaction based on the transaction information, store the contract transaction to the copyright authorization management apparatus, generate a check script based on the transaction information, and store the check script to a block chain apparatus.

Step S1705: Send the contract transaction to a copyright application client and the owner-of-copyright client.

Step S1706: Receive signed contract transactions returned by the copyright application client and the owner-of-copyright client.

Step S1707: Verify, based on the signed contract transactions, whether a signature quantity satisfies a preset-quantity rule.

Step S1708: Generate a valid contract transaction based on the signed contract transactions if the signature quantity satisfies the preset-quantity rule.

Step S1709: Store the valid contract transaction to the block chain apparatus; the block chain apparatus checks, based on the check script, whether the valid contract transaction is legitimate, and sends the valid contract transaction to a block generation apparatus if the valid contract transaction is legitimate.

Step S1710: The block generation apparatus receives the valid contract transaction sent by the block chain apparatus, and implements persistence of the valid contract transaction in a block chain.

Step S1701 to step S1703 are the same as step S201 to step S203, and step S1704 to step S1710 are the same as step S901 to step S907.

Figure 18:
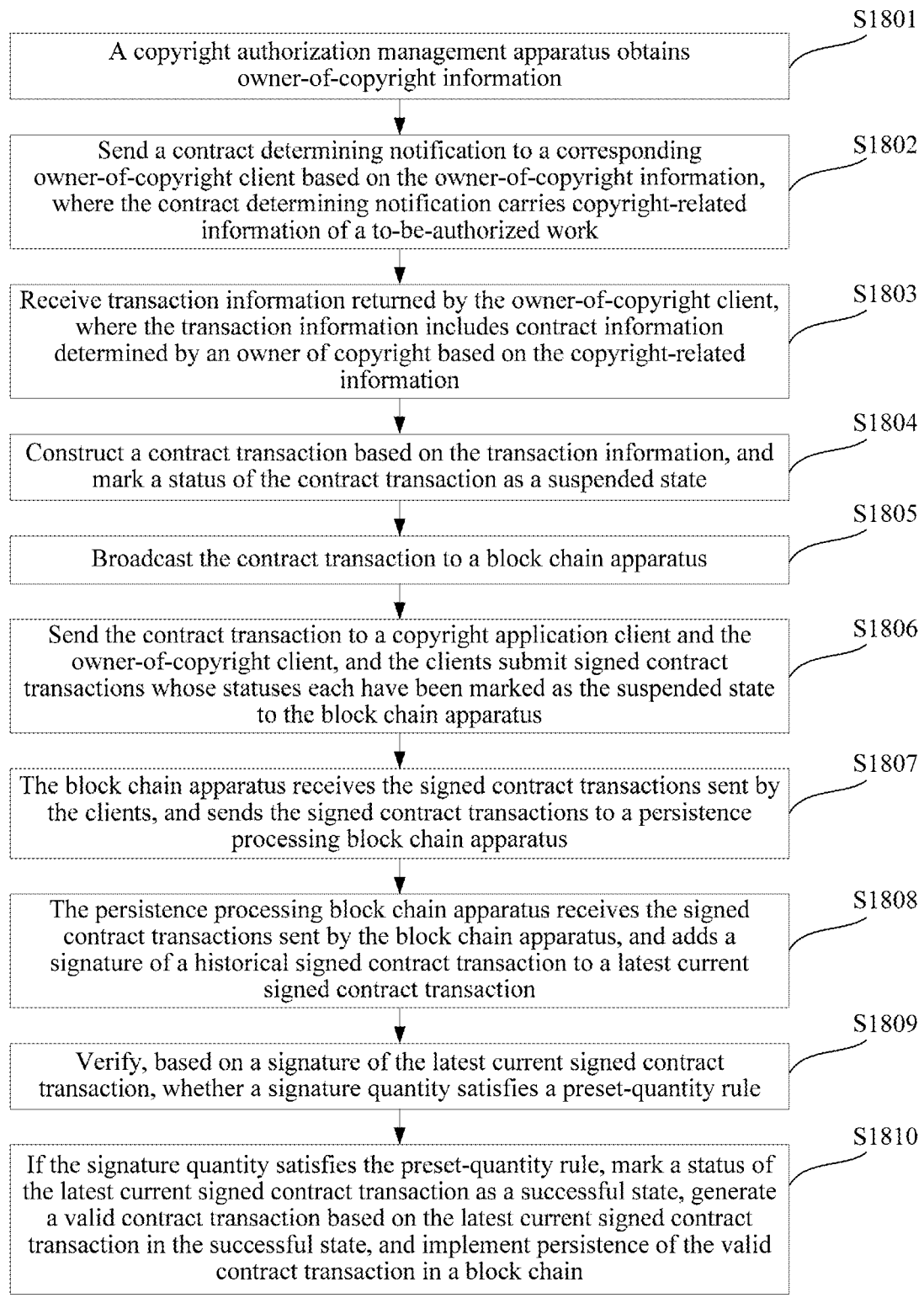
FIG. 18 is a schematic flowchart of still another copyright authorization management method.

FIG. 18 is a schematic flowchart of still another copyright authorization management method. As shown in FIG. 18, the method includes the following steps:

Step S1801: A copyright authorization management apparatus obtains owner-of-copyright information.

Step S1802: Send a contract determining notification to a corresponding owner-of-copyright client based on the owner-of-copyright information, where the contract determining notification carries copyright-related information of a to-be-authorized work.

Step S1803: Receive transaction information returned by the owner-of-copyright client, where the transaction information includes contract information determined by an owner of copyright based on the copyright-related information.

Step S1804: Construct a contract transaction based on the transaction information, and mark a status of the contract transaction as a suspended state.

Step S1805: Broadcast the contract transaction to a block chain apparatus.

Step S1806: Send the contract transaction to a copyright application client and the owner-of-copyright client, and the clients submit signed contract transactions whose statuses each have been marked as the suspended state to the block chain apparatus.

Step S1807: The block chain apparatus receives the signed contract transactions sent by the clients, and sends the signed contract transactions to a block generation apparatus.

Step S1808: The block generation apparatus receives the signed contract transactions sent by the block chain apparatus, and adds a signature of a historical signed contract transaction to a latest current signed contract transaction, where the historical signed contract transaction and the latest current signed contract transaction originate from a same contract transaction.

Step S1809: Verify, based on a signature of the latest current signed contract transaction, whether a signature quantity satisfies a preset-quantity rule.

Step S1810: If the signature quantity satisfies the preset-quantity rule, mark a status of the latest current signed contract transaction as a successful state, generate a valid contract transaction based on the latest current signed contract transaction in the successful state, and implement persistence of the valid contract transaction in a block chain.

Step S1801 to step S1803 are the same as step S201 to step S203, and step S1804 to step S1810 are the same as step S1301 to step S1307.

Corresponding to the copyright authorization management method shown in FIG. 17, the present disclosure provides another copyright authorization management system. The copyright authorization management system includes:

a copyright authorization management apparatus, a block chain apparatus, and a block generation apparatus, where the copyright authorization management apparatus is configured to:

obtain owner-of-copyright information;

send a contract determining notification to a corresponding owner-of-copyright client based on the owner-of-copyright information, where the contract determining notification carries copyright application-related information of a to-be-authorized work;

receive transaction information returned by the owner-of-copyright client, where the transaction information includes contract information determined by an owner of copyright based on the copyright application-related information;

construct a contract transaction based on the transaction information, store the contract transaction to the copyright authorization management apparatus, generate a check script based on the transaction information, and store the check script to the block chain apparatus;

send the contract transaction to a copyright application client and the owner-of-copyright client;

receive signed contract transactions returned by the copyright application client and the owner-of-copyright client;

verify, based on the signed contract transactions, whether a signature quantity satisfies a preset-quantity rule;

generate a valid contract transaction based on the signed contract transactions if the signature quantity satisfies the preset-quantity rule; and store the valid contract transaction to the block chain apparatus; the block chain apparatus checks, based on the check script, whether the valid contract transaction is legitimate, and sends the valid contract transaction to the block generation apparatus if the valid contract transaction is legitimate; and the block generation apparatus receives the valid contract transaction sent by the block chain apparatus, and implements persistence of the valid contract transaction in a block chain.

The contract transaction includes a copyright transaction ID and an authorization contract file URL of the to-be-authorized work.

Optionally, when verifying whether the signature quantity satisfies the preset-quantity rule, the copyright authorization management apparatus is specifically configured to:

determine whether a total quantity of signatures of a first signed contract transaction group is greater than or equal to a preset first quantity, where the first signed contract transaction group is a signed contract transaction from the owner-of-copyright client;

determine whether a total quantity of signatures of a second signed contract transaction group is greater than or equal to a preset second quantity, where the second signed contract transaction group is a signed contract transaction from the copyright application client; and determine that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity.

Optionally, when obtaining the owner-of-copyright information, the copyright authorization management apparatus is specifically configured to:

receive a copyright authorization request sent by the copyright application client; and obtain the corresponding owner-of-copyright information based on the copyright authorization request.

Optionally, when obtaining the owner-of-copyright information, the copyright authorization management apparatus is specifically configured to:

receive a copyright registration request sent by the copyright application client, where the copyright registration request includes information about a cited work;

check the copyright registration request; and if check of the copyright registration request succeeds, query, based on the information about the cited work, whether derivation on the cited work is disallowed, and if derivation on the cited work is disallowed, send a registration failure prompt message to the copyright application client and end copyright registration; or if derivation on the cited work is allowed, query, based on the information about the cited work, whether derivation is to be performed on the cited work according to a preset clause, and if derivation is to be performed on the cited work according to a preset clause, send the preset clause to the copyright application client, otherwise, obtain the owner-of-copyright information based on the information about the cited work.

Optionally, when sending the contract determining notification to the corresponding owner-of-copyright client based on the owner-of-copyright information, the copyright authorization management apparatus is specifically configured to:

create a discussion group; and send a group discussion invitation to the corresponding owner-of-copyright client based on the owner-of-copyright information, send a group discussion invitation to the copyright application client, and use the group discussion invitation as the contract determining notification.

Optionally, after receiving the transaction information returned by the owner-of-copyright client and before obtaining the valid contract transaction based on the transaction information, the copyright authorization management apparatus is further configured to:

send the contract information to the copyright application client;

determine whether a contract confirmation message sent by the copyright application client is received; and if the contract confirmation message is received, obtain the valid contract transaction based on the transaction information, otherwise, end a copyright authorization procedure.

Optionally, after receiving the transaction information returned by the owner-of-copyright client and before obtaining the valid contract transaction based on the transaction information, the copyright authorization management apparatus is further configured to:

send the contract information to the copyright application client;

determine whether a contract confirmation message sent by the copyright application client is received; and if the contract confirmation message is received, obtain the valid contract transaction based on the transaction information, otherwise, determine whether a contract reselection request sent by the copyright application client is received;

if the contract reselection request sent by the copyright application client is received, determine whether a quantity of contract reselection requests is less than a preset threshold, or if the contract reselection request sent by the copyright application client is not received, end a copyright authorization procedure; and if the quantity of contract reselection requests is less than the threshold, send the contract reselection request to the owner-of-copyright client and return to the step of receiving transaction information returned by the owner-of-copyright client, otherwise, send a new-application message to the copyright application client.

Corresponding to the copyright authorization management method shown in FIG. 18, the present disclosure provides still another copyright authorization management system. The copyright authorization management system includes:

a copyright authorization management apparatus, a block chain apparatus, and a block generation apparatus, where the copyright authorization management apparatus is configured to:

obtain owner-of-copyright information;

send a contract determining notification to a corresponding owner-of-copyright client based on the owner-of-copyright information, where the contract determining notification carries copyright application-related information of a to-be-authorized work;

receive transaction information returned by the owner-of-copyright client, where the transaction information includes contract information determined by an owner of copyright based on the copyright application-related information; construct a contract transaction based on the transaction information; and mark a status of the contract transaction as a suspended state;

broadcast the contract transaction to the block chain apparatus;

send the contract transaction to a copyright application client and the owner-of-copyright client, and the clients submit signed contract transactions whose statuses each have been marked as the suspended state to the block chain apparatus;

the block chain apparatus is configured to: receive the signed contract transactions submitted by the clients, and send the signed contract transactions to the block generation apparatus; and the block generation apparatus is configured to:

receive the signed contract transactions sent by the block chain apparatus, and add a signature of a historical signed contract transaction to a latest current signed contract transaction, where the historical signed contract transaction and the latest current signed contract transaction originate from a same contract transaction;

verify, based on a signature of the latest current signed contract transaction, whether a signature quantity satisfies a preset-quantity rule; and if the signature quantity satisfies the preset-quantity rule, mark a status of the latest current signed contract transaction as a successful state, generate a valid contract transaction based on the latest current signed contract transaction in the successful state, and implement persistence of the valid contract transaction in a block chain.

The contract transaction includes a copyright transaction ID and an authorization contract file URL of the to-be-authorized work.

Optionally, when verifying whether the signature quantity satisfies the preset-quantity rule, the block generation apparatus is specifically configured to:

determine whether a total quantity of signatures of a first signed contract transaction group is greater than or equal to a preset first quantity, where the first signed contract transaction group is a signed contract transaction from the owner-of-copyright client;

determine whether a total quantity of signatures of a second signed contract transaction group is greater than or equal to a preset second quantity, where the second signed contract transaction group is a signed contract transaction from the copyright application client; and determine that the signature quantity satisfies the preset-quantity rule if the total quantity of the signatures of the first signed contract transaction group is greater than or equal to the first quantity and the total quantity of the signatures of the second signed contract transaction group is greater than or equal to the second quantity.

Optionally, when obtaining the owner-of-copyright information, the copyright authorization management apparatus is specifically configured to:

receive a copyright authorization request sent by the copyright application client; and obtain the corresponding owner-of-copyright information based on the copyright authorization request.

Optionally, when obtaining the owner-of-copyright information, the copyright authorization management apparatus is specifically configured to:

receive a copyright registration request sent by the copyright application client, where the copyright registration request includes information about a cited work;

check the copyright registration request; and if check of the copyright registration request succeeds, query, based on the information about the cited work, whether derivation on the cited work is disallowed, and if derivation on the cited work is disallowed, send a registration failure prompt message to the copyright application client and end copyright registration; or if derivation on the cited work is allowed, query, based on the information about the cited work, whether derivation is to be performed on the cited work according to a preset clause, and if derivation is to be performed on the cited work according to a preset clause, send the preset clause to the copyright application client, otherwise, obtain the owner-of-copyright information based on the information about the cited work.

Optionally, when sending the contract determining notification to the corresponding owner-of-copyright client based on the owner-of-copyright information, the copyright authorization management apparatus is specifically configured to:

create a discussion group; and send a group discussion invitation to the corresponding owner-of-copyright client based on the owner-of-copyright information, send a group discussion invitation to the copyright application client, and use the group discussion invitation as the contract determining notification.

Optionally, after receiving the transaction information returned by the owner-of-copyright client and before obtaining the valid contract transaction based on the transaction information, the copyright authorization management apparatus is further configured to:

send the contract information to the copyright application client;

determine whether a contract confirmation message sent by the copyright application client is received; and if the contract confirmation message is received, obtain the valid contract transaction based on the transaction information, otherwise, end a copyright authorization procedure.

Optionally, after receiving the transaction information returned by the owner-of-copyright client and before obtaining the valid contract transaction based on the transaction information, the copyright authorization management apparatus is further configured to:

send the contract information to the copyright application client;

determine whether a contract confirmation message sent by the copyright application client is received; and if the contract confirmation message is received, obtain the valid contract transaction based on the transaction information, otherwise, determine whether a contract reselection request sent by the copyright application client is received;

if the contract reselection request sent by the copyright application client is received, determine whether a quantity of contract reselection requests is less than a preset threshold, or if the contract reselection request sent by the copyright application client is not received, end a copyright authorization procedure; and if the quantity of contract reselection requests is less than the threshold, send the contract reselection request to the owner-of-copyright client and return to the step of receiving transaction information returned by the owner-of-copyright client.

Figure 19:
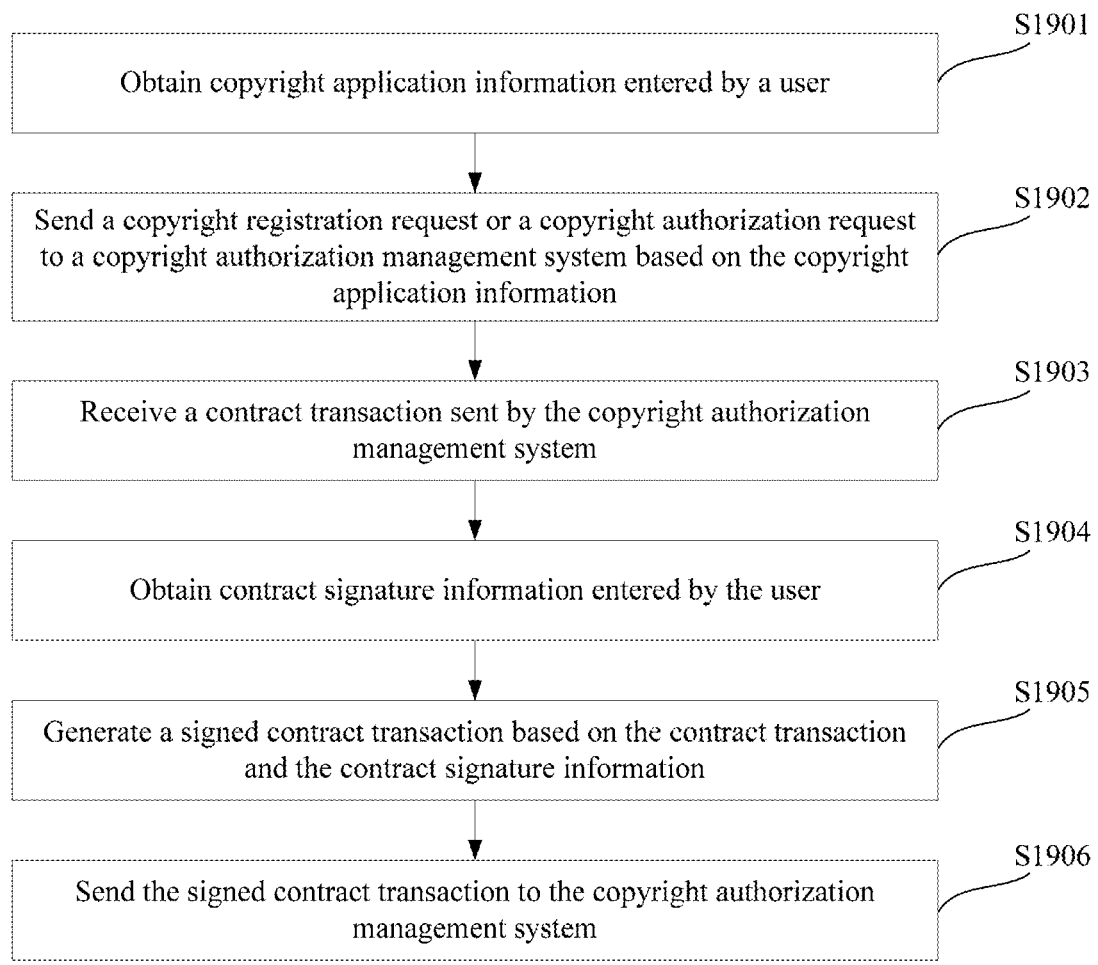
FIG. 19 is a schematic flowchart of a copyright authorization management method applied to a copyright application client.

FIG. 19 is a schematic flowchart of a copyright authorization management method applied to a copyright application client. As shown in FIG. 19, the method includes the following steps:

Step S1901: Obtain copyright application information entered by a user.

Step S1902: Generate a copyright registration request or a copyright authorization request based on the copyright application information.

Step S1903: Send the copyright registration request or the copyright authorization request to a copyright authorization management system.

Step S1904: Receive a contract transaction sent by the copyright authorization management system.

Step S1905: Obtain contract signature information entered by the user.

Step S1906: Generate a signed contract transaction based on the contract transaction and the contract signature information.

Step S1907: Send the signed contract transaction to the copyright authorization management system.

In step S1903, the copyright registration request or the copyright authorization request is sent to a copyright authorization management apparatus. In step S1903, the contract transaction sent by the copyright authorization management apparatus is received. In step S1907, the signed contract transaction may be sent to the copyright authorization management apparatus or a block chain apparatus in the copyright authorization management system.

After step S1903 and before S1904, the copyright authorization management method shown in FIG. 19 may further include:

receiving a group discussion invitation sent by the copyright authorization management system; and logging in to a corresponding group based on the group discussion invitation.

After step S1903 and before S1904, the copyright authorization management method shown in FIG. 19 may further include:

receiving contract information sent by the copyright authorization management system;

obtaining contract confirmation information entered by the user;

generating a contract confirmation message based on the contract confirmation information; and sending the contract confirmation message to the copyright authorization management system.

After step S1903 and before S1904, the copyright authorization management method shown in FIG. 19 may further include:

receiving contract information sent by the copyright authorization management system;

obtaining contract reselection information entered by the user;

generating a contract reselection request based on the contract reselection information; and sending the contract reselection request to the copyright authorization management system.

After step S1903 and before S1904, the copyright authorization management method shown in FIG. 19 may further include:

receiving a cloud system contract signature notification sent by the copyright authorization management system; and logging in to a corresponding contract signature cloud system based on the cloud system contract signature notification.

Figure 20:
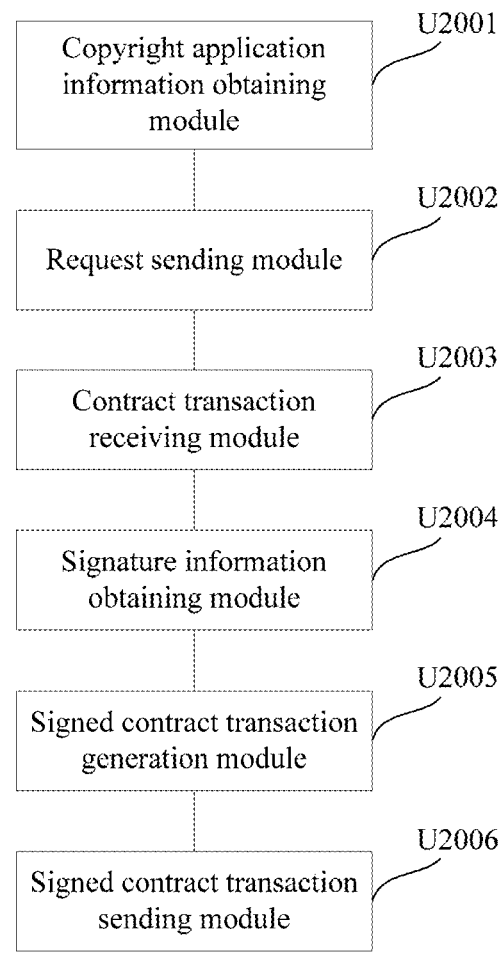
FIG. 20 is a schematic structural diagram of a copyright authorization management apparatus applied to a copyright application client.

Corresponding to the method shown in FIG. 19, the present disclosure further provides a copyright authorization management apparatus, where the copyright authorization management apparatus is applied to a copyright application client. As shown in FIG. 20, the apparatus includes:

a copyright application information obtaining module U2001, configured to obtain copyright application information entered by a user;

a request generation module U2002, configured to generate a copyright registration request or a copyright authorization request based on the copyright application information;

a request sending module U2003, configured to send the copyright registration request or the copyright authorization request to a copyright authorization management system;

a contract transaction receiving module U2004, configured to receive a contract transaction sent by the copyright authorization management system;

a signature information obtaining module U2005, configured to obtain contract signature information entered by the user;

a signed contract transaction generation module U2006, configured to generate a signed contract transaction based on the contract transaction and the contract signature information; and a signed contract transaction sending module U2007, configured to send the signed contract transaction to the copyright authorization management system.

The copyright authorization management apparatus may further include the following modules between the request sending module U2003 and the contract transaction receiving module U2004:

a group discussion invitation receiving module, configured to receive a group discussion invitation sent by the copyright authorization management system; and a group login module, configured to log in to a corresponding group based on the group discussion invitation.

The copyright authorization management apparatus may further include the following modules between the request sending module U2003 and the contract transaction receiving module U2004:

a contract information receiving module, configured to receive contract information sent by the copyright authorization management system;

a contract confirmation information obtaining module, configured to obtain contract confirmation information entered by the user;

a contract confirmation message generation module, configured to generate a contract confirmation message based on the contract confirmation information; and a contract confirmation information sending module, configured to send the contract confirmation message to the copyright authorization management system.

The copyright authorization management apparatus may further include the following modules between the request sending module U2003 and the contract transaction receiving module U2004:

a contract information receiving module, configured to receive contract information sent by the copyright authorization management system;

a contract reselection information obtaining module, configured to obtain contract reselection information entered by the user;

a contract reselection request generation module, configured to generate a contract reselection request based on the contract reselection information; and a contract reselection request sending module, configured to send the contract reselection request to the copyright authorization management system.

The copyright authorization management apparatus may further include the following modules between the request sending module U2003 and the contract transaction receiving module U2004:

a cloud signature notification receiving module, configured to receive a cloud system contract signature notification sent by the copyright authorization management system; and a signature cloud system login module, configured to log in to a corresponding contract signature cloud system based on the cloud system contract signature notification.

Figure 21:
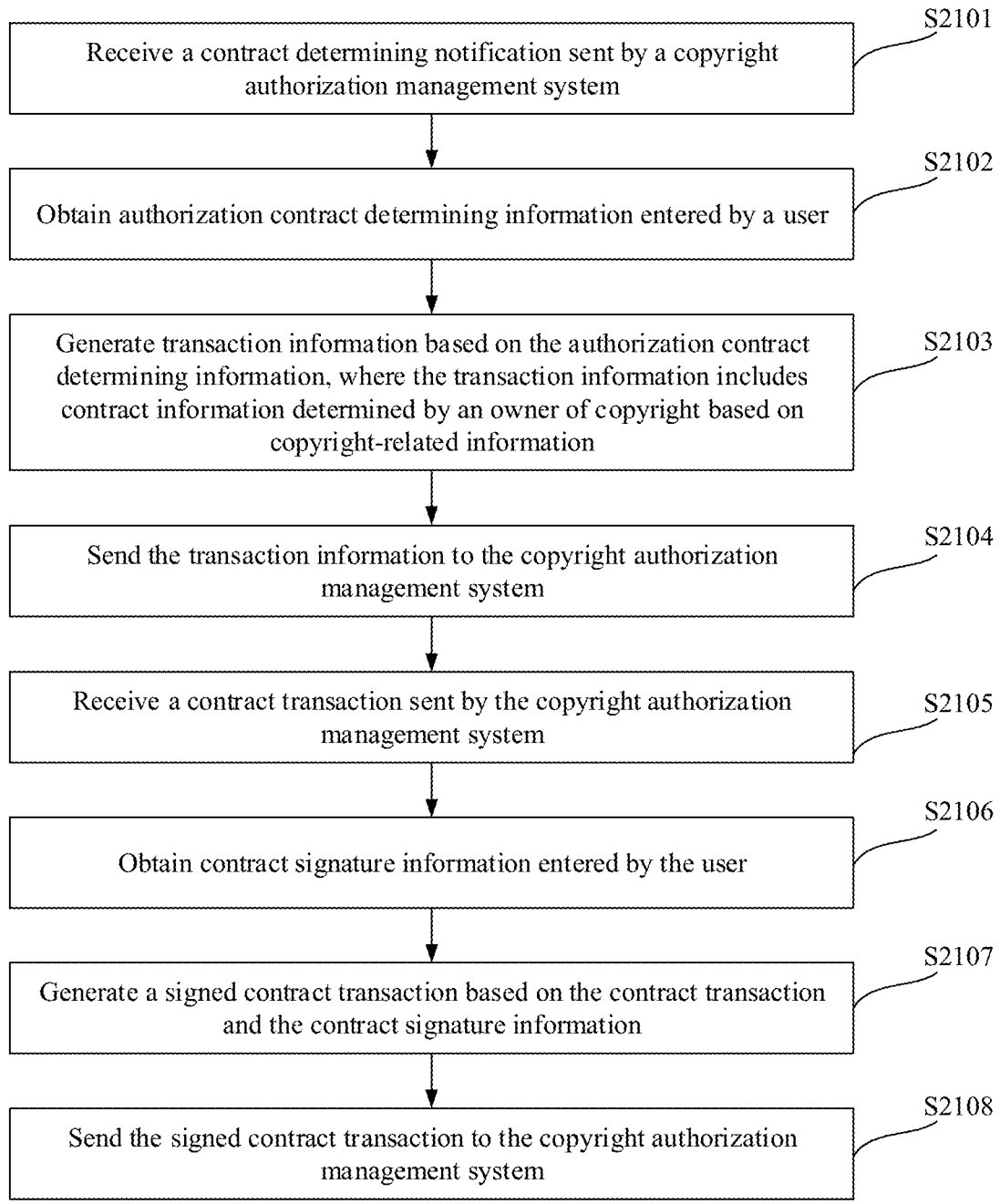
FIG. 21 is a schematic flowchart of a copyright authorization management method applied to an owner-of-copyright client.

FIG. 21 is a schematic flowchart of a copyright authorization management method applied to an owner-of-copyright client. As shown in FIG. 21, the method includes the following steps:

Step S2101: Receive a contract determining notification sent by a copyright authorization management system.

Step S2102: Obtain authorization contract determining information entered by a user.

Step S2103: Generate transaction information based on the authorization contract determining information, where the transaction information includes contract information determined by an owner of copyright based on copyright-related information.

Step S2104: Send the transaction information to the copyright authorization management system.

Step S2105: Receive a contract transaction sent by the copyright authorization management system.

Step S2106: Obtain contract signature information entered by the user.

Step S2107: Generate a signed contract transaction based on the contract transaction and the contract signature information.

Step S2108: Send the signed contract transaction to the copyright authorization management system.

In step S2104, the transaction information is sent to a copyright authorization management apparatus. In step S2105, the contract transaction sent by the copyright authorization management apparatus is received. In step S2108, the signed contract transaction may be sent to the copyright authorization management apparatus or a block chain apparatus in the copyright authorization management system.

Before step S2101, the copyright authorization management method shown in FIG. 21 may further include:

receiving a group discussion invitation sent by the copyright authorization management system; and logging in to a corresponding group based on the group discussion invitation.

In the copyright authorization management method shown in FIG. 21, the following steps may substitute for steps S2101 and S2102:

receiving a cloud system contract signature notification sent by the copyright authorization management system; and logging in to a corresponding contract signature cloud system based on the cloud system contract signature notification.

After the owner of copyright and a copyright applicant determine a contract in the contract signature cloud system, one of owners of copyright (a main person in charge) generates the transaction information based on the determined contract by using the owner-of-copyright client, and sends the transaction information to the copyright authorization management system. Specifically, the owner of copyright sends the transaction information to the copyright authorization management apparatus.

Figure 22:
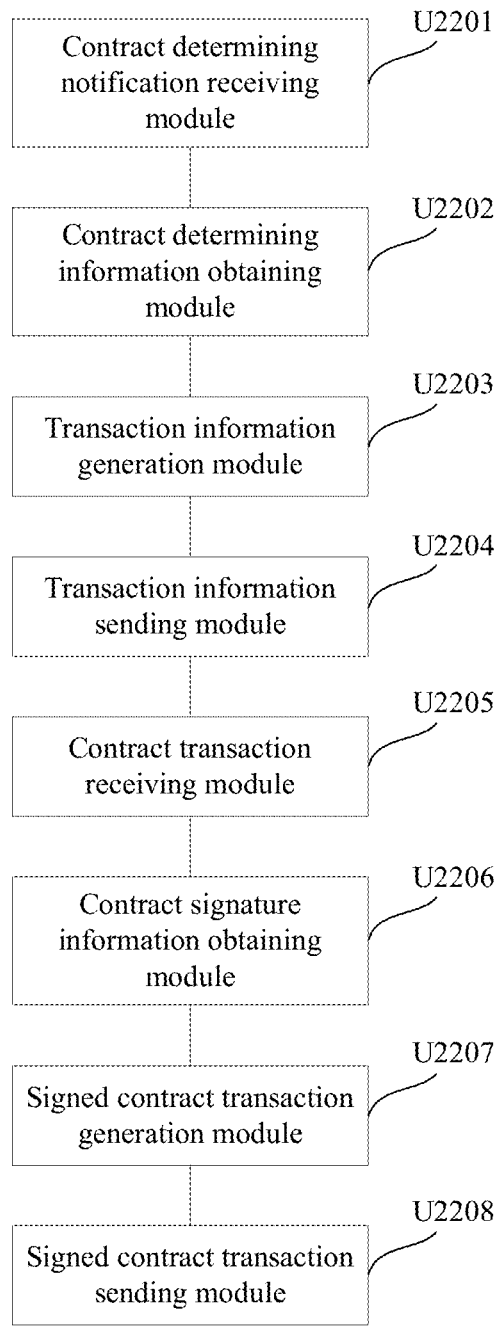
FIG. 22 is a schematic structural diagram of a copyright authorization management apparatus applied to an owner-of-copyright client.

Corresponding to the method shown in FIG. 21, the present disclosure further provides a copyright authorization management apparatus, where the copyright authorization management apparatus is applied to an owner-of-copyright client. As shown in FIG. 22, the apparatus includes:

a contract determining notification receiving module U2201, configured to receive a contract determining notification sent by a copyright authorization management system;

a contract determining information obtaining module U2202, configured to obtain authorization contract determining information entered by a user;

a transaction information generation module U2203, configured to generate transaction information based on the authorization contract determining information, where the transaction information includes contract information determined by an owner of copyright based on copyright-related information;

a transaction information sending module U2204, configured to send the transaction information to the copyright authorization management system;

a contract transaction receiving module U2205, configured to receive a contract transaction sent by the copyright authorization management system;

a contract signature information obtaining module U2206, configured to obtain contract signature information entered by the user;

a signed contract transaction generation module U2207, configured to generate a signed contract transaction based on the contract transaction and the contract signature information; and a signed contract transaction sending module U2208, configured to send the signed contract transaction to the copyright authorization management system.

Before the contract determining notification receiving module U2201, the copyright authorization management apparatus shown in FIG. 22 may further include the following modules:

a group discussion invitation receiving module, configured to receive a group discussion invitation sent by the copyright authorization management system; and a group login module, configured to log in to a corresponding group based on the group discussion invitation.

In the copyright authorization management apparatus shown in FIG. 22, the following modules may substitute for the contract determining notification receiving module U2201 and the contract determining information obtaining module U2202:

a cloud signature notification receiving module, configured to receive a cloud system contract signature notification sent by the copyright authorization management system; and a signature cloud system login module, configured to log in to a corresponding contract signature cloud system based on the cloud system contract signature notification.

Figure 23:
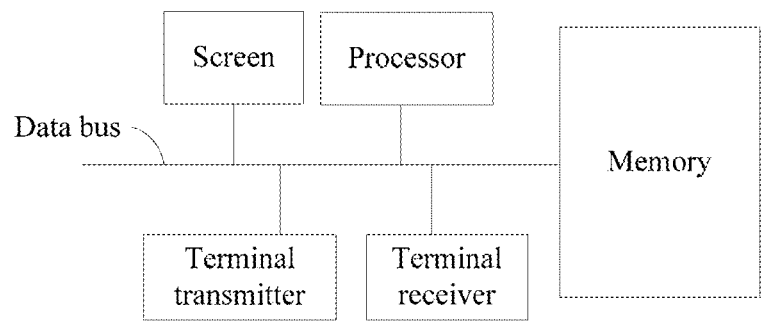
FIG. 23 is a schematic structural diagram of a client device.

The foregoing copyright application client and owner-of-copyright client include function modules, may be software applications, or may be a combination of function modules integrated into third-party software. The copyright application client and the owner-of-copyright client may alternatively be hardware devices. When the copyright application client and the owner-of-copyright client are used as devices, schematic structural diagrams of the devices are shown in FIG. 23. The copyright application client and the owner-of-copyright client are the same in terms of hardware structures, but are different in terms of functions of components.

For the copyright application client, the copyright application client includes a memory, a processor, a terminal transmitter, a terminal receiver, and a screen, where the screen is configured to obtain copyright application information entered by a user;

the processor is configured to generate a copyright registration request or a copyright authorization request based on the copyright application information by invoking a program or an instruction stored in the memory;

the terminal transmitter is configured to send the copyright registration request or the copyright authorization request to a copyright authorization management system;

the terminal receiver is configured to receive a contract transaction sent by the copyright authorization management system;

the screen is further configured to obtain contract signature information entered by the user;

the processor is further configured to generate a signed contract transaction based on the contract transaction and the contract signature information by invoking the program or the instruction stored in the memory; and the terminal transmitter is further configured to send the signed contract transaction to the copyright authorization management system.

The terminal receiver of the copyright application client may be further configured to receive a group discussion invitation sent by the copyright authorization management system; and the processor may be further configured to log in to a corresponding group based on the group discussion invitation.

The terminal receiver of the copyright application client may be further configured to receive contract information sent by the copyright authorization management system; the screen is further configured to obtain contract confirmation information entered by the user; the processor is further configured to generate a contract confirmation message based on the contract confirmation information; and the terminal transmitter is further configured to send the contract confirmation message to the copyright authorization management system.

The terminal receiver of the copyright application client may be further configured to receive contract information sent by the copyright authorization management system; the screen is further configured to obtain contract reselection information entered by the user; the processor is further configured to generate a contract reselection request based on the contract reselection information; and the terminal transmitter is further configured to send the contract reselection request to the copyright authorization management system.

The terminal receiver of the copyright application client may be further configured to receive a cloud system contract signature notification sent by the copyright authorization management system; and the processor is further configured to log in to a corresponding contract signature cloud system based on the cloud system contract signature notification.

For the owner-of-copyright client, the owner-of-copyright client includes a memory, a processor, a terminal transmitter, a terminal receiver, and a screen, where the terminal receiver is configured to receive a contract determining notification sent by the copyright authorization management system;

the screen is configured to obtain authorization contract determining information entered by a user;

the processor is configured to generate transaction information based on the authorization contract determining information by invoking a program or an instruction stored in the memory, where the transaction information includes contract information determined by an owner of copyright based on copyright-related information;

the terminal transmitter is configured to send the transaction information to the copyright authorization management system;

the terminal receiver is further configured to receive a contract transaction sent by the copyright authorization management system;

the screen is further configured to obtain contract signature information entered by the user;

the processor is further configured to generate a signed contract transaction based on the contract transaction and the contract signature information; and the terminal transmitter is further configured to send the signed contract transaction to the copyright authorization management system.

The terminal receiver of the owner-of-copyright client may be further configured to receive a group discussion invitation sent by the copyright authorization management system; and the processor is further configured to log in to a corresponding group based on the group discussion invitation.

The terminal receiver of the owner-of-copyright client may be further configured to receive a cloud system contract signature notification sent by the copyright authorization management system; and the processor is further configured to log in to a corresponding contract signature cloud system based on the cloud system contract signature notification.

Components of the copyright application client and the owner-of-copyright client are connected to each other by using a data bus.

A person skilled in the art may clearly understand that, the technologies in the embodiments of the present disclosure may be implemented by software in addition to a necessary general-purpose hardware platform. Based on such an understanding, the technical solutions in the embodiments of the present disclosure essentially or the part contributing to the prior art may be implemented in a form of a software product. The computer software product may be stored in a storage medium, such as a ROM/RAM, a magnetic hard disk, or an optical disc, and includes several instructions for instructing a computer device (which may be a personal computer, a server, a network device, or the like) to perform the methods described in the embodiments or some parts of the embodiments of the present disclosure.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate a device for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly. For related parts, reference may be made to partial descriptions in the method embodiment.

The foregoing descriptions are implementations of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A copyright authorization management method, comprising:
    obtaining owner-of-copyright information from a block chain device, wherein obtaining owner-of-copyright information comprises: receiving a copyright registration request sent by a copyright application client, wherein the copyright registration request comprises information about a cited work;
    checking the copyright registration request against one or more predetermined rules associated with the cited work on the block chain device; and
    approving the copyright registration request based on the one or more predetermined rules retrieved from the block chain device;
    sending a contract determining notification to a corresponding owner-of-copyright client based on the owner-of-copyright information, wherein the contract determining notification carries copyright application-related information of a to-be-authorized work;
    receiving transaction information returned by the owner-of-copyright client, wherein the transaction information comprises contract information determined by an owner of copyright based on the copyright application-related information;
    sending a cloud signature notification to a cloud signature notification receiving module and directing the owner-of-copyright client to a signature cloud system login module configured to log in to a corresponding contract signature cloud system based on the cloud signature notification;
    obtaining a valid contract transaction based on the transaction information, wherein the valid contract transaction comprises signatures satisfying a preset-quantity rule; and
    implementing persistence of the valid contract transaction in the block chain device, wherein implementing persistence of the valid contract transaction in the block chain device comprises associating each of the cited work and the to-be-authorized work with one another, and said valid contract transaction configuring the block chain device to receive a query and configured to provide a linkage between the cited work and the to-be-authorized work in response to the query.

2. The copyright authorization management method according to claim 1, wherein obtaining a valid contract transaction based on the transaction information, and implementing persistence of the valid contract transaction in the block chain device comprises:
    constructing a contract transaction based on the transaction information, storing the contract transaction to a copyright authorization management apparatus, generating a check script based on the transaction information, and storing the check script to the block chain device;
    sending the contract transaction to a copyright application client and the owner-of-copyright client;
    receiving signed contract transactions returned by the copyright application client and the owner-of-copyright client;
    verifying, based on the signed contract transactions, whether a signature quantity satisfies the preset-quantity rule;

generating the valid contract transaction based on the signed contract transactions when the signature quantity satisfies the preset-quantity rule; and storing the valid contract transaction to the block chain device, checking, by the block chain device based on the check script, whether the valid contract transaction is legitimate, and implementing, by the block chain device, persistence of the valid contract transaction in the block chain device when the valid contract transaction is legitimate.

3. The copyright authorization management method according to claim 1, wherein obtaining a valid contract transaction based on the transaction information, and implementing persistence of the valid contract transaction in the block chain device comprises:

constructing a contract transaction based on the transaction information, and marking a status of the contract transaction as a suspended state;

broadcasting the contract transaction to the block chain device;

sending the contract transaction to a copyright application client and the owner-of-copyright client, and submitting, by the copyright application client and the owner-of-copyright client, signed contract transactions whose statuses each have been marked as the suspended state to the block chain device;

receiving, by the block chain device, the signed contract transactions submitted by the copyright application client and the owner-of-copyright client, and sending the signed contract transactions to a block generation apparatus;

receiving, by the block generation apparatus, the signed contract transactions sent by the block chain device, and adding a signature of a historical signed contract transaction to a latest current signed contract transaction, wherein the historical signed contract transaction and the latest current signed contract transaction originate from a same contract transaction, and the block generation apparatus is a block chain device configured to generate a block;

verifying, based on a signature of the latest current signed contract transaction, whether a signature quantity satisfies the preset-quantity rule; and when the signature quantity satisfies the preset-quantity rule, marking a status of the latest current signed contract transaction as a successful state, generating the valid contract transaction based on the latest current signed contract transaction in the successful state, and implementing persistence of the valid contract transaction in the block chain device.

4. The copyright authorization management method according to claim 2, wherein the contract transaction comprises a copyright transaction ID and an authorization contract file URL of the to-be-authorized work.

5. The copyright authorization management method according to claim 2, wherein verifying whether a signature quantity satisfies the preset-quantity rule comprises:

determining whether a total quantity of signatures of a first signed contract transaction group comprising a plurality of owners of copyright is greater than or equal to a preset first quantity, wherein the first signed contract transaction group is a signed contract transaction from the owner-of-copyright client;

determining whether a total quantity of signatures of a second signed contract transaction group comprising a plurality of copyright application clients is greater than or equal to a preset second quantity, wherein the second signed contract transaction group is a signed contract transaction from the copyright application client; and determining that the signature quantity satisfies the preset-quantity rule when the total quantity of the signatures of the first signed contract transaction group is greater than or equal to the first quantity and the total quantity of the signatures of the second signed contract transaction group is greater than or equal to the second quantity.

6. The copyright authorization management method according to claim 1, wherein obtaining owner-of-copyright information comprises:

receiving a copyright authorization request sent by a copyright application client; and obtaining the corresponding owner-of-copyright information based on the copyright authorization request.

7. The copyright authorization management method according to claim 6, wherein sending a contract determining notification to a corresponding owner-of-copyright client based on the owner-of-copyright information comprises:

creating a discussion group; and sending a group discussion invitation to the corresponding owner-of-copyright client based on the owner-of-copyright information, sending a group discussion invitation to the copyright application client, and using the group discussion invitation as the contract determining notification.

8. The copyright authorization management method according to claim 1, wherein obtaining owner-of-copyright information comprises: checking the copyright registration request;

when checking of the copyright registration request succeeds, performing checking of the copyright registration request against one or more predetermined rules associated with the cited work on the block chain device, comprising: querying, based on the information about the cited work, whether derivation on the cited work is disallowed;

when derivation on the cited work is disallowed, sending a registration failure prompt message to the copyright application client and ending copyright registration; and when derivation on the cited work is allowed, querying, based on the information about the cited work, whether derivation is to be performed on the cited work according to a preset clause, and when derivation is to be performed on the cited work according to a preset clause, sending the preset clause to the copyright application client, otherwise, obtaining the owner-of-copyright information based on the information about the cited work.

9. The copyright authorization management method according to claim 1, wherein after receiving transaction information returned by the owner-of-copyright client and before obtaining a valid contract transaction based on the transaction information, the method further comprises:

sending the contract information to a copyright application client;

determining whether contract confirmation information sent by the copyright application client is received; and when the contract confirmation information is received, obtaining the valid contract transaction based on the transaction information, otherwise, ending a copyright authorization procedure.

10. The copyright authorization management method according to claim 1, wherein after receiving transaction information returned by the owner-of-copyright client and before obtaining a valid contract transaction based on the transaction information, the method further comprises:

sending the contract information to a copyright application client;

determining whether a contract confirmation message sent by the copyright application client is received;

when the contract confirmation message is received, obtaining the valid contract transaction based on the transaction information, otherwise, determining whether a contract reselection request comprising counteroffer information sent by the copyright application client is received;

when the contract reselection request sent by the copyright application client is received, determining whether a quantity of contract reselection requests is less than or equal to a preset threshold, or when the contract reselection request sent by the copyright application client is not received, ending a copyright authorization procedure; and when the quantity of contract reselection requests is less than or equal to the threshold, sending the contract reselection request to the owner-of-copyright client and returning to the step of receiving transaction information returned by the owner-of-copyright client, otherwise, sending a new-application message to the copyright application client.

11. A copyright authorization management system, comprising a processor and a non-transitory computer-readable memory on which are stored computer program instructions that, when implemented, cause the copyright authorization management system to provide:

a block chain device;

a block generation apparatus;

a copyright authorization management apparatus configured to:

obtain owner-of-copyright information from the block chain device, wherein obtaining owner-of-copyright information comprises: receiving a copyright registration request sent by a copyright application client, wherein the copyright registration request comprises information about a cited work; checking the copyright registration request against one or more predetermined rules associated with the cited work on the block chain device; and approving the copyright registration request based on the one or more predetermined rules retrieved from the block chain device, send a contract determining notification to a corresponding owner-of-copyright client based on the owner-of-copyright information, wherein the contract determining notification carries copyright application-related information of a to-be-authorized work, receive transaction information returned by the owner-of-copyright client, wherein the transaction information comprises contract information determined by an owner of copyright based on the copyright application-related information, construct a contract transaction based on the transaction information, store the contract transaction to the copyright authorization management apparatus, generate a check script based on the transaction information, and store the check script to the block chain device, send the contract transaction to a copyright application client and the owner-of-copyright client, receive signed contract transactions returned by the copyright application client and the owner-of-copyright client, verify, based on the signed contract transactions, whether a signature quantity satisfies a preset-quantity rule, generate a valid contract transaction based on the signed contract transactions when the signature quantity satisfies the preset-quantity rule, and store the valid contract transaction to the block chain device;

wherein the block chain device is configured to check, based on the check script, whether the valid contract transaction is legitimate, and send the valid contract transaction to the block generation apparatus when the valid contract transaction is legitimate; and wherein the block generation apparatus is configured to receive the valid contract transaction sent by the block chain device, and implement persistence of the valid contract transaction in the block chain device, wherein implementing persistence of the valid contract transaction in the block chain device comprises associating each of the cited work and the to-be-authorized work with one another, and said valid contract transaction configuring the block chain device to receive a query and configured to provide a linkage between the cited work and the to-be-authorized work in response to the query;

the copyright authorization management system further providing:

a cloud signature notification receiving module, configured to receive a cloud system contract signature notification sent by the copyright authorization management system; and a signature cloud system login module, configured to log in to a corresponding contract signature cloud system based on the cloud system contract signature notification.

12. The copyright authorization management system according to claim 11, wherein the contract transaction comprises a copyright transaction ID and an authorization contract file URL of the to-be-authorized work.

13. The copyright authorization management system according to claim 11, wherein to verify whether the signature quantity satisfies the preset-quantity rule, the copyright authorization management apparatus is configured to:

determine whether a total quantity of signatures of a first signed contract transaction group comprising a plurality of owners of copyright is greater than or equal to a preset first quantity, wherein the first signed contract transaction group is a signed contract transaction from the owner-of-copyright client;

determine whether a total quantity of signatures of a second signed contract transaction group comprising a plurality of copyright application clients is greater than or equal to a preset second quantity, wherein the second signed contract transaction group is a signed contract transaction from the copyright application client; and determine that the signature quantity satisfies the preset-quantity rule when the total quantity of the signatures of the first signed contract transaction group is greater than or equal to the first quantity and the total quantity of the signatures of the second signed contract transaction group is greater than or equal to the second quantity.

14. The copyright authorization management system according to claim 11, wherein to obtain the owner-of-copyright information, the copyright authorization management apparatus is configured to:

receive a copyright authorization request sent by the copyright application client; and obtain the corresponding owner-of-copyright information based on the copyright authorization request.

15. The copyright authorization management system according to claim 14, wherein to send the contract determining notification to the corresponding owner-of-copyright client based on the owner-of-copyright information, the copyright authorization management apparatus is configured to:
  create a discussion group; and
  send a group discussion invitation to the corresponding owner-of-copyright client based on the owner-of-copyright information, send a group discussion invitation to the copyright application client, and use the group discussion invitation as the contract determining notification.

16. The copyright authorization management system according to claim 11, wherein to obtain the owner-of-copyright information, the copyright authorization management apparatus is configured to:
  check the copyright registration request;
  when the check of the copyright registration request succeeds, perform checking of the copyright registration request against one or more predetermined rules associated with the cited work on the block chain device, comprising: query, based on the information about the cited work, whether derivation on the cited work is disallowed;
  when derivation on the cited work is disallowed, send a registration failure prompt message to the copyright application client and end copyright registration; and
  when derivation on the cited work is allowed, query, based on the information about the cited work, whether derivation is to be performed on the cited work according to a preset clause, and when derivation is to be performed on the cited work according to a preset clause, send the preset clause to the copyright application client, otherwise, obtain the owner-of-copyright information based on the information about the cited work.

17. The copyright authorization management system according to claim 11, wherein after receiving the transaction information returned by the owner-of-copyright client and before obtaining the valid contract transaction based on the transaction information, the copyright authorization management apparatus is further configured to:
  send the contract information to the copyright application client;
  determine whether a contract confirmation message sent by the copyright application client is received; and
  when the contract confirmation message is received, obtain the valid contract transaction based on the transaction information, otherwise, end a copyright authorization procedure.

18. The copyright authorization management system according to claim 11, after receiving the transaction information returned by the owner-of-copyright client and before obtaining the valid contract transaction based on the transaction information, the copyright authorization management apparatus is further configured to:
  send the contract information to the copyright application client;
  determine whether a contract confirmation message sent by the copyright application client is received;
  when the contract confirmation message is received, obtain the valid contract transaction based on the transaction information, otherwise, determine whether a contract reselection request comprising counteroffer information sent by the copyright application client is received;
  when the contract reselection request sent by the copyright application client is received, determine whether a quantity of contract reselection requests is less than a preset threshold, or when the contract reselection request sent by the copyright application client is not received, end a copyright authorization procedure; and
  when the quantity of contract reselection requests is less than the threshold, send the contract reselection request to the owner-of-copyright client and return to the step of receiving transaction information returned by the owner-of-copyright client, otherwise, send a new-application message to the copyright application client.

* * * * *